United States Patent
Coulonvaux et al.

(10) Patent No.: US 8,343,245 B2
(45) Date of Patent: *Jan. 1, 2013

(54) FILTER ARRANGEMENTS; HOUSINGS; ASSEMBLIES; AND, METHODS

(75) Inventors: Paul R. Coulonvaux, Brussels (BE); Johan G. Dewit, Hamme-Mile (BE); Cary Donald Olson, Eagan, MN (US); Thomas G. Miller, Eagan, MN (US); Marty A. Barris, Lakeville, MN (US); Wayne R. W. Bishop, St. Louis Park, MN (US); Donald F. Engel, Prior Lake, MN (US); Steven Campbell, Bloomington, MN (US); Johan Fobe, Leuven (BE)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,188

(22) Filed: Feb. 7, 2011

(65) Prior Publication Data

US 2012/0031058 A1    Feb. 9, 2012

Related U.S. Application Data

(63) Continuation of application No. 11/587,882, filed as application No. PCT/US2005/014909 on Apr. 28, 2005, now Pat. No. 7,905,936.

(60) Provisional application No. 60/649,301, filed on Feb. 1, 2005, provisional application No. 60/604,549, filed on Aug. 25, 2004, provisional application No. 60/567,121, filed on Apr. 30, 2004.

(51) Int. Cl.
*B01D 46/00* (2006.01)
(52) U.S. Cl. ............. 55/357; 55/385.3; 55/480; 55/481; 55/502; 55/521
(58) Field of Classification Search .................. 55/356, 55/357, 385.3, 478, 480, 481, 498, 502, 521; 123/198 E
See application file for complete search history.

(56) References Cited

U.S. PATENT DOCUMENTS

| | | | |
|---|---|---|---|
| 991,572 | A | 5/1911 | Weisenstein |
| 1,079,042 | A | 11/1913 | Duncan |
| 1,103,717 | A | 7/1914 | Walton et al. |
| 1,942,600 | A | 1/1934 | Hornung |
| 2,599,604 | A | 6/1952 | Bauer et al. |
| 2,731,155 | A | 1/1956 | James |

(Continued)

FOREIGN PATENT DOCUMENTS

CA        997684        9/1976

(Continued)

OTHER PUBLICATIONS

Civil Cover Sheet; *Donaldson Company, Inc. v. Mann & Hummel USA, Inc. and Mann & Hummel GmbH*, United States District Court of Minnesota, Case 0:07-cv-04136 MJD-SRN, filed Oct. 1, 2007.

(Continued)

*Primary Examiner* — Robert Clemente
(74) *Attorney, Agent, or Firm* — Merchant & Gould, P.C.

(57) ABSTRACT

Air cleaner and preferred components for an air cleaner are provided. In certain arrangements, a band is permanently mounted to the media pack, surrounding the media. Also, the cartridge is non-circular and includes a radial seal thereon.

22 Claims, 54 Drawing Sheets

U.S. PATENT DOCUMENTS

| | | |
|---|---|---|
| 2,887,177 A | 5/1959 | Mund et al. |
| 2,890,796 A | 6/1959 | Blood |
| 2,914,785 A | 12/1959 | Ela |
| 2,942,127 A | 6/1960 | Harse |
| 3,019,854 A | 3/1962 | O'Bryant |
| 3,025,963 A | 3/1962 | Bauer |
| 3,209,917 A | 10/1965 | Yelinek |
| 3,442,067 A | 5/1969 | Swenson |
| 3,494,113 A | 2/1970 | Kinney |
| 3,676,242 A | 7/1972 | Prentice |
| 3,695,437 A | 10/1972 | Shaltis |
| 3,740,933 A | 6/1973 | Hollowell |
| 3,807,150 A | 4/1974 | Maracle |
| 3,841,953 A | 10/1974 | Kohkamp et al. |
| 3,849,241 A | 11/1974 | Butin et al. |
| 3,878,014 A | 4/1975 | Melead |
| 3,912,631 A | 10/1975 | Turman |
| 4,065,341 A | 12/1977 | Cub |
| 4,158,449 A | 6/1979 | Sun et al. |
| 4,159,899 A | 7/1979 | Deschenes |
| 4,162,906 A | 7/1979 | Sullivan et al. |
| 4,236,902 A | 12/1980 | Fricke |
| 4,255,175 A | 3/1981 | Wilkins |
| 4,282,186 A | 8/1981 | Nonnenmann et al. |
| 4,285,909 A | 8/1981 | Mizusawa et al. |
| 4,310,419 A | 1/1982 | Nara et al. |
| 4,322,231 A | 3/1982 | Hilzendeger et al. |
| 4,394,147 A | 7/1983 | Caddy et al. |
| 4,402,830 A | 9/1983 | Pall |
| 4,410,427 A | 10/1983 | Wydeven |
| 4,430,223 A | 2/1984 | Miyakawa et al. |
| 4,449,993 A | 5/1984 | Bergeron |
| 4,480,359 A | 11/1984 | Koster |
| 4,498,989 A | 2/1985 | Miyakawa et al. |
| 4,537,608 A | 8/1985 | Koslow |
| 4,578,091 A | 3/1986 | Borja |
| 4,589,983 A | 5/1986 | Wydeven |
| 4,617,176 A | 10/1986 | Merry |
| 4,678,489 A | 7/1987 | Bertelsen |
| 4,704,143 A | 11/1987 | Percy |
| 4,720,292 A | 1/1988 | Engel et al. |
| 4,759,783 A | 7/1988 | Machado |
| 4,767,531 A | 8/1988 | Holzer |
| 4,783,029 A | 11/1988 | Geppert et al. |
| 4,824,564 A | 4/1989 | Edwards et al. |
| 4,925,469 A | 5/1990 | Clement et al. |
| 4,925,561 A | 5/1990 | Ishii et al. |
| 4,963,170 A | 10/1990 | Weber et al. |
| 4,999,038 A | 3/1991 | Lundberg |
| 5,013,182 A | 5/1991 | Coulvonvaux et al. |
| 5,030,264 A | 7/1991 | Klotz et al. |
| 5,049,326 A | 9/1991 | Matsumoto et al. |
| 5,069,790 A | 12/1991 | Mordeki |
| 5,082,476 A | 1/1992 | Kahlbaugh et al. |
| 5,125,941 A | 6/1992 | Ernst et al. |
| 5,174,895 A | 12/1992 | Drori |
| 5,211,846 A | 5/1993 | Kott et al. |
| 5,213,596 A | 5/1993 | Kume et al. |
| 5,238,474 A | 8/1993 | Kahlbaugh et al. |
| 5,304,312 A | 4/1994 | Forster et al. |
| 5,350,515 A | 9/1994 | Stark et al. |
| 5,415,677 A | 5/1995 | Ager et al. |
| 5,435,870 A | 7/1995 | Takagaki et al. |
| 5,472,463 A | 12/1995 | Herman et al. |
| 5,484,466 A | 1/1996 | Brown et al. |
| 5,487,767 A | 1/1996 | Brown |
| 5,494,497 A | 2/1996 | Lee |
| 5,536,290 A | 7/1996 | Stark et al. |
| 5,543,007 A | 8/1996 | Takagaki et al. |
| 5,547,480 A | 8/1996 | Coulonvaux |
| 5,582,146 A | 12/1996 | Linsbauer et al. |
| 5,601,717 A | 2/1997 | Villette et al. |
| 5,611,922 A | 3/1997 | SteNe |
| 5,613,992 A | 3/1997 | Engel |
| 5,645,718 A | 7/1997 | Hardison et al. |
| 5,672,399 A | 9/1997 | Kahlbaugh et al. |
| 5,683,660 A | 11/1997 | Wirth et al. |
| 5,685,985 A | 11/1997 | Brown et al. |
| 5,690,712 A | 11/1997 | Engel |
| 5,714,126 A | 2/1998 | Frund |
| 5,730,766 A | 3/1998 | Clements |
| 5,730,768 A | 3/1998 | Kaminaga et al. |
| 5,740,774 A | 4/1998 | Kennedy |
| 5,755,843 A | 5/1998 | Sundquist |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| 5,800,587 A | 9/1998 | Kahlbaugh et al. |
| 5,820,646 A | 10/1998 | Gillingham et al. |
| 5,863,313 A | 1/1999 | Coulonvaux |
| 5,895,574 A | 4/1999 | Friedmann et al. |
| 5,897,676 A | 4/1999 | Engel |
| 5,902,364 A | 5/1999 | Tokar et al. |
| 5,908,480 A | 6/1999 | Ban et al. |
| D416,308 S | 11/1999 | Ward et al. |
| D417,268 S | 11/1999 | Gillingham |
| 6,048,386 A | 4/2000 | Gillingham et al. |
| D425,189 S | 5/2000 | Gillingham et al. |
| 6,149,700 A | 11/2000 | Morgan et al. |
| 6,179,890 B1 | 1/2001 | Romas et al. |
| 6,190,432 B1 | 2/2001 | Gieseke et al. |
| 6,231,630 B1 | 5/2001 | Ernst et al. |
| 6,235,195 B1 | 5/2001 | Tokar |
| 6,264,713 B1 | 7/2001 | Lewis |
| 6,299,661 B1 | 10/2001 | Bloomer et al. |
| 6,322,602 B2 | 11/2001 | Engel et al. |
| 6,348,084 B1 | 2/2002 | Gieseke et al. |
| 6,348,085 B1 | 2/2002 | Tokar et al. |
| 6,350,291 B1 * | 2/2002 | Gieseke et al. ............. 55/385.3 |
| D461,003 S | 7/2002 | Gieseke et al. |
| 6,517,598 B2 * | 2/2003 | Anderson et al. ............. 55/498 |
| 6,572,667 B1 | 6/2003 | Greif et al. |
| 6,585,792 B2 | 7/2003 | Schneider et al. |
| 6,598,580 B2 | 7/2003 | Baumann et al. |
| 6,610,117 B2 | 8/2003 | Gieseke et al. |
| 6,610,126 B2 | 8/2003 | Xu et al. |
| D483,459 S | 12/2003 | DeWit et al. |
| 6,743,317 B2 | 6/2004 | Wydeven |
| 6,783,565 B2 | 8/2004 | Gieseke et al. |
| 6,953,124 B2 | 10/2005 | Winter et al. |
| 6,966,940 B2 | 11/2005 | Krisko et al. |
| 7,004,986 B2 * | 2/2006 | Kopec et al. ..................... 55/337 |
| 7,097,694 B1 | 8/2006 | Jaroszczyk et al. |
| 7,211,124 B2 | 5/2007 | Gieseke et al. |
| 7,261,756 B2 * | 8/2007 | Merritt ............................ 55/482 |
| 7,318,851 B2 * | 1/2008 | Brown et al. .................... 55/498 |
| 7,323,029 B2 * | 1/2008 | Engelland et al. ............. 55/502 |
| 7,351,270 B2 * | 4/2008 | Engelland et al. ............. 55/502 |
| 7,396,375 B2 * | 7/2008 | Nepsund et al. ................ 55/481 |
| 7,491,254 B2 * | 2/2009 | Krisko et al. ................... 55/337 |
| 7,635,403 B2 | 12/2009 | Nepsund et al. |
| 7,655,074 B2 | 2/2010 | Nepsund et al. |
| 7,905,936 B2 * | 3/2011 | Coulonvaux et al. .......... 55/357 |
| 7,981,183 B2 | 7/2011 | Nepsund et al. |
| 8,012,233 B2 * | 9/2011 | Kuempel et al. ................ 55/521 |
| 2001/0003893 A1 | 6/2001 | Ramos et al. |
| 2001/0037631 A1 | 11/2001 | Morgan et al. |
| 2002/0185007 A1 | 12/2002 | Xu et al. |
| 2004/0173097 A1 | 9/2004 | Engelland et al. |
| 2004/0221555 A1 | 11/2004 | Engelland et al. |
| 2006/0081528 A1 | 4/2006 | Oelpke et al. |
| 2006/0090431 A1 * | 5/2006 | Brown ............................ 55/482 |
| 2006/0090434 A1 | 5/2006 | Brown et al. |
| 2006/0091061 A1 * | 5/2006 | Brown ........................ 210/440 |
| 2006/0091064 A1 | 5/2006 | Brown et al. |
| 2006/0091066 A1 * | 5/2006 | Driml et al. ................. 210/493.1 |
| 2006/0091084 A1 | 5/2006 | Merritt et al. |
| 2006/0101999 A1 | 5/2006 | Steins |
| 2006/0121768 A1 | 6/2006 | Dworatzek et al. |
| 2006/0123754 A1 | 6/2006 | Oelpke et al. |
| 2006/0151655 A1 | 7/2006 | Johnston |
| 2007/0006560 A1 | 1/2007 | Ruhland et al. |
| 2007/0169449 A1 | 7/2007 | Merritt |
| 2007/0186527 A1 | 8/2007 | Lampert et al. |
| 2007/0186528 A1 | 8/2007 | Wydeven et al. |
| 2007/0193236 A1 | 8/2007 | Merritt |

| | | | |
|---|---|---|---|
| 2007/0199285 A1* | 8/2007 | Gieseke et al. | 55/357 |
| 2007/0261662 A1 | 11/2007 | Lampert et al. | |
| 2008/0022641 A1* | 1/2008 | Engelland et al. | 55/521 |
| 2010/0095642 A1 | 4/2010 | Nepsund et al. | |
| 2010/0132321 A1 | 6/2010 | Nepsund et al. | |

FOREIGN PATENT DOCUMENTS

| | | |
|---|---|---|
| DE | 962 066 | 4/1957 |
| DE | 962066 | 4/1957 |
| DE | 3405719 | 8/1985 |
| DE | 3405719 A1 | 8/1985 |
| DE | 2155522 | 5/1993 |
| DE | 40 31 014 C2 | 11/1993 |
| DE | 4031014 | 11/1993 |
| DE | 44 15 890 A1 | 11/1995 |
| DE | 4415890 | 11/1995 |
| DE | 102 22 800 A1 | 12/2003 |
| EP | 0 376 443 A2 | 7/1990 |
| EP | 0 486 276 A1 | 5/1992 |
| EP | 0 492 250 | 7/1992 |
| EP | 0 529 921 | 3/1993 |
| EP | 05 581 695 | 2/1994 |
| EP | 0 704 233 A1 | 4/1996 |
| EP | 0 726 389 | 8/1996 |
| EP | 0 738 528 | 10/1996 |
| EP | 1 159 052 B1 | 11/2003 |
| EP | 1 364 695 A1 | 11/2003 |
| EP | 1 169 109 | 4/2004 |
| EP | 1 169 109 B1 | 4/2004 |
| EP | 1 731 749 A1 | 12/2006 |
| EP | 1731 749 | 12/2006 |
| EP | 1 509 311 | 1/2007 |
| EP | 1 509 311 B1 | 1/2007 |
| FR | 2 034 160 | 12/1970 |
| FR | 2034160 | 12/1970 |
| GB | 703823 | 2/1954 |
| GB | 1275651 | 5/1972 |
| JP | S58-151417 | 3/1982 |
| JP | 59-26113 | 2/1984 |
| JP | S60-155921 | 3/1984 |
| JP | 59-170669 | 11/1984 |
| JP | 60-112320 | 7/1985 |
| JP | H02-48118 | 9/1988 |
| JP | 1-11971 | 8/1989 |
| JP | 01 171615 A | 10/1989 |
| JP | 63-122617 | 6/1998 |
| JP | H02-48117 | 9/1998 |
| WO | 88/03432 | 5/1988 |
| WO | WO 88/03431 | 5/1988 |
| WO | 97/40908 | 11/1997 |
| WO | 97/40910 | 11/1997 |
| WO | 97/40917 | 11/1997 |
| WO | WO 97/41939 | 11/1997 |
| WO | WO 97/45200 | 12/1997 |
| WO | WO 98/35144 | 8/1998 |
| WO | WO 99/37381 | 7/1999 |
| WO | WO 99/47237 | 9/1999 |
| WO | WO 00/50149 | 8/2000 |
| WO | WO 00/74818 | 12/2000 |
| WO | 02/49741 A1 | 6/2002 |
| WO | WO 03/084641 A2 | 10/2003 |
| WO | WO 03/095068 | 11/2003 |
| WO | WO 03/095068 A1 | 11/2003 |
| WO | WO 2004/020075 | 3/2004 |
| WO | WO 2004/020075 A2 | 3/2004 |
| WO | WO 2005/046841 | 5/2005 |
| WO | WO 2007/000397 | 4/2007 |
| WO | WO 2007/000397 A1 | 4/2007 |

OTHER PUBLICATIONS

Complaint with Exhibits A-F, *Donaldson Company, Inc.* v. *Mann & Hummel USA, Inc. and Mann & Hummel GmbH*, United States District Court of Minnesota, Case 0:07-cv-04136 MJD-SRN, filed Oct. 1, 2007.
Opposition filed Aug. 24, 2004 by Baldwin Filters, Inc. against European Patent 1 159 052 B12 owned by Donaldson Company, Inc.
The Decision Revoking the European Patent No. 1 159 052, dated Apr. 13, 2006.
English Translation of Opposition Brief against EP 1 169 109 B1 filed by Donaldson.
English Translation of Opposition Brief of Wittner & Muller dated Oct. 5, 2007 against EP Patent 1 509 311 by Opposer Mann & Hummel GmbH, filed in the European Patent Office.
European Search Report mailed on Mar. 16, 2007.
File History of U.S. Appl. No. 09/258,412.
File History of U.S. Appl. No. 09/771,779.
File History of U.S. Appl. No. 10/776,303.
File History of U.S. Appl. No. 10/776,662.
Notice of Claims Involving Patents, *Donaldson Company, Inc.* v. *Mann & Hummel USA, Inc. and Mann & Hummel GmbH*, United States District Court of Minnesota, Case 0:07-cv-04136 MJD-SRN, filed Oct. 1, 2007.
Response to the Notice of Opposition (filed by Donaldson Company, Mar. 31, 2005).
Rule 7.1 Disclosure Statement of Plaintiff Donaldson Company, Inc., *Donaldson Company, Inc.* v. *Mann & Hummel USA, Inc. and Mann & Hummel GmbH*, United States District Court of Minnesota, Case 0:07-cv-04136 MJD-SRN, filed Oct. 1, 2007.

* cited by examiner

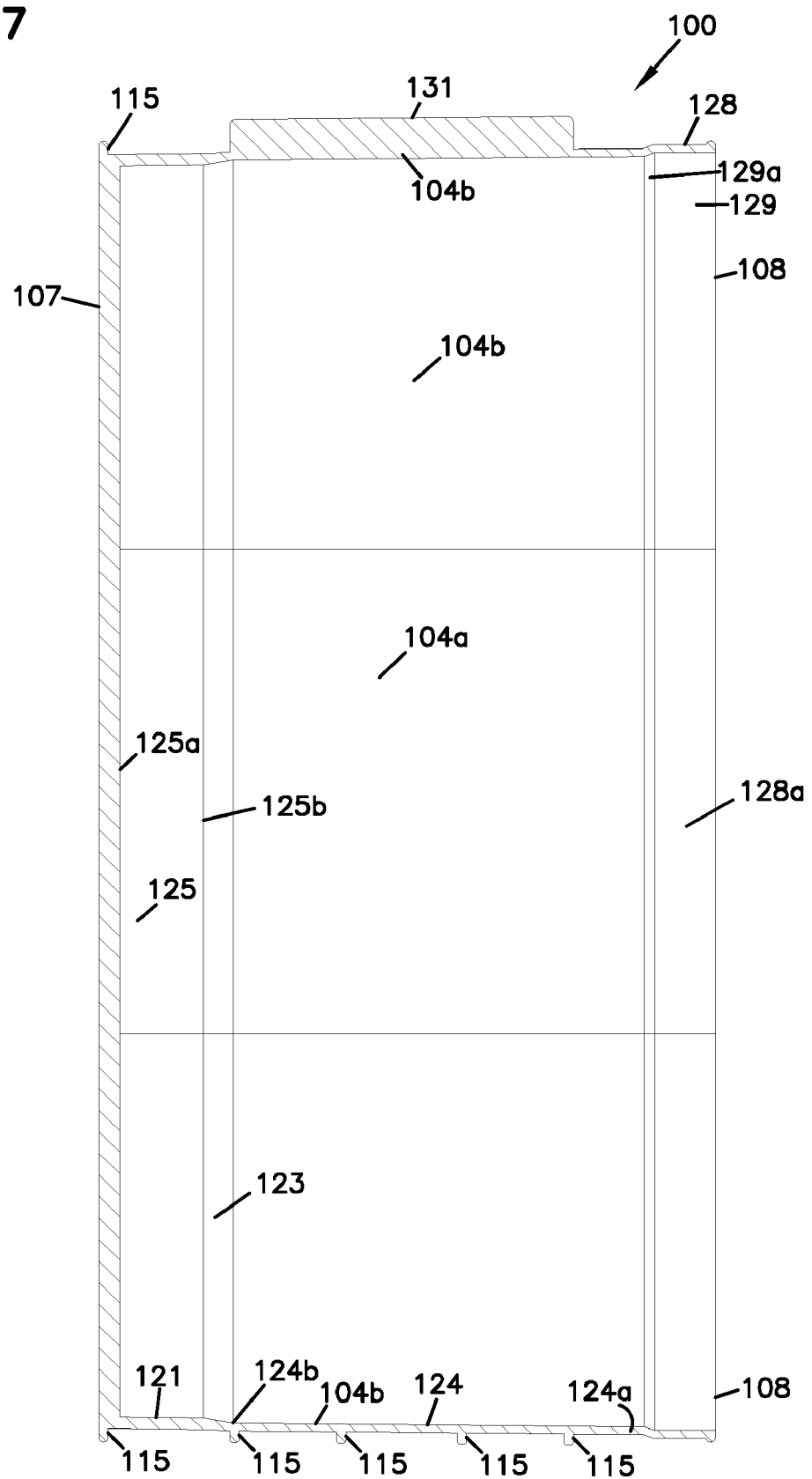

FIG.12
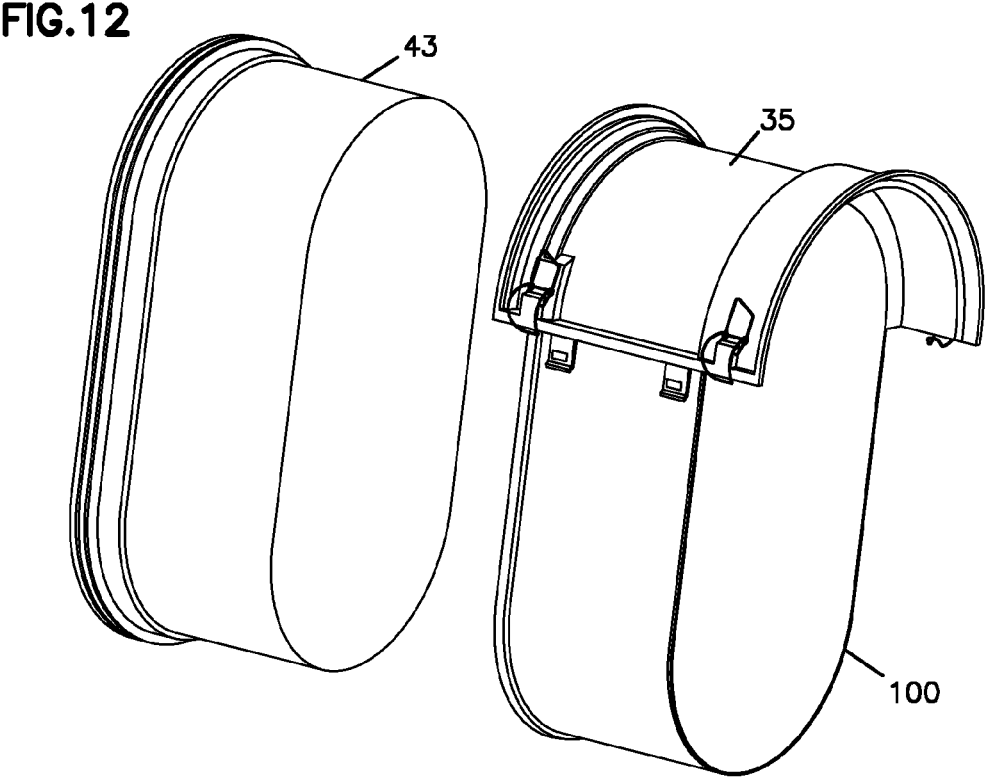
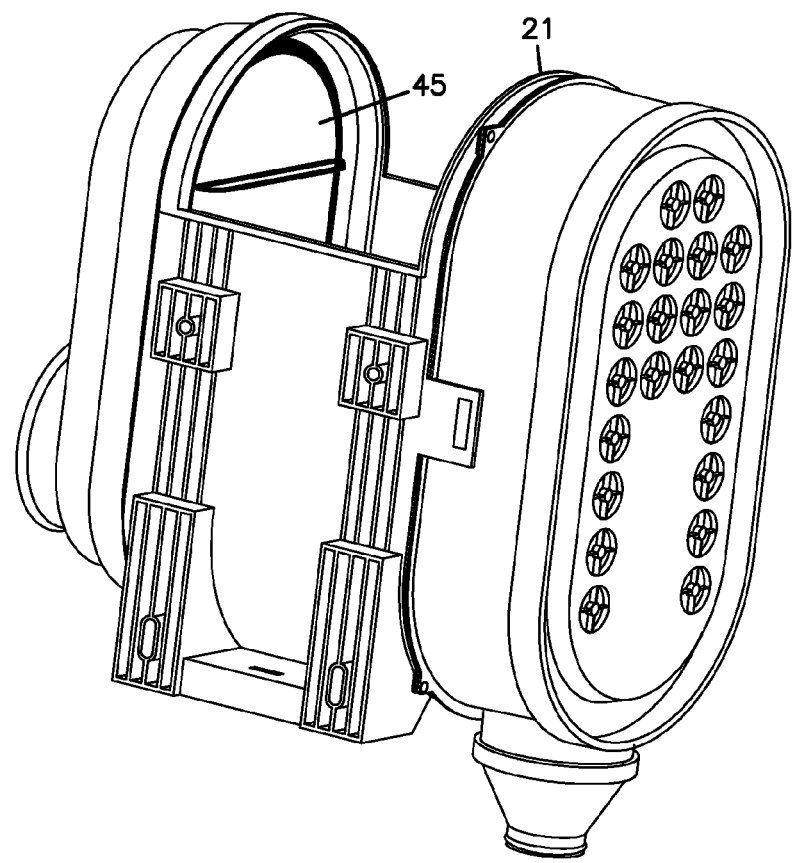

FIG.14
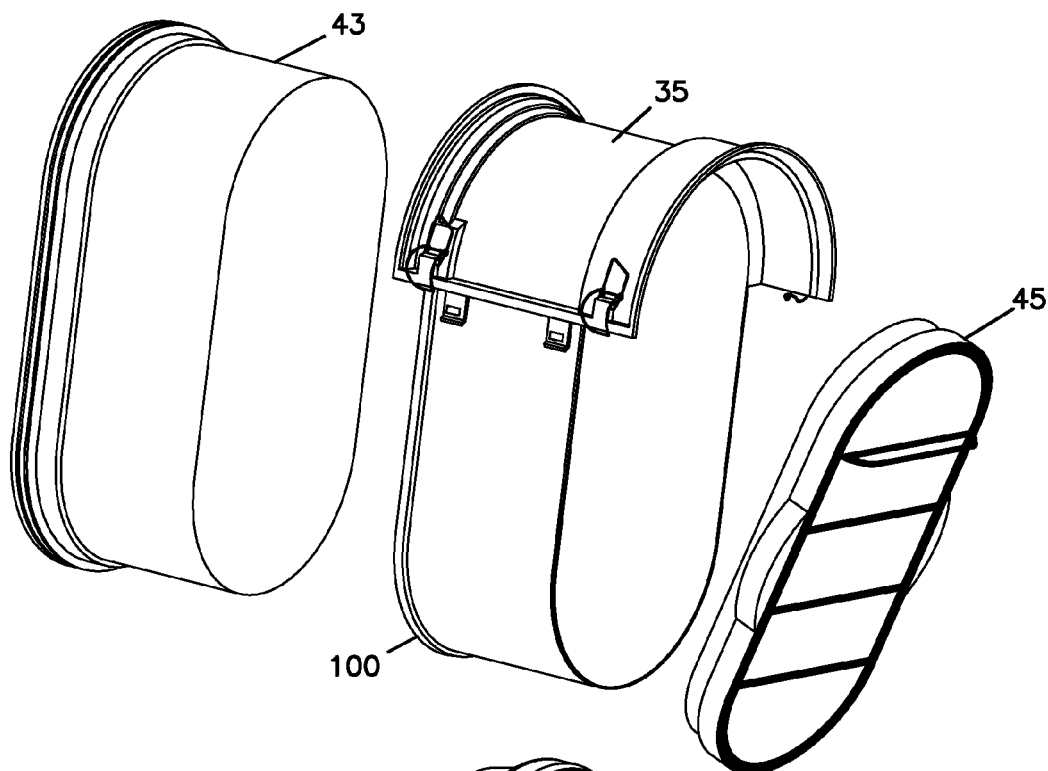
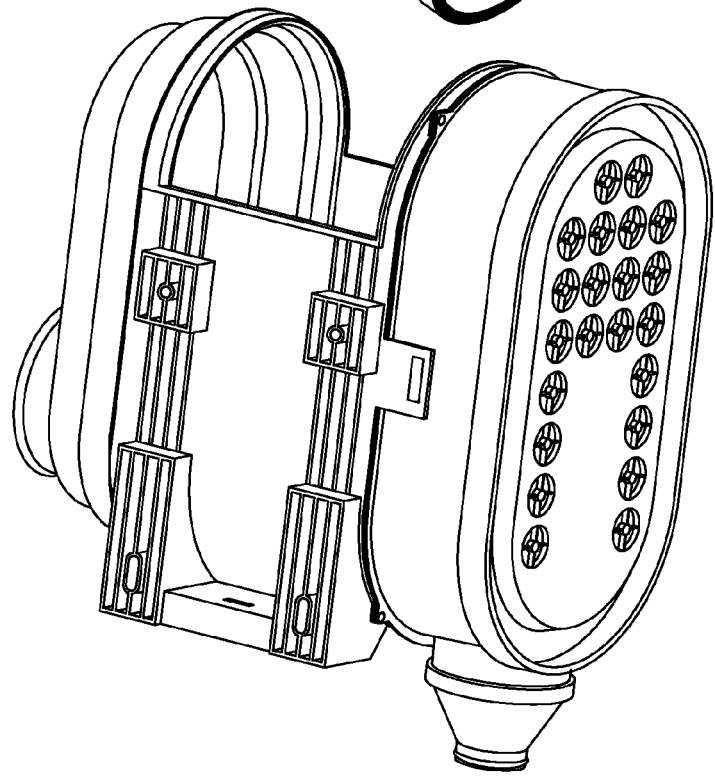

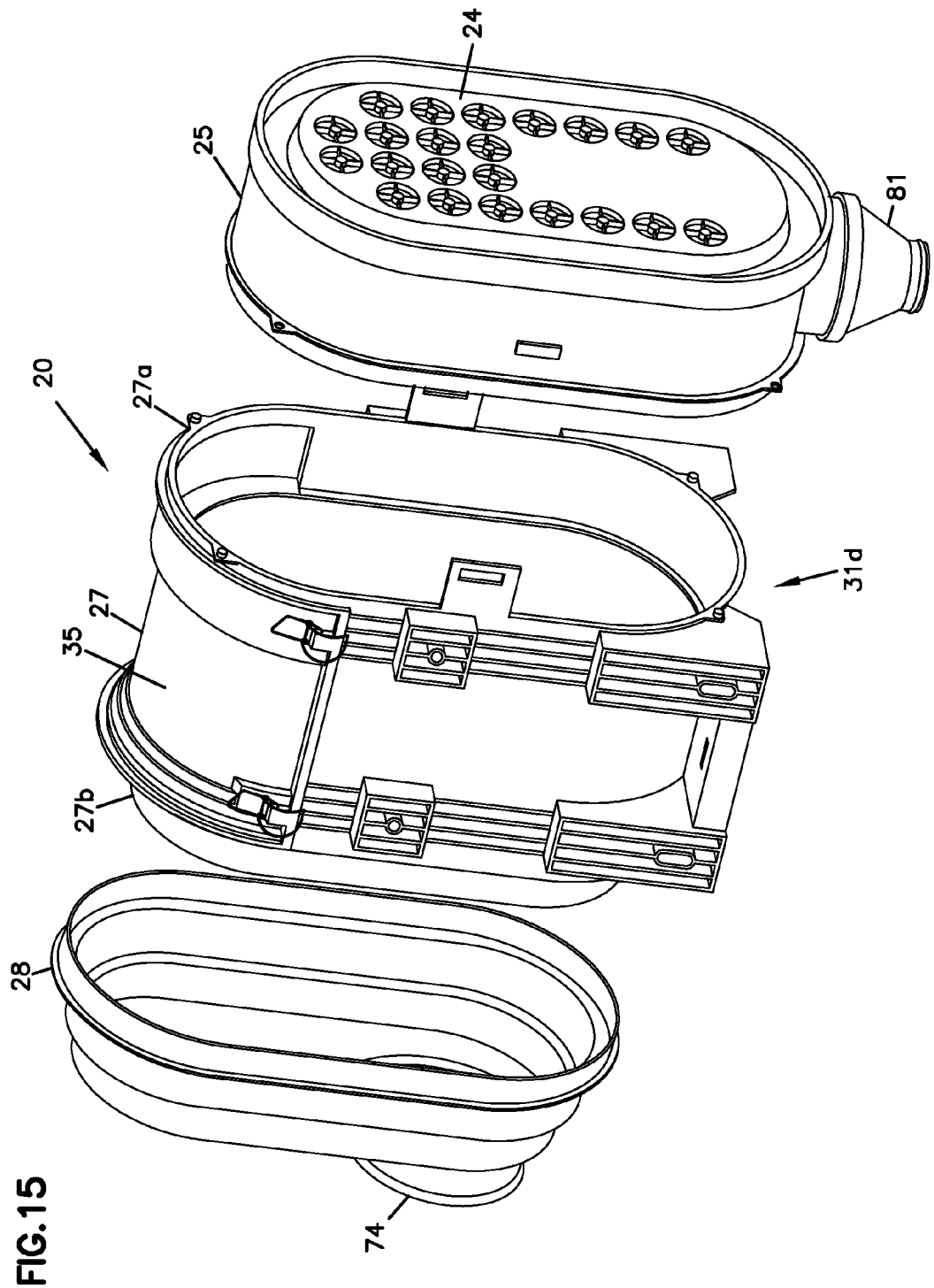

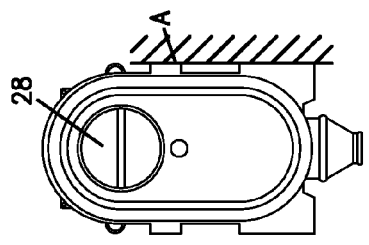
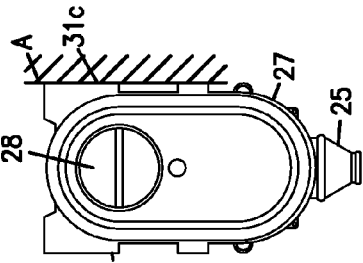
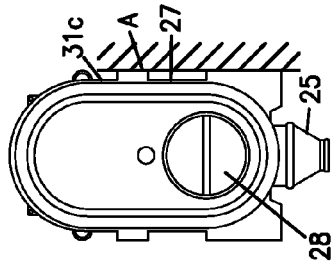
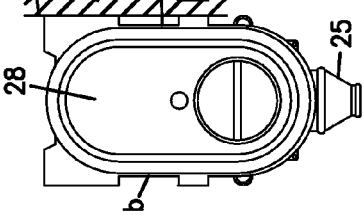
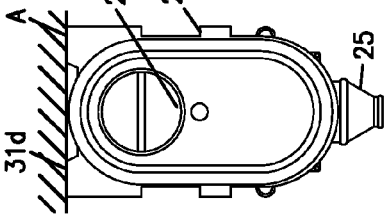
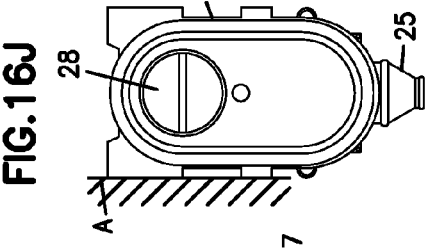
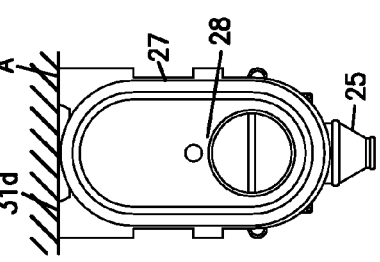
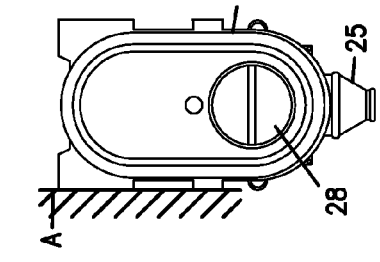
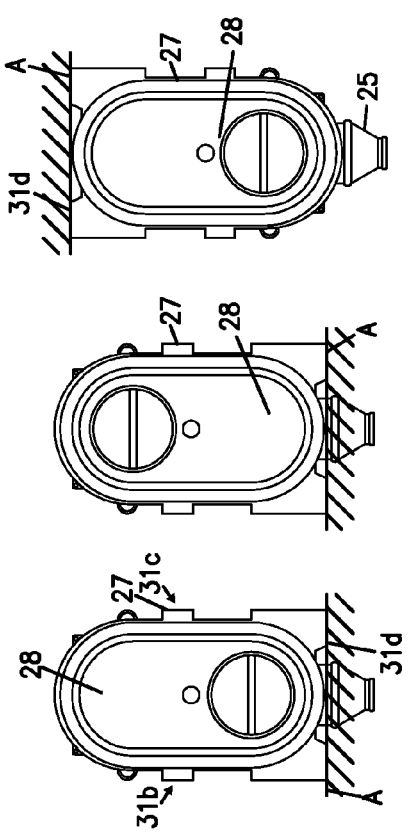
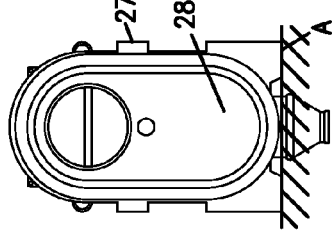
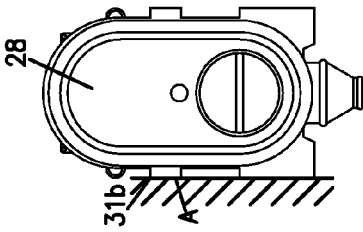

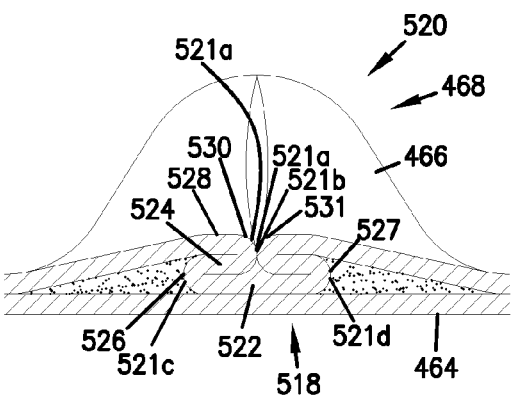
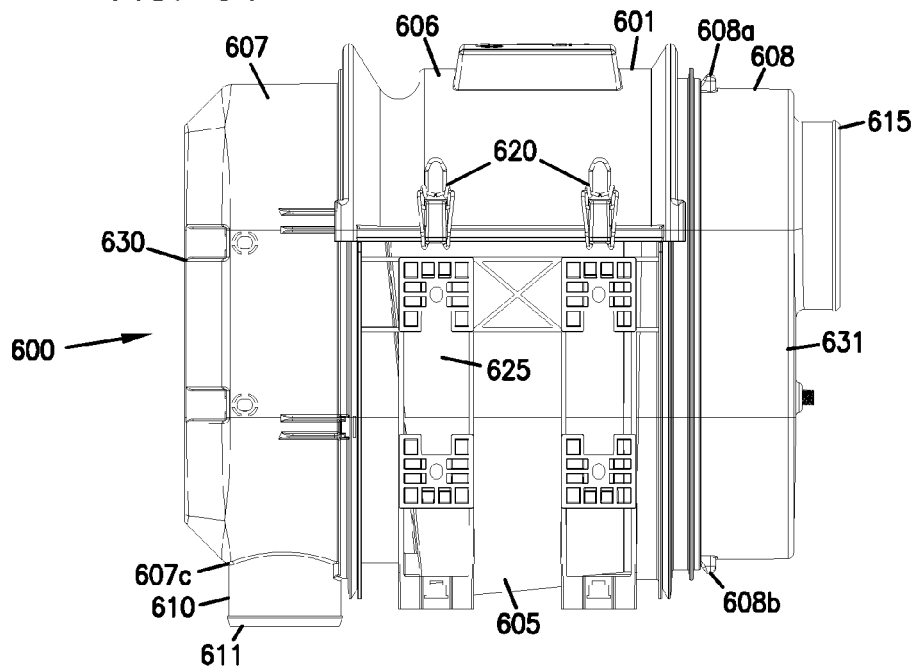
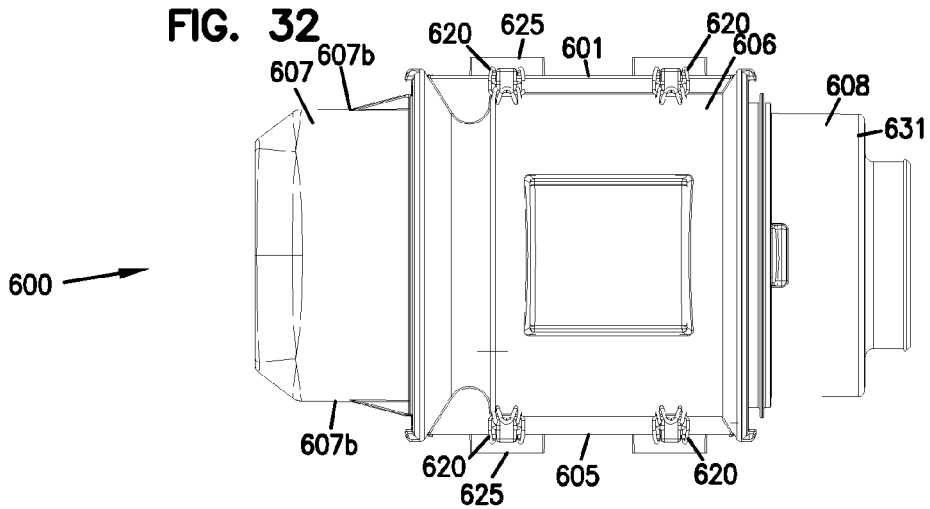

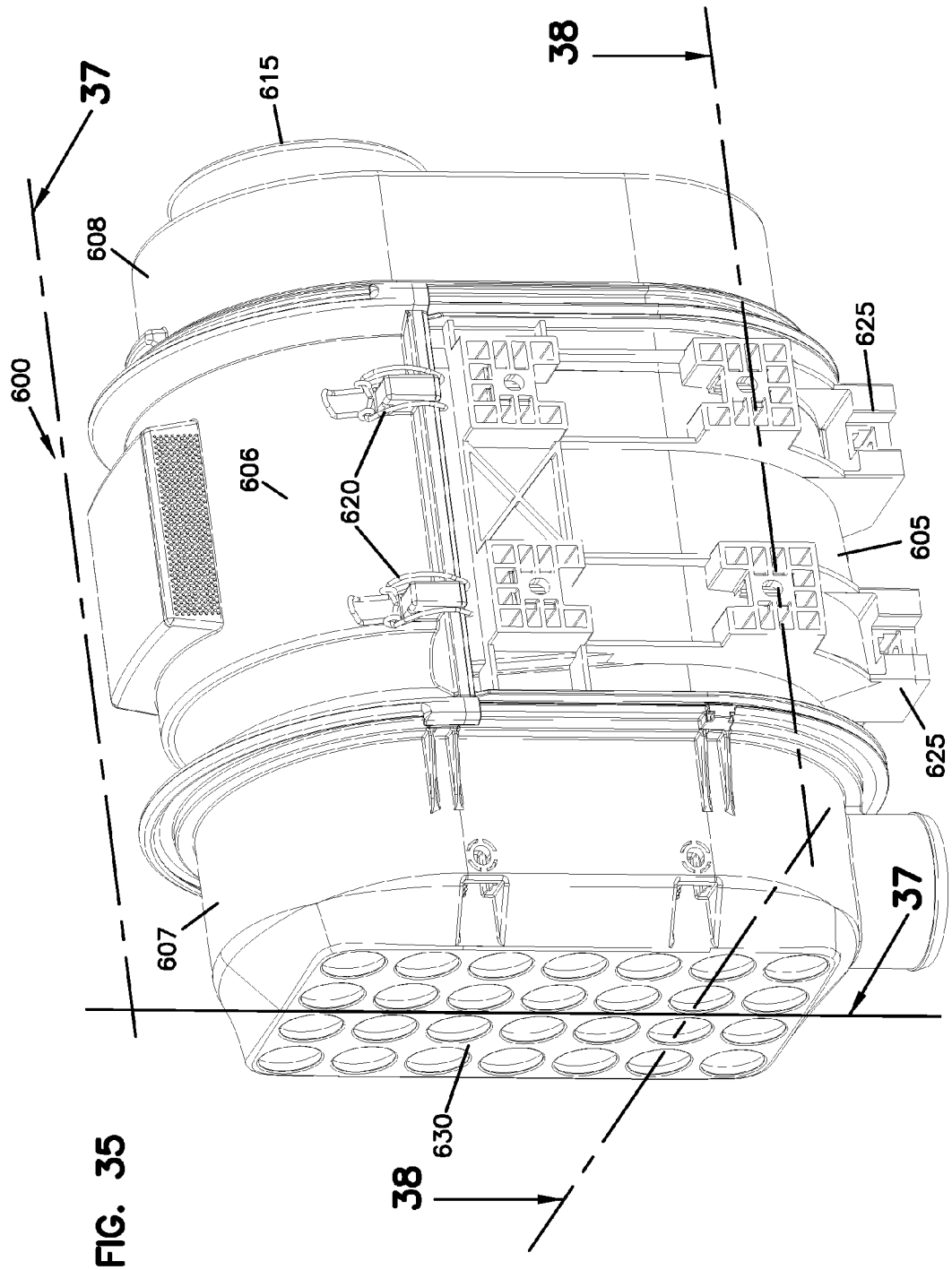

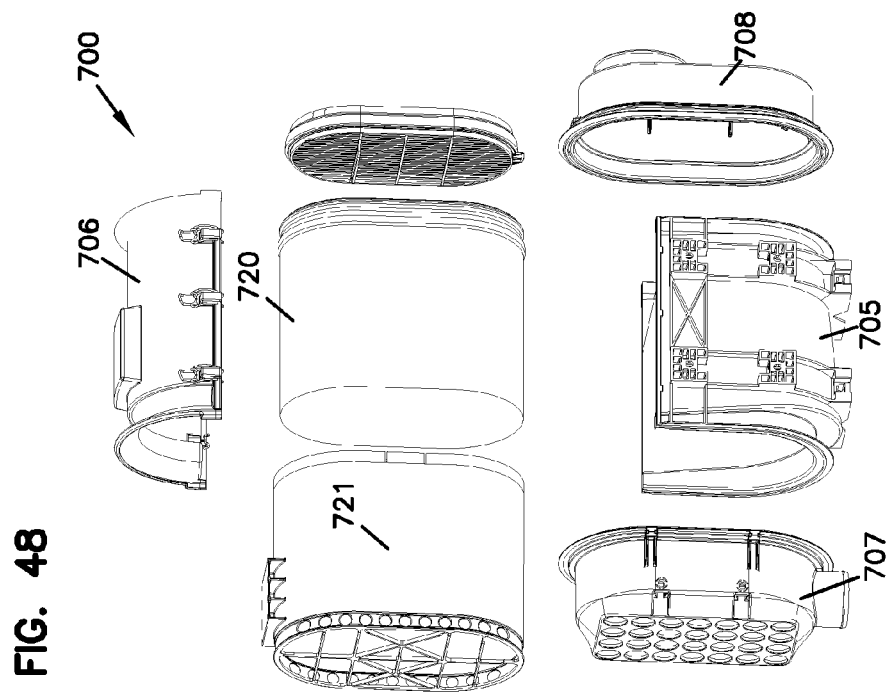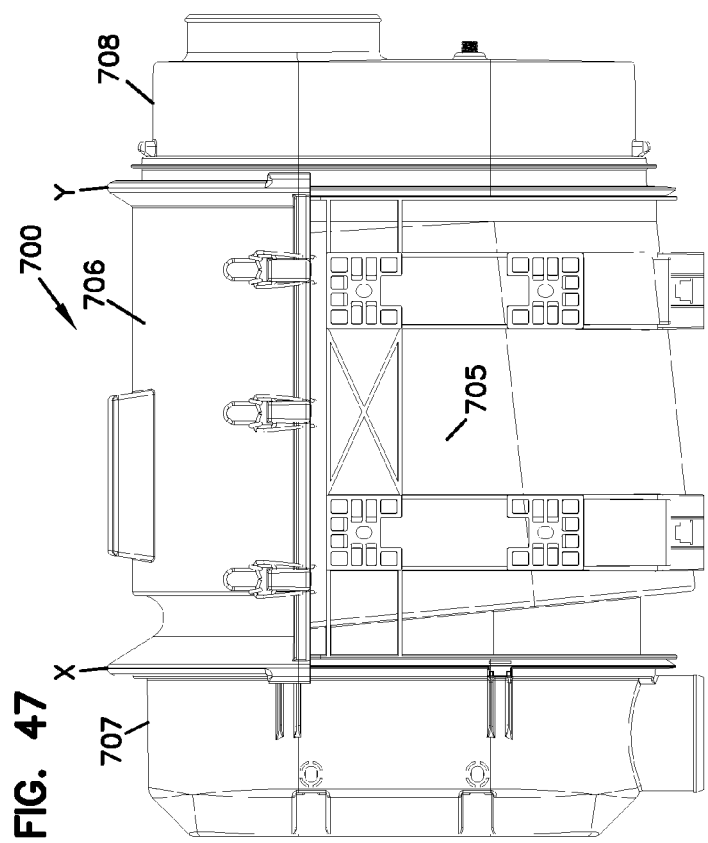

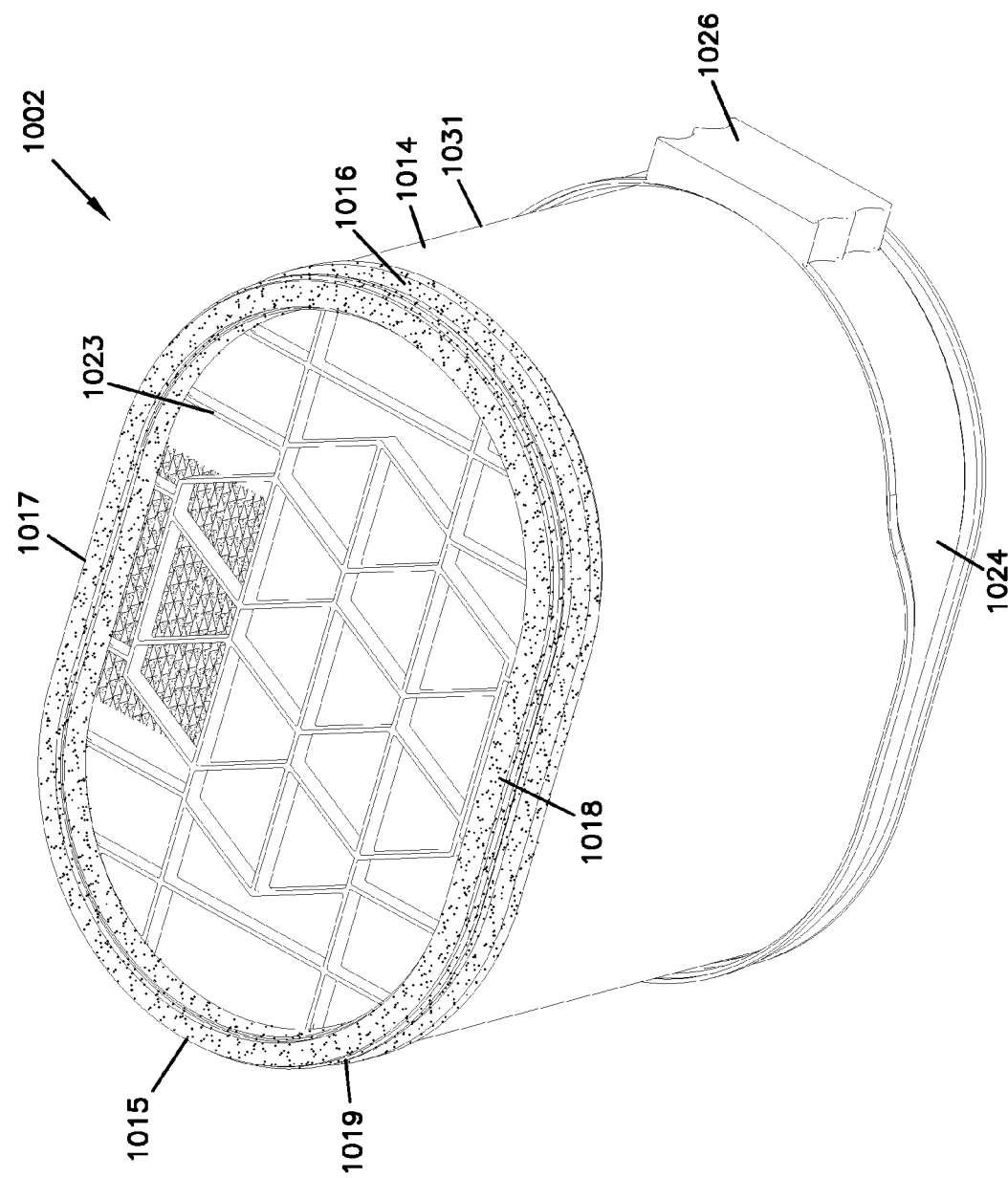

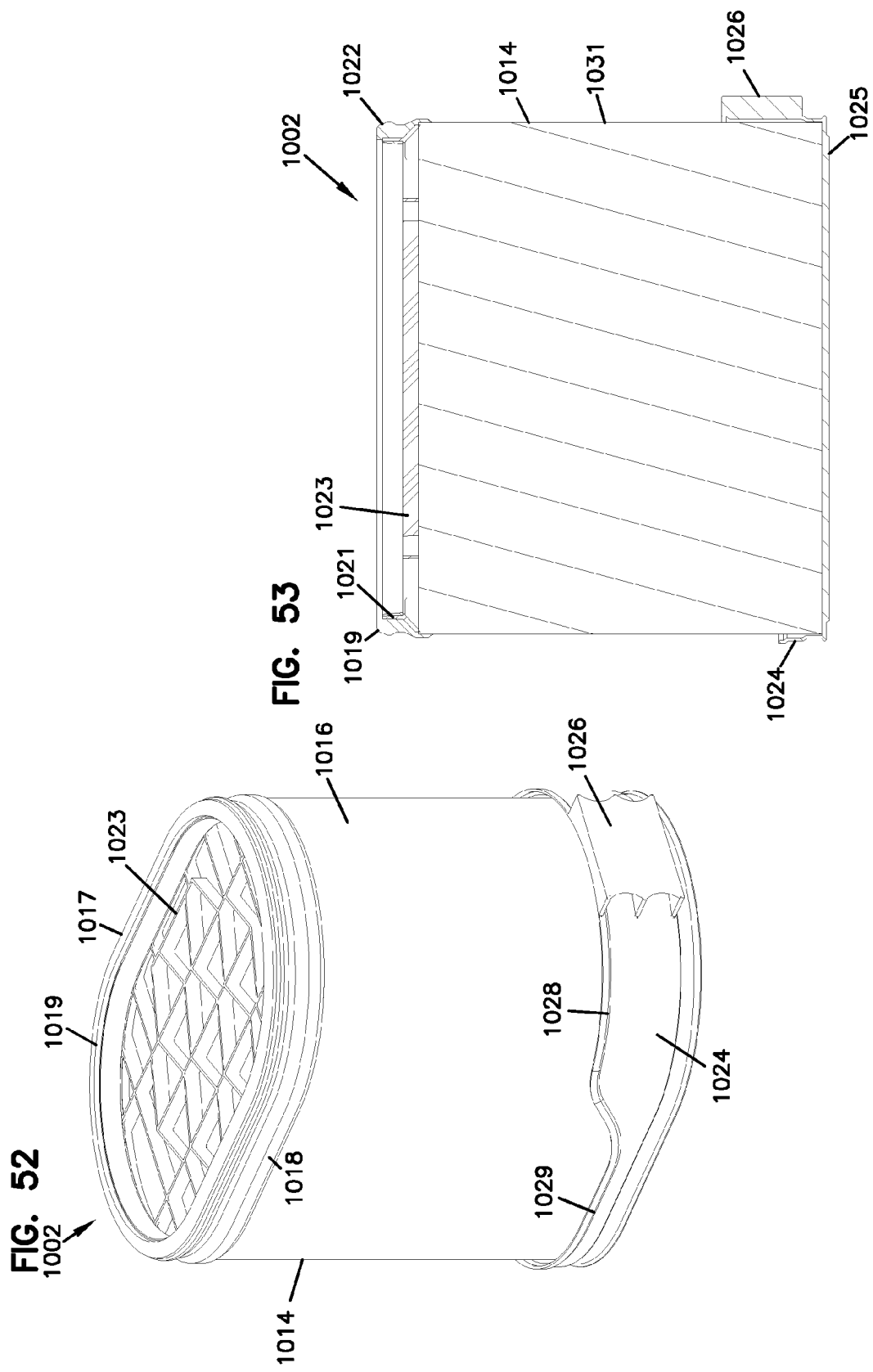

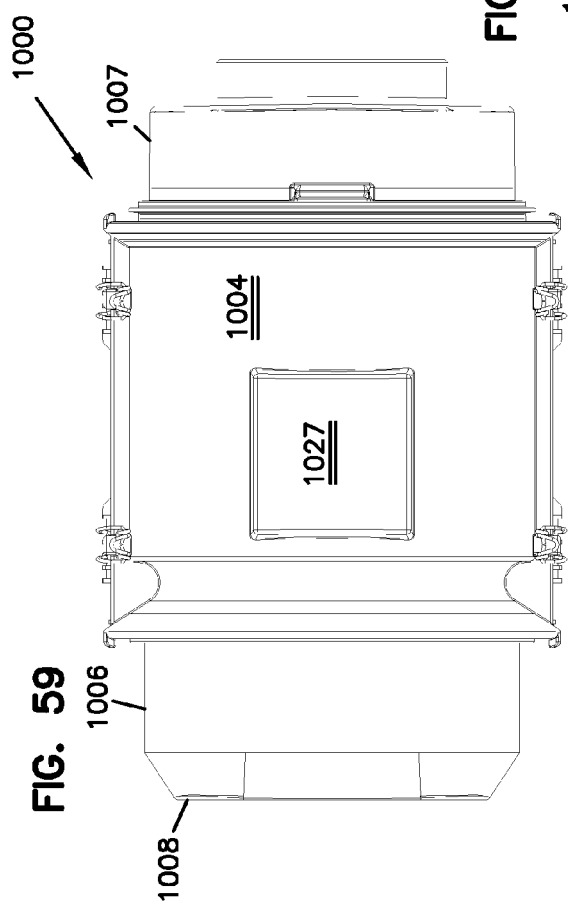
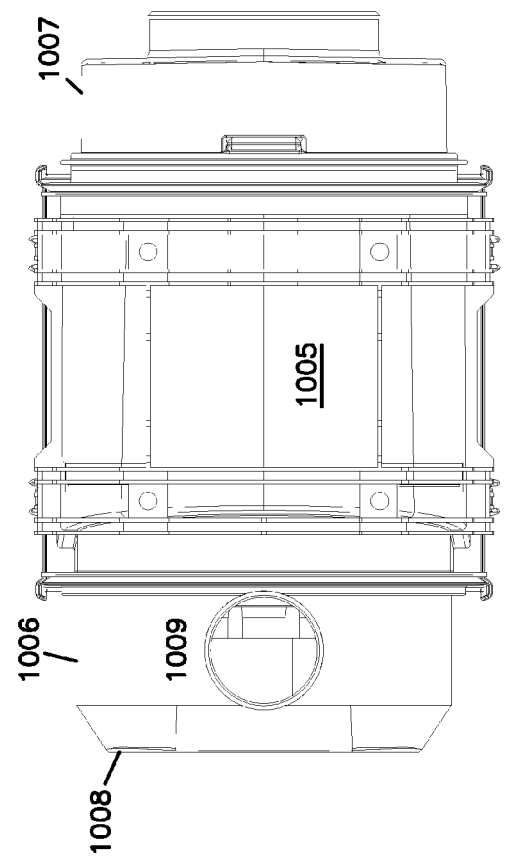

FILTER ARRANGEMENTS; HOUSINGS; ASSEMBLIES; AND, METHODS

The present application is a continuation of U.S. Ser. No. 11/587,882, filed Oct. 27, 2006, which has now issued as U.S. Pat. No. 7,906,936 as a U.S. National Stage filing of PCT/US2005/014909, filed Apr. 28, 2005. The PCT application claims priority to U.S. Provisional Patent Application 60/649,301 filed Feb. 1, 2005; U.S. Provisional Patent Application 60/604,549, filed Aug. 25, 2004, and U.S. Provisional Patent Application 60/567,121, filed Apr. 30, 2004. The complete disclosures of applications U.S. Ser. No. 11/587,882; PCT US2005/014909; provisionals 60/649,301; 60/604,549; 60/567,121; and, U.S. Ser. No. 11/587,882 are each incorporated herein by reference in its entirety. A claim of priority is made to U.S. Ser. No. 11/587,882 and the other identified PCT and U.S. provisional applications identified above, to the extent appropriate.

TECHNICAL FIELD

The present disclosure concerns air cleaners, for use, for example, for cleaning engine combustion air for vehicles and other equipment. The disclosure provides preferred components, assemblies and methods.

BACKGROUND

Gas streams often carry particulate material therein. In many instances it is desirable to remove some or all of the particulate material from the gas flow stream. For example, air intake streams to engines for motorized vehicles or power generation equipment often include particulate material therein. The particulate material, should it reach the internal workings of the mechanisms involved, can cause substantial damage. It is therefore preferred, for such systems, to remove the particulate material from the gas flow upstream of the engine or other equipment involved. A variety of air cleaner arrangements have been developed for particulate removal.

There has been a general trend for the utilization of air cleaner arrangements that utilize, as a media pack, z-filter media constructions. In general z-filter media constructions can be characterized as comprising a fluted sheet secured to a facing sheet, formed into a media pack configuration. Examples of z-filter arrangements are described in PCT Publication WO 97/40918, published Nov. 6, 1997; U.S. Pat. Nos. 6,190,432 and 6,350,291; PCT application US 04/07927, filed Mar. 17, 2004; U.S. Provisional application 60/532,783, filed Dec. 22, 2003; PCT Publication 03/095068, published Nov. 20, 2003; PCT publication WO 04/007054, published Jan. 22, 2004; PCT publication WO 03/084641, published Oct. 16, 2003; and, U.S. Provisional Application 60/543,804, filed Feb. 11, 2004; the complete disclosures of each of these cited references being incorporated herein by reference.

With some arrangements, it has been desired to develop configurations in which the z-filter media is loaded into an air cleaner housing through a side (as opposed to an end) of the housing. Such arrangements are described for example in WO 03/095068, incorporated herein by reference.

In general, improvements have been sought.

SUMMARY OF THE DISCLOSURE

According to the present disclosure, various features and techniques are provided, for advantageous use in air cleaner arrangements or as components for air cleaner arrangements. Some preferred components are provided, as well as assemblies which use those components. Also, methods of assembly, service and use are provided.

Specific componentry, techniques and configurations disclosed herein can be used together, as illustrated in the embodiments, to advantage. However they may be separately selected and used to create alternate advantageous arrangements. Thus, there is no specific requirement for arrangements according to the present disclosure, that all of the various advantageous features disclosed be present.

Among the advantageous features disclosed, is a band or cassette component useable within an air cleaner assembly. The cassette component is configured for advantageous receipt of a z-filter media pack therein, during use. The cassette component and media pack can be manually separable or permanently mounted. By the term "manually separable" and variants thereof, as used in the context, it is meant that the components can be separated under ordinary hand pressure, without damage to the cassette component, allowing the cassette component to be reused. When assembled together, the cassette component and the filter cartridge, will sometimes be referenced as a filter cartridge/cassette combination or by variants thereof.

Other advantageous features provided include an overall housing configuration with a mounting arrangement for advantage. One particular mounting arrangement disclosed is a boxed u-shaped arrangement, having three sides configured for mounting corresponding to two opposite sides and a base, of a boxed U. In this context, the term "boxed" is meant to refer to a u-shape formed with three straight mounting sides; i.e., two opposite parallel sides and a central base extending therebetween. Although alternatives are possible, in typical preferred arrangements shown, a side service access is provided in the air cleaner housing, at a location opposite the central base of the boxed u-shaped mounting arrangement.

Also provided is a modular configuration for an air cleaner including separately premade and then assemblable components corresponding to: an inlet section; a central or main air filter cartridge receiving section; an access cover; and, an outlet section. These components can be premade and then be assembled into an air cleaner. A typical preferred air cleaner would involve these components being molded from plastic, and then being welded or otherwise secured together to form the air cleaner housing.

A preferred safety element arrangement for use with a preferred air cleaner configuration according to the present disclosure is also provided. The safety element includes a handle arrangement for easy manual manipulation, and, also, a pivot projection for assistance in mounting.

Other preferred features, components and techniques will be apparent from the following drawings and detailed descriptions.

BRIEF DESCRIPTION OF THE DRAWINGS

FIG. 7 is a cross-sectional view taken along line 7-7, FIG. 5.

FIG. 12 is a view of the arrangement of FIG. 11, with a filter cartridge component separated from a cassette and cover component, both of which are shown removed from the air cleaner housing.

FIG. 14 depicts FIG. 13 with a safety filter fully removed.

FIG. 15 depicts the assembly of FIG. 8 with an outlet component and an inlet component shown separated, for an understanding of how they can be positioned alternately.

FIGS. 16A-X only showing some of the possible orientations.

FIG. 30 is a cross-sectional view of an optional end dart for media flutes useable in arrangements according to the present disclosure.

FIG. 31 is a side elevational view of a second air cleaner assembly embodying principles according to the present disclosure.

FIG. 32 is a top plan view of the air cleaner of FIG. 31.

FIG. 35 is a side perspective view of the air cleaner of FIG. 31.

FIG. 47 is a side elevational view of a third air cleaner assembly.

FIG. 48 is an exploded view of the air cleaner assembly of FIG. 47.

FIG. 51 is a perspective view of another embodiment of a filter cartridge.

FIG. 52 is an alternate perspective view of the filter cartridge depicted in FIG. 51.

FIG. 53 is a cross-sectional view of the filter cartridge depicted in FIGS. 51 and 52.

FIG. 59 is a top plan view of the air cleaner assembly of FIG. 54.

FIG. 60 is a bottom plan view of the air cleaner assembly of FIG. 54.

DETAILED DESCRIPTION

I. Z-Filter Media Configurations, Generally

Figure 1:
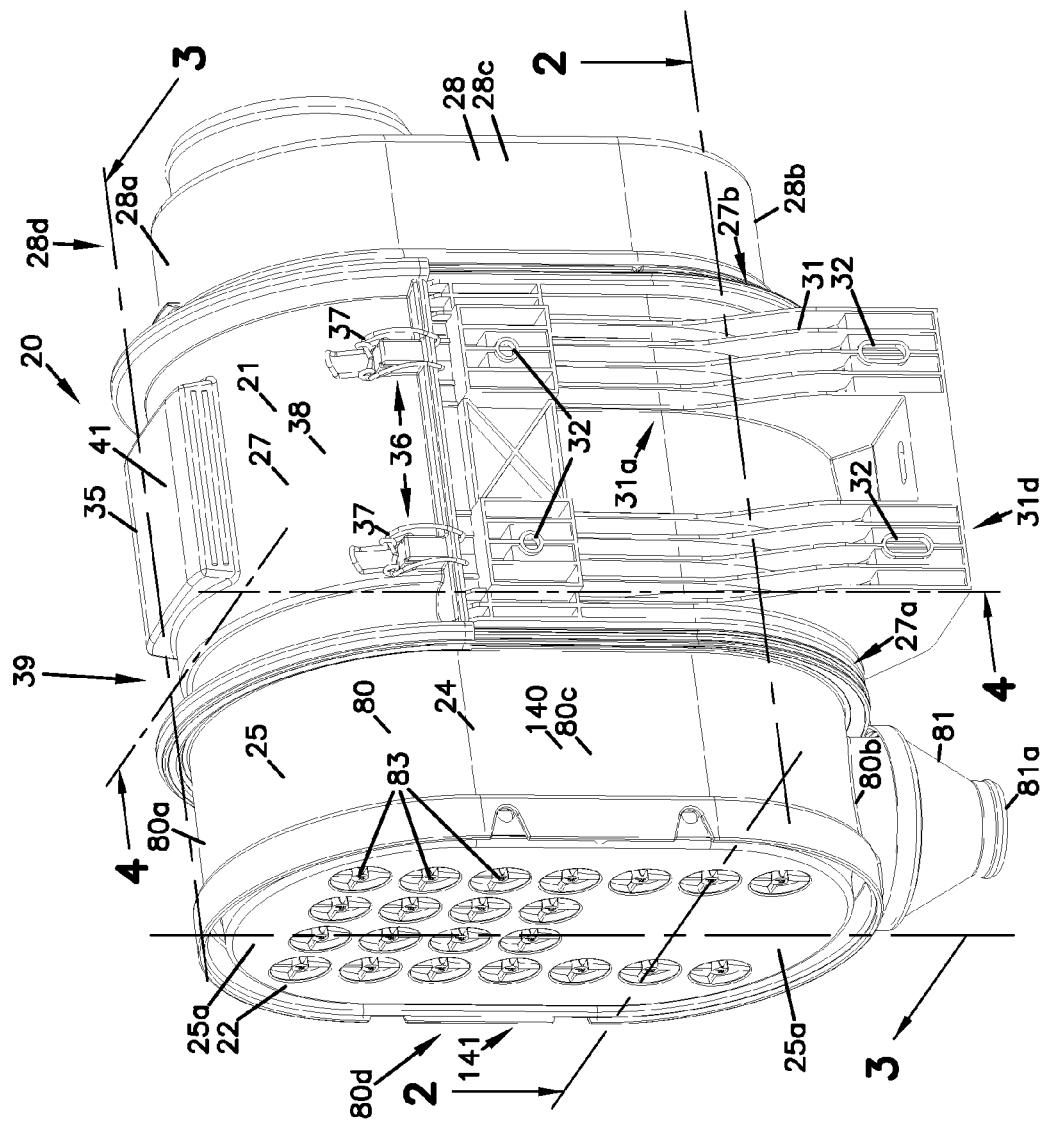
FIG. 1 is an inlet end perspective view of an air cleaner assembly according to the present disclosure.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895, 574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to facing media, are stacked on one another, to create a filter construction. An example of this is described in FIG. 11 of 5,820,646, incorporated herein by reference.

For specific applications as described herein, coiled arrangements are preferred. Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, each of which is incorporated herein by reference. The resulting coiled arrangement generally has, as the outer surface of the media pack, a portion of the facing sheet.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by such techniques as corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid cleaner. In some instances, each of the inlet flow end and outlet flow end will be generally flat or planar, with the two parallel to one another. However, variations from this, for example non-planar faces are possible.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to facing media with appropriate sealing to allow for definition of inlet and outlet flutes; or, such a media coiled or otherwise constructed or formed into a three dimensional network of inlet and outlet flutes; and/or, a filter construction including such media.

Figure 26:
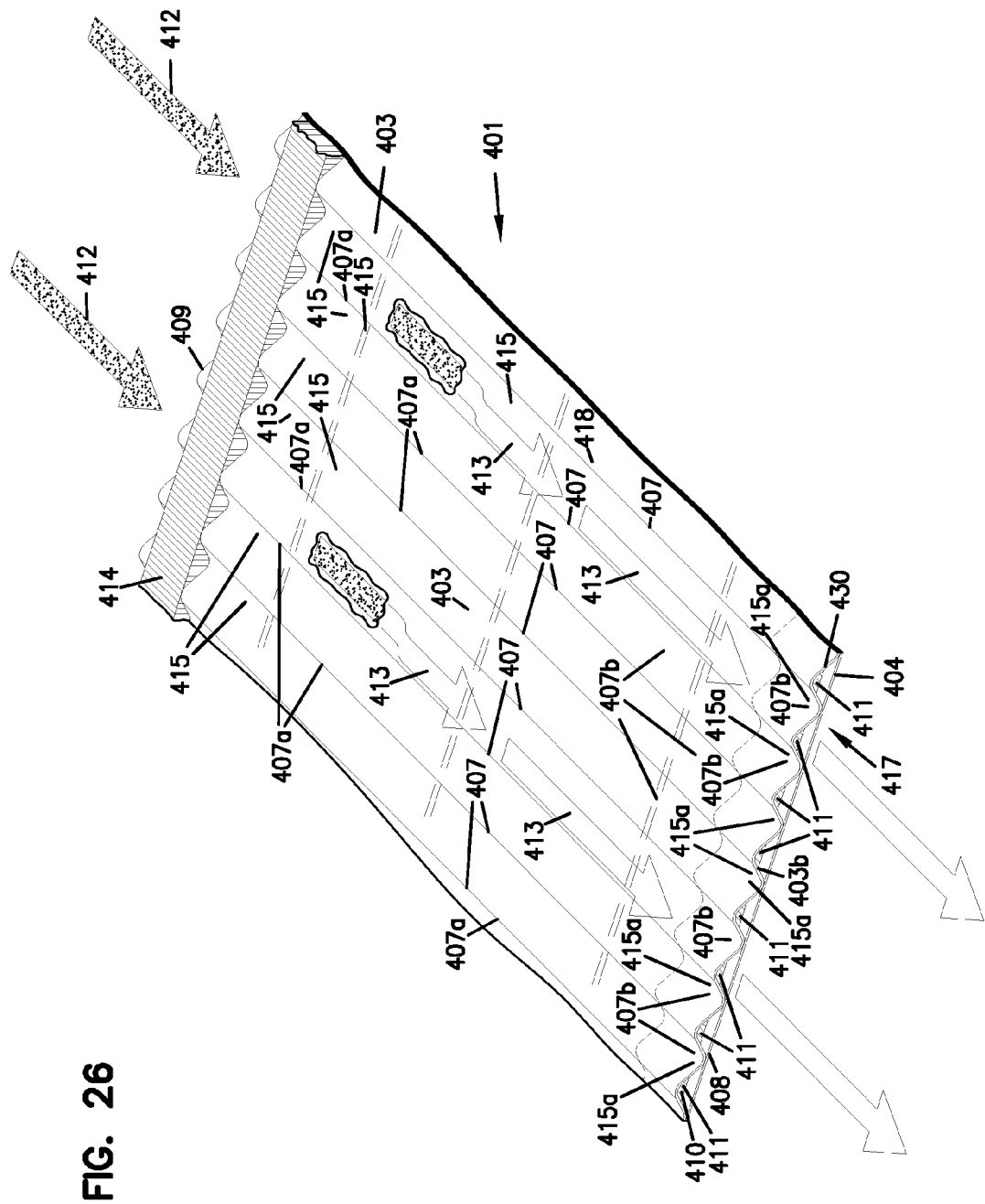
FIG. 26 is a second fragmentary, schematic, perspective view of z-filter media useable in arrangements according to the present disclosure.

In FIG. 26, an example of media 401 useable in z-filter media is shown. The media 401 is formed from a corrugated sheet 403 and a facing sheet 404.

In general, the corrugated sheet 403, FIG. 26, is of a type generally characterized herein as having a regular, curved, wave pattern of flutes or corrugations 407. The term "wave pattern" in this context, is meant to refer to a flute or corrugated pattern of alternating troughs 407b and ridges 407a. The term "regular" in this context is meant to refer to the fact that the pairs of troughs and ridges (407b, 407a) alternate with generally the same repeating corrugation (or flute) shape and size. (Also, typically in a regular configuration each trough 407b is substantially an inverse of each ridge 407a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 403 is flexible. With respect to the characterization of a repeating pattern, it is not meant that in any given filter construction, an equal number of ridges and troughs is necessarily present. The media 401 could be terminated, for example, between a pair comprising a ridge and a trough, or partially along a pair comprising a ridge and a trough. (For example, in FIG. 26 the media 401 depicted in fragmentary has eight complete ridges 407a and seven complete troughs 407b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 407a of each ridge and the bottom 407b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 26, for the corrugated sheet 403, is that at approximately a midpoint 430 between each trough and each adjacent ridge, along most of the length of the flutes 407, is located a transition region where the curvature inverts. For example, viewing back side or face 403a, FIG. 26, trough 407b is a concave region, and ridge 407a is a convex region. Of course when viewed toward front side or face 403b, trough 407b of side 403a forms a ridge; and, ridge 407a of face 403a, forms a trough. (In some instances, region 430 can be a straight segment, instead of a point, with curvature inverting at ends of the straight segment 430.)

A characteristic of the particular regular, curved, wave pattern corrugated sheet 403 shown in FIG. 26, is that the individual corrugations are generally straight. By "straight" in this context, it is meant that through at least 70% (typically at least 80%) of the length between edges 408 and 409, the ridges 407a and troughs 407b do not change substantially in cross-section. The term "straight" in reference to corrugation pattern shown in FIG. 26, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 26 and as referenced above, the media 401 has first and second opposite edges 408 and 409. When the media 401 is coiled and formed into a media pack, in general edge 409 will form an inlet end for the media pack and edge 408 an outlet end, although an opposite orientation is possible.

Adjacent edge 408 is provided sealant, in this instance in the form of a sealant bead 410, sealing the corrugated (fluted) sheet 403 and the facing sheet 404 together. Bead 410 will sometimes be referred to as a "single facer" bead, when it is applied as a bead between the corrugated sheet 403 and facing sheet 404, to form the single facer or media strip 401. Sealant bead 410 seals closed individual flutes 411 adjacent edge 408, to passage of air therefrom.

Adjacent edge 409, is provided sealant, in this instance in the form of a seal bead 414. Seal bead 414 generally closes flutes 415 to passage of unfiltered fluid therein, adjacent edge 409. Bead 414 would typically be applied as the media 401 is coiled about itself, with the corrugated sheet 403 directed to the inside. Thus, bead 414 will form a seal between a back side 417 of facing sheet 404, and side 418 of the corrugated sheet 403. The bead 414 will sometimes be referred to as a "winding bead" when it is applied as the strip 401 is coiled into a coiled media pack. If the media 401 were cut in strips and stacked, instead of coiled, bead 414 would be a "stacking bead."

Referring to FIG. 26, once the media 401 is incorporated into a media pack, for example by coiling or stacking, it can be operated as follows. First, air in the direction of arrows 412, would enter open flutes 411 adjacent end 409. Due to the closure at end 408, by bead 410, the air would pass through the media shown by arrows 413. It could then exit the media pack, by passage through open ends 415a of the flutes 415, adjacent end 408 of the media pack. Of course operation could be conducted with air flow in the opposite direction. The media pack is closed to unfiltered air flow therethrough.

For the particular arrangement shown herein in FIG. 26, the parallel corrugations 407a, 407b are generally straight completely across the media, from edge 408 to edge 409. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 403, facing sheet 404 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 27:
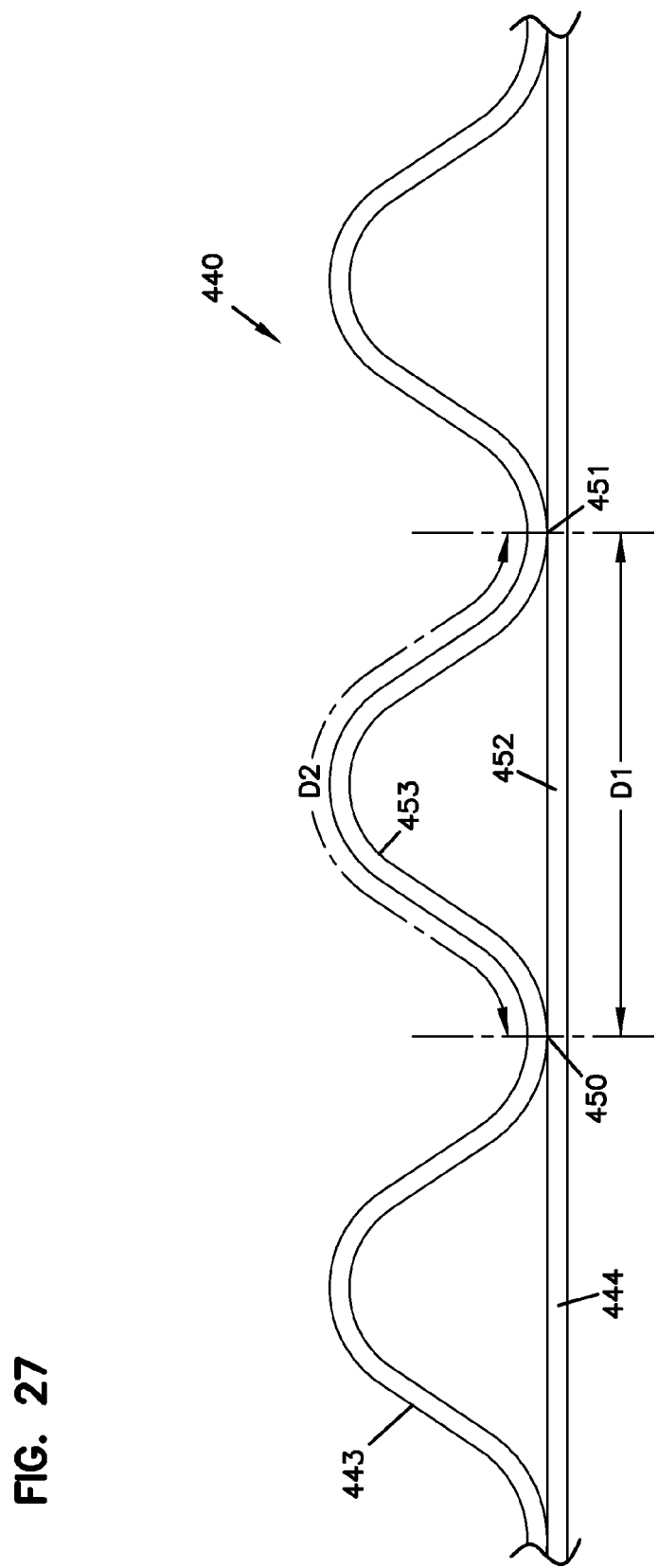
FIG. 27 is a schematic, cross-sectional view of a portion of the media depicted in FIG. 26.

Attention is now directed to FIG. 27, in which a z-filter media construction 440 utilizing a regular, curved, wave pattern corrugated sheet 443, and a non-corrugated facing sheet 444, is depicted. The distance D1, between points 450 and 451, defines the extension of facing media 444 in region 452 underneath a given corrugated flute 453. The length D2 of the arcuate media for the corrugated flute 453, over the same distance D1 is of course larger than D1, due to the shape of the corrugated flute 453. For a typical regular shaped media used in fluted filter applications, the linear length D2 of the media 453 between points 450 and 451 will generally be at least 1.2 times D1. Typically, D2 would be within a range of 1.2-2.0 time D1, inclusive. One particularly convenient arrangement for air filters has a configuration in which D2 is about 1.25–1.35×D1. Such media has, for example, been used commercially in Donaldson Powercore™ Z-filter arrangements. Herein the ratio D2/D1 will sometimes be characterized as the flute/flat ratio or media draw for the corrugated (fluted) media.

Figure 28:
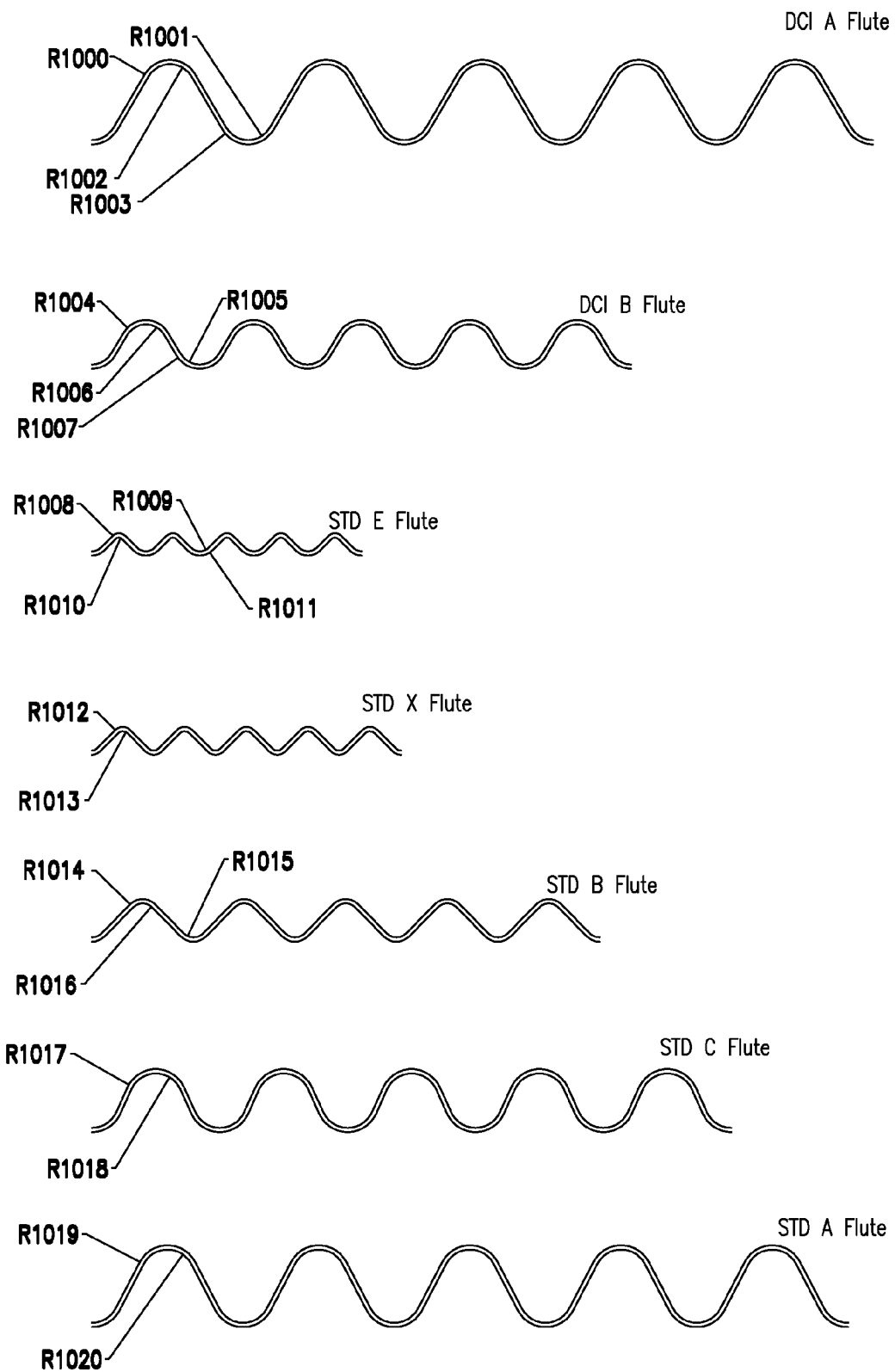
FIG. 28 is a schematic view of examples of various corrugated media definitions.

In the corrugated cardboard industry, various standard flutes have been defined. For example the standard E flute, standard X flute, standard B flute, standard C flute and standard A flute. FIG. 28, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 28.

TABLE A (Flute definitions for FIG. 28)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

II. Manufacture of Coiled Media Configurations Using Fluted Media, Generally

Figure 29:
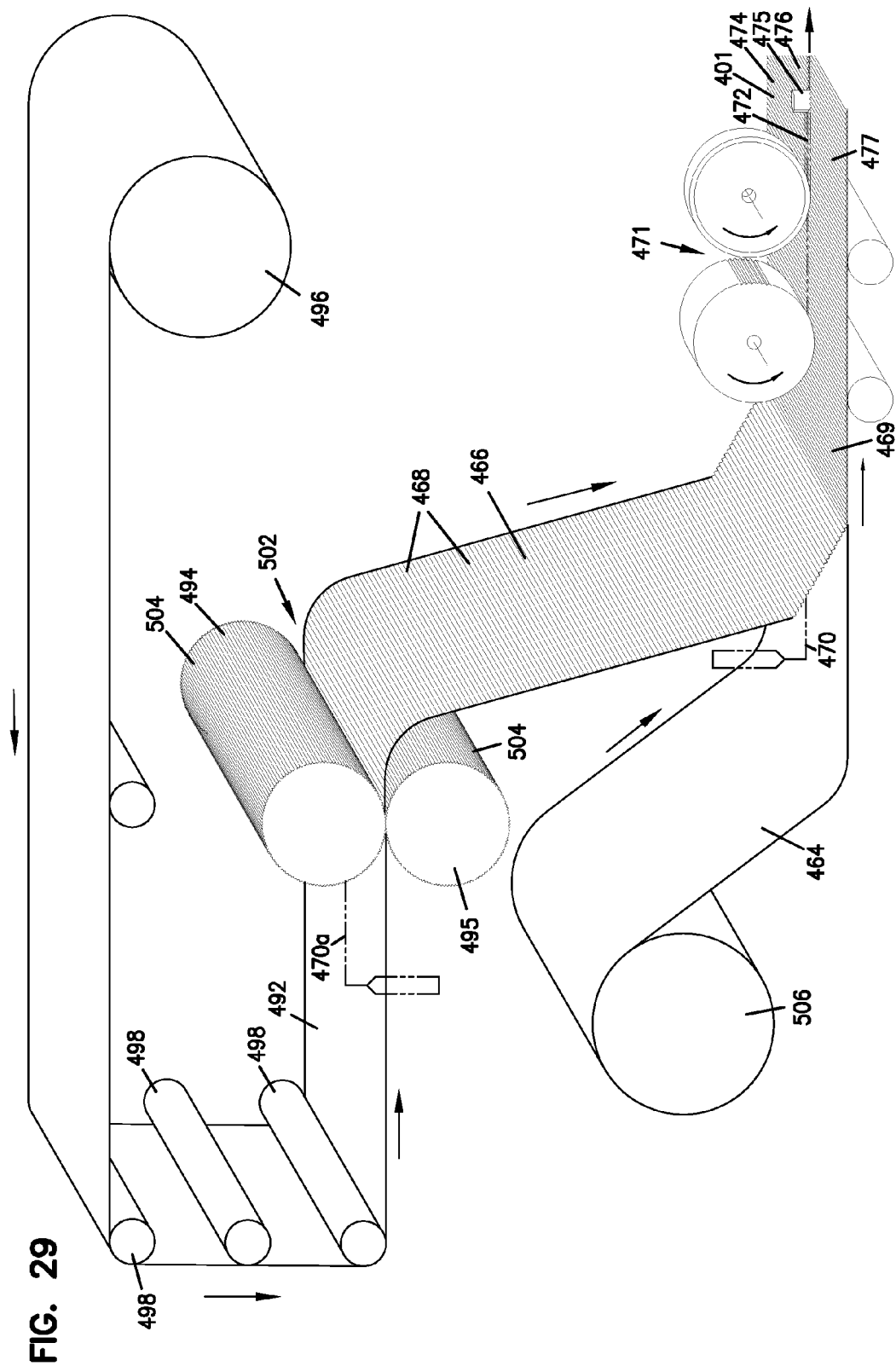
FIG. 29 is a schematic view of a process for manufacturing media according to the present disclosure.

In FIG. 29, one example of a manufacturing process for making a media strip corresponding to strip 401, FIG. 26 is shown. In general, facing sheet 464 and the fluted (corrugated) sheet 466 having flutes 468 are brought together to form a media web 469, with an adhesive bead located therebetween at 470. The adhesive bead 470 will form a single facer bead 410, FIG. 26. An optional darting process occurs at station 471 to form center darted section 472 located mid-web. The z-filter media or Z-media strip 474 can be cut or slit at 475 along the bead 470 to create two pieces 476, 477 of z-filter media 474, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 29 are described in PCT WO 04/007054, published Jan. 22, 2004 incorporated herein by reference.

Still in reference to FIG. 29, before the z-filter media 474 is put through the darting station 471 and eventually slit at 475, it must be formed. In the schematic shown in FIG. 29, this is done by passing a sheet of media 492 through a pair of corrugation rollers 494, 495. In the schematic shown in FIG. 29, the sheet of media 492 is unrolled from a roll 496, wound around tension rollers 498, and then passed through a nip or bite 502 between the corrugation rollers 494, 495. The corrugation rollers 494, 495 have teeth 504 that will give the general desired shape of the corrugations after the flat sheet 492 passes through the nip 502. After passing through the nip 502, the sheet 492 becomes corrugated across the machine direction and is referenced at 466 as the corrugated sheet. The corrugated sheet 466 is then secured to facing sheet 464. (The corrugation process may involve heating the media, in some instances.)

Still in reference to FIG. 29, the process also shows the facing sheet 464 being routed to the darting process station 471. The facing sheet 464 is depicted as being stored on a roll 506 and then directed to the corrugated sheet 466 to form the Z-media 474. The corrugated sheet 466 and the facing sheet 464 are secured together by adhesive or by other means (for example by sonic welding).

Referring to FIG. 29, an adhesive line 470 is shown used to secure corrugated sheet 466 and facing sheet 464 together, as the sealant bead. Alternatively, the sealant bead for forming the facing bead could be applied as shown as 470a. If the sealant is applied at 470a, it may be desirable to put a gap in the corrugation roller 495, and possibly in both corrugation rollers 494, 495, to accommodate the bead 470a.

The type of corrugation provided to the corrugated media is a matter of choice, and will be dictated by the corrugation or corrugation teeth of the corrugation rollers 494, 495. One preferred corrugation pattern will be a regular curved wave pattern corrugation of straight flutes, as defined herein above. A typical regular curved wave pattern used, would be one in which the distance D2, as defined above, in a corrugated pattern is at least 1.2 times the distance D1 as defined above. In one preferred application, typically D2=1.25–1.35×D1. In some instances the techniques may be applied with curved wave patterns that are not "regular," including, for example, ones that do not use straight flutes.

As described, the process shown in FIG. 29 can be used to create the center darted section 472. FIG. 30 shows, in cross-section, one of the flutes 468 after darting and slitting.

A fold arrangement 518 can be seen to form a darted flute 520 with four creases 521a, 521b, 521c, 521d. The fold arrangement 518 includes a flat first layer or portion 522 that is secured to the facing sheet 464. A second layer or portion 524 is shown pressed against the first layer or portion 522. The second layer or portion 524 is preferably formed from folding opposite outer ends 526, 527 of the first layer or portion 522.

Still referring to FIG. 30, two of the folds or creases 521a, 521b will generally be referred to herein as "upper, inwardly directed" folds or creases. The term "upper" in this context is meant to indicate that the creases lie on an upper portion of the entire fold 520, when the fold 520 is viewed in the orientation of FIG. 30. The term "inwardly directed" is meant to refer to the fact that the fold line or crease line of each crease 521a, 521b, is directed toward the other.

In FIG. 30, creases 521c, 521d, will generally be referred to herein as "lower, outwardly directed" creases. The term "lower" in this context refers to the fact that the creases 521c, 521d are not located on the top as are creases 521a, 521b, in the orientation of FIG. 30. The term "outwardly directed" is meant to indicate that the fold lines of the creases 521c, 521d are directed away from one another.

The terms "upper" and "lower" as used in this context are meant specifically to refer to the fold 520, when viewed from the orientation of FIG. 30. That is, they are not meant to be otherwise indicative of direction when the fold 520 is oriented in an actual product for use.

Based upon these characterizations and review of FIG. 30, it can be seen that a preferred regular fold arrangement 518 according to FIG. 30 in this disclosure is one which includes at least two "upper, inwardly directed, creases." These inwardly directed creases are unique and help provide an overall arrangement in which the folding does not cause a significant encroachment on adjacent flutes.

A third layer or portion 528 can also be seen pressed against the second layer or portion 524. The third layer or portion 528 is formed by folding from opposite inner ends 530, 531 of the third layer 528.

Another way of viewing the fold arrangement 518 is in reference to the geometry of alternating ridges and troughs of the corrugated sheet 466. The first layer or portion 522 is formed from an inverted ridge. The second layer or portion 524 corresponds to a double peak (after inverting the ridge) that is folded toward, and in preferred arrangements folded against, the inverted ridge.

Techniques for providing the optional dart described in connection with FIG. 30, in a preferred manner, are described in PCT WO 04/007054, incorporated herein by reference. Techniques for coiling the media, with application of the winding bead, are described in PCT application US 04/07927, filed Mar. 17, 2004 and incorporated herein by reference.

Techniques described herein are particularly well adapted for use with media packs that result from coiling a single sheet comprising a corrugated sheet/facing sheet combination, i.e., a "single facer" strip. Certain of the techniques can be applied with arrangements that, instead of being formed by coiling, are formed from a plurality of strips of single facer.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927.

Another way of describing the peripheral or perimeter shape is by defining the perimeter resulting from taking a cross-section through the media pack in a direction orthogonal to the winding axis of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack. Examples of such media pack arrangements are shown in U.S. Provisional Application 60/578,482, filed Jun. 8, 2004, incorporated herein by reference.

The flute seals (for example from the single facer bead, winding bead or stacking bead) can be formed from a variety of materials. In various ones of the cited and incorporated references, hot melt or polyurethane seals are described as possible for various applications. Such materials are also useable for arrangements as characterized herein.

III. Example System and Overview of Air Cleaner

Figure 18:
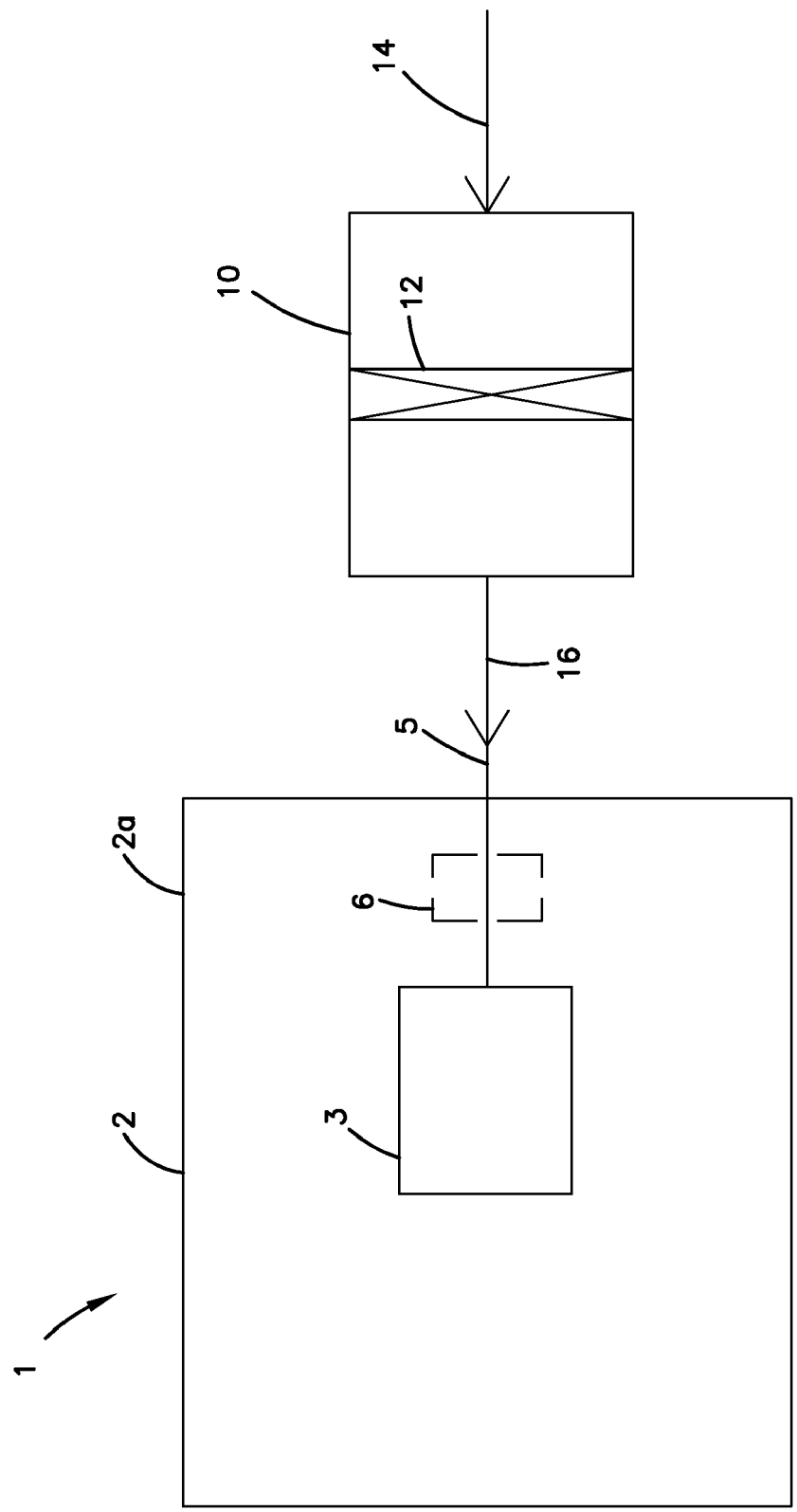
FIG. 18 is a schematic depiction of a system including an air cleaner.

The principles and arrangements described herein are useable in a variety of systems. One particular system is depicted schematically in FIG. 18, generally at 1. In FIG. 18, equipment 2, such as a vehicle 2a having an engine 3 with some defined rated air flow demand, for example in the range of 50 cfm to 2000 cfm, is shown schematically. The equipment 2 may, for example, comprise a bus, an over-the-highway truck, an off-road vehicle, a tractor, a light-duty or medium-duty truck, or a marine vehicle such as a power boat. The engine 3 powers the equipment 2 upon fuel combustion. In FIG. 18, air flow is shown drawn into the engine 3 at an air intake at region 5. An optional turbo 6 is shown in phantom, as optionally boosting the air intake to the engine 3. The turbo 6 is shown downstream from an air cleaner 10. The air cleaner 10 has a filter cartridge 12 and is shown in the air inlet stream to the engine 3. In general, in operation, air is drawn in at arrow 14 into the air cleaner 10 and through the filter cartridge 12. Upon passage through the air cleaner 10, selected particles and contaminants are removed from the air. The cleaned air then flows downstream at arrow 16 into the intake 5. From there, the air flow is directed into the engine 3.

In a typical air cleaner 10, the filter cartridge 12 is a serviceable component. That is, the cartridge 12 is removable and replaceable within the air cleaner 10. This allows the cartridge 12 to be serviced, by removal and replacement, with respect to remainder of air cleaner 10, when the cartridge 12 becomes sufficiently loaded with dust or other contaminant, to require servicing.

Attention is now directed to FIG. 1, which depicts, in perspective view, air cleaner or air cleaner assembly 20, useable as air cleaner 10, FIG. 18. Referring to FIG. 1, air cleaner 20 includes a housing 21 defining: inlet end 22; inlet section 24 comprising, in this instance, a precleaner section 25; a central (in this instance main filter cartridge receiving) section 27; and outlet section 28. As will be apparent from further descriptions below, for the particular air cleaner 20 depicted, inlet section 24 is configured to be secured, during assembly, to central section 27, in a selected one of two different orientations; and, outlet section 28 is also configured to be secured to central section 27, in a selected one of two different orientations. Further, by using such a modular type of construction, alternate inlet sections can be mounted on the same style of central section 27. These features allow for a variety of alternate configurations possible for the air cleaner assembly 20, to advantage, as discussed in connection with FIGS. 16A-X.

The air cleaner housing 21 further includes, on an outer portion thereof, mounting arrangement 31. The mounting arrangement 31 includes a plurality of mounting pads 32, (see also FIG. 4) engage able with an equipment framework structure. The mounting pads 32 shown, are selectively positioned to allow for a variety of alternate mounting configurations, as described below. The particular mounting arrangement 31 depicted, will sometimes be referred to as a "boxed U-shaped" mounting arrangement 31a, or as a 3-sided mounting arrangement 31a, as discussed below.

Although alternatives are possible, for the particular air cleaner 20 depicted, the mounting arrangement 31 is positioned on, and as an integral part of, the central (in this instance main filter cartridge receiving) section 27. By "integral" in this context, it is meant that the parts are not, generally, separable from one another. A typical arrangement would involve molding the mounting arrangement 31 as part of a remainder of the main filter cartridge receiving section 27, from plastic. That is, while the features characterized herein can be implemented in metal air cleaners, in typical arrangements the housing 21 comprises plastic, with the various components molded. Of course in alternate arrangements, mounting portions can be provided on the inlet section 24 and/or the outlet section 28, but the arrangement 20 depicted is advantageous for certain applications, as described below in connection with FIGS. 16A-X.

Still referring to FIG. 1, air cleaner 20 includes removable service or access cover or panel 35. The removable access cover 35 allows for selective opening of a service access to an interior 20a (FIGS. 2 and 3) of air cleaner 20, for access to components positioned therein. The access cover 35 is secured in place by latch arrangement 36, FIG. 1, in this instance comprising four over-center wire latches 37, two mounted on each of the opposite sides 38, 39, of housing 21. The access cover 35 is positioned in a side (as opposed to an end 27a, 27b) of main filter cartridge receiving section 27, for operation as described below.

Typically the access cover 35 is positioned to provide a service access or opening at a location opposite a central base section of the boxed u-shaped mounting arrangement 31a. The central base section is indicated generally at 31d, FIG. 4.

The particular access cover 35 depicted, includes central projection 41 therein, useable for purposes discussed herein below.

Figure 3:
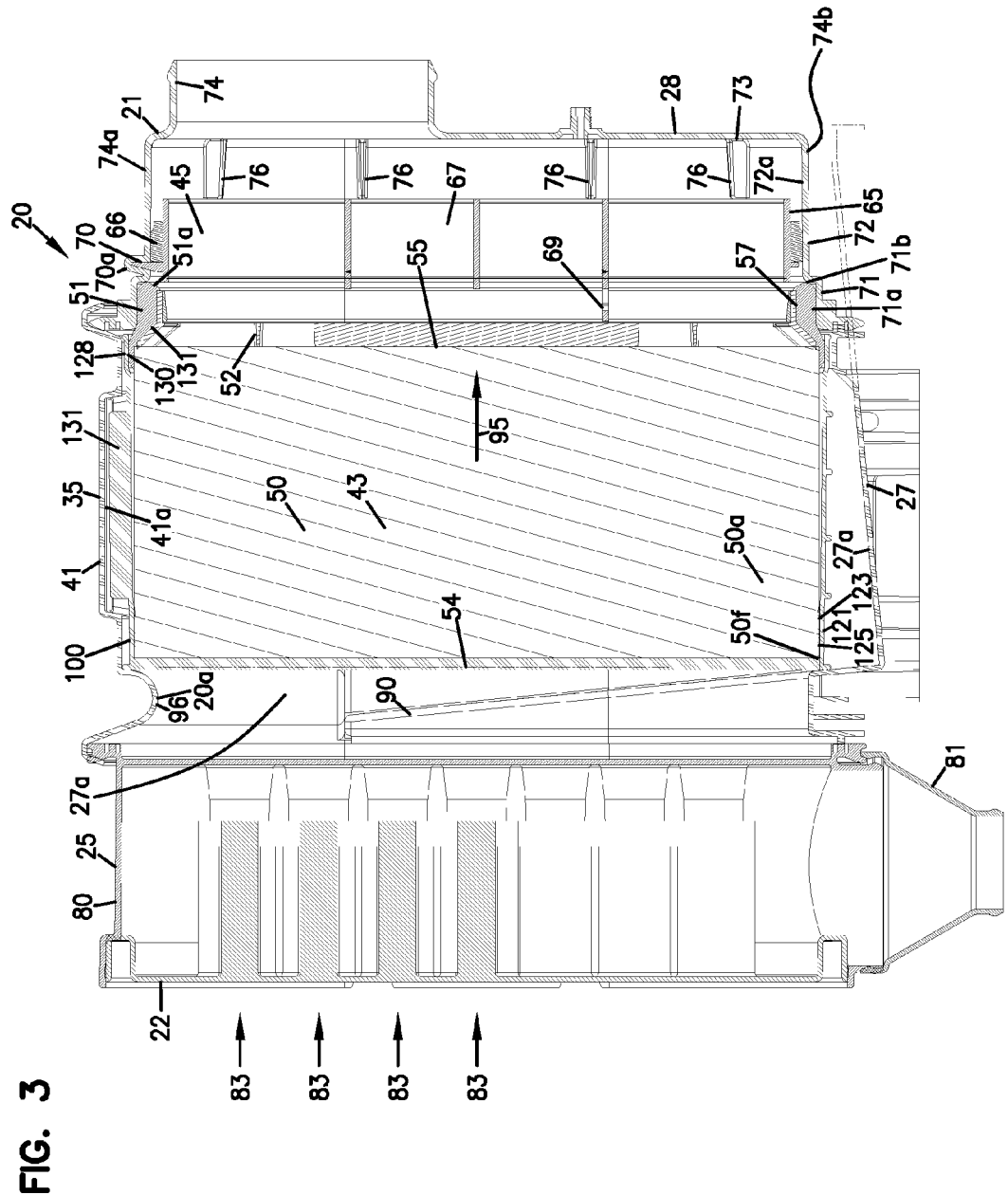
FIG. 3 is a vertical cross-sectional view taken along line 3-3, FIG. 1.

Referring to FIG. 3, air cleaner 20 includes, positioned therein, main or primary filter cartridge 43 and optional secondary or safety element 45. In typical embodiments, each one of primary filter cartridge 43 and secondary or safety filter element 45 is sized and configured to be removed from housing 21, when access cover 35 is removed, through a resulting side access or service opening. For the particular arrangement shown, secondary or safety element 45 cannot be removed unless primary filter cartridge 43 has previously been removed.

Figure 19:
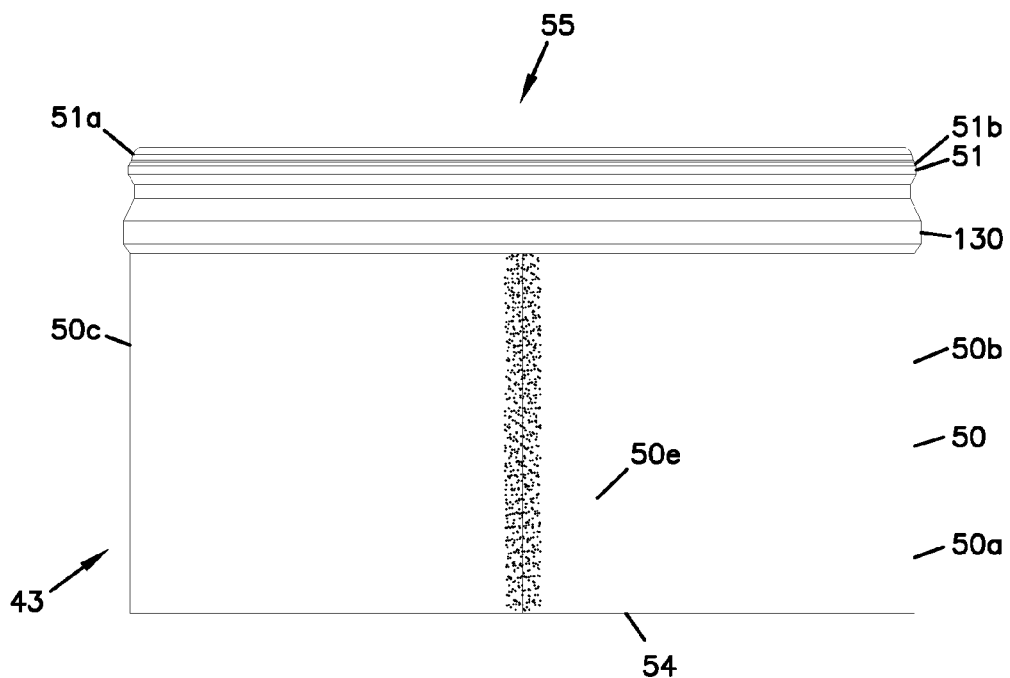
FIG. 19 is a side view of the main or primary filter cartridge of FIG. 3.
Figure 20:
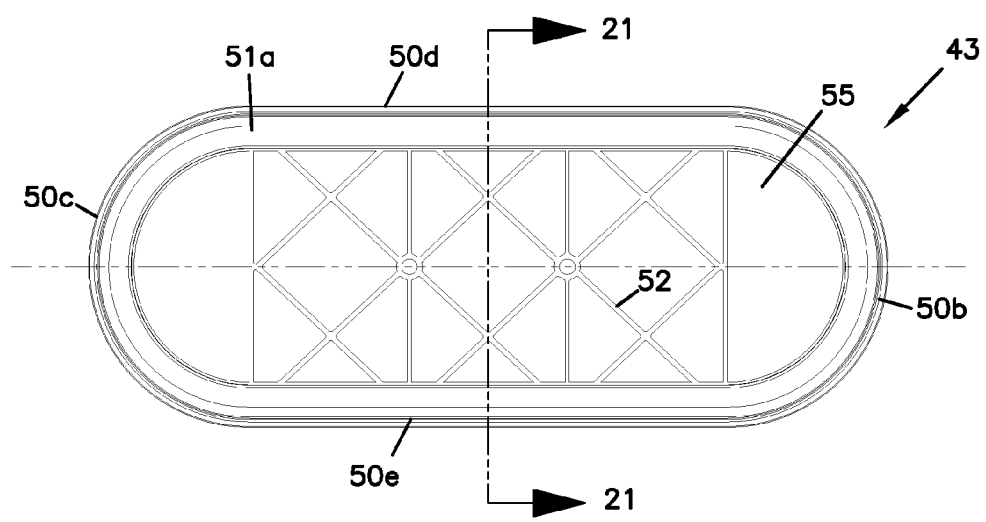
FIG. 20 is a top (outlet end) view of the main or primary filter cartridge of FIG. 19.
Figure 21:
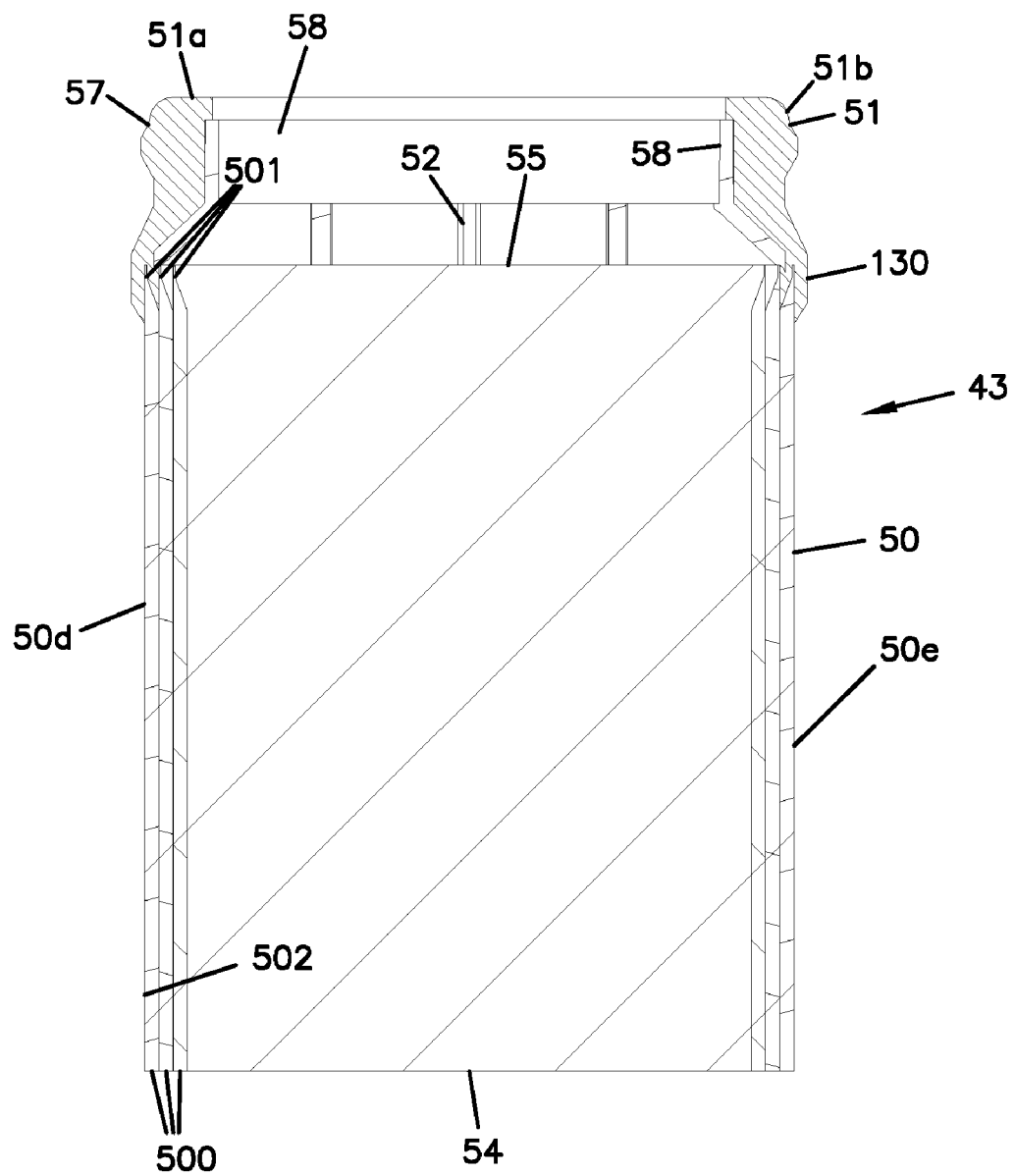
FIG. 21 is a cross-sectional view of the filter cartridge of FIG. 19 depicted along line 21-21, FIG. 20.

Still referring to FIG. 3, primary filter cartridge 43 preferably comprises a z-filter media pack 50 having housing seal arrangement 51 and grid 52 secured thereto. The primary filter cartridge 43 may be in accord with, and be assembled in accord with the principles of, U.S. provisional application 60/532,783, filed Dec. 22, 2003, the complete disclosure of which is incorporated herein by reference. An example filter cartridge 43 is shown in FIGS. 19, 20 and 21, discussed below.

In general what is meant by the term "z-filter media pack," in this context, is that the media pack 50, FIG. 3: (a) comprises an arrangement having an inlet face 54 and an opposite outlet face 55; and, (b) the media pack 50 comprises a plurality of inlet flutes and outlet flutes, formed by z-filter media comprising fluted media secured to a facing sheet. In general, the inlet flutes are open at or near (adjacent) inlet face 54 and are closed to outlet flow of air at or near (adjacent) the outlet flow face 55. In addition, the outlet flow flutes are sealed closed at or near (adjacent) the inlet flow face 54, and are open at or near (adjacent) the outlet flow face 55 for flow of air therefrom. Thus air, after entering the inlet flutes at the inlet flow face 54, must pass through the media of the media pack 50 before it can exit the media pack 50 via the outlet flow flutes at the outlet flow face 55. The inlet and outlet flutes are typically formed from a fluted or corrugated sheet of media used in the media pack 50. Z-filter media in general is described in PCT Publication WO 04/007054, published Jan. 22, 2004 and PCT application 04/07927, filed Mar. 17, 2004, each of which is incorporated herein by reference. Z-filter media was also generally described herein above in connection with FIGS. 26-30, and briefly below in connection with FIG. 22.

The z-filter media used can be formed in a variety of manners, the particular one depicted comprises a coiled arrangement 50a formed from a single strip of z-filter media comprising a corrugated sheet secured to a facing sheet and coiled about itself with the facing sheet directed outwardly. The media coil depicted is an oval coil, in particular a shape having two opposite curved ends, 50b, 50c and two opposite sides 50d, 50e, see FIGS. 19-21. The particular oval shape depicted is racetrack, with the opposite sides 50d, 50e generally having straight central sections parallel to one another.

It is noted that alternate shapes can be used for the media pack 50, from oval shapes. For example media packs having circular shapes in cross-section can be used in alternate embodiments.

It is also noted that for the arrangements shown the faces 54 and 55 are generally flat or planar. While it is anticipated that such arrangements may be typical for air cleaners according to the present disclosure, alternate configurations can be used. For example, face 54 and/or face 55 can be configured to not be planar, but to rather project outwardly (axially) or inwardly (axially).

In this disclosure, reference is sometimes meant to an "axial" direction, or the terms "axial" or "axially" are used to characterize a direction of extension. In this context the term "axial" and variants thereof, is meant to refer to a direction of extension parallel to a line from inlet face 54 to outlet face 55 of main filter cartridge 43, or, analogously, parallel to a line from inlet section 24 to outlet section 28 of the air cleaner 20. The term "radial," and variants thereof, it is generally meant to refer to a direction perpendicular to axial.

For the arrangement depicted, the housing seal arrangement 51, FIG. 21, comprises a radial seal 57, in this instance outwardly directed, supported by a frame portion 58. The radial seal portion 57 comprises a compressible polymeric material such as a foamed polyurethane, secured to the frame portion and also sealing the frame portion to the media pack 50, generally in accord with U.S. provisional 60/532,783, filed Dec. 22, 2003, and incorporated herein by reference.

Grid 52 is preferably integral with frame portion 58, and serves to support outlet flow face 55 against distortion or damage. Grid 52 and frame portion 58 can comprise a molded plastic component or preform, if desired.

Referring to FIG. 3, secondary or safety element 45 comprises an outer skirt 65 having radial seal member 66 mounted thereon. The skirt 65 is generally oval in shape having two opposite curved ends and two, opposite, sides. Preferably the sides have straight central sections, as discussed below. Positioned inside of seal member 66 is media 67, which can be pleated if desired. The secondary or safety element 45 also has handle framework 69 thereon, for easy handling of the safety element.

Still referring to FIG. 3, safety element 45 includes end projection 70 thereon sized to be received then receiver 70a of housing end section 28. Projection 70 can be used to help position safety element 45 during mounting, by insertion into receiver 70a with operation of safety element 45 as a lever, in coordination with hand engagement of handle 69. Alternately stated, during installation a service personnel would grasp safety element 45 by handle 69. The element 45 would be positioned with projection 70 extending into receiver 70a. The element 45 could then be rocked or pushed (levered) into position, by manual manipulation of handle 69.

Figure 4:
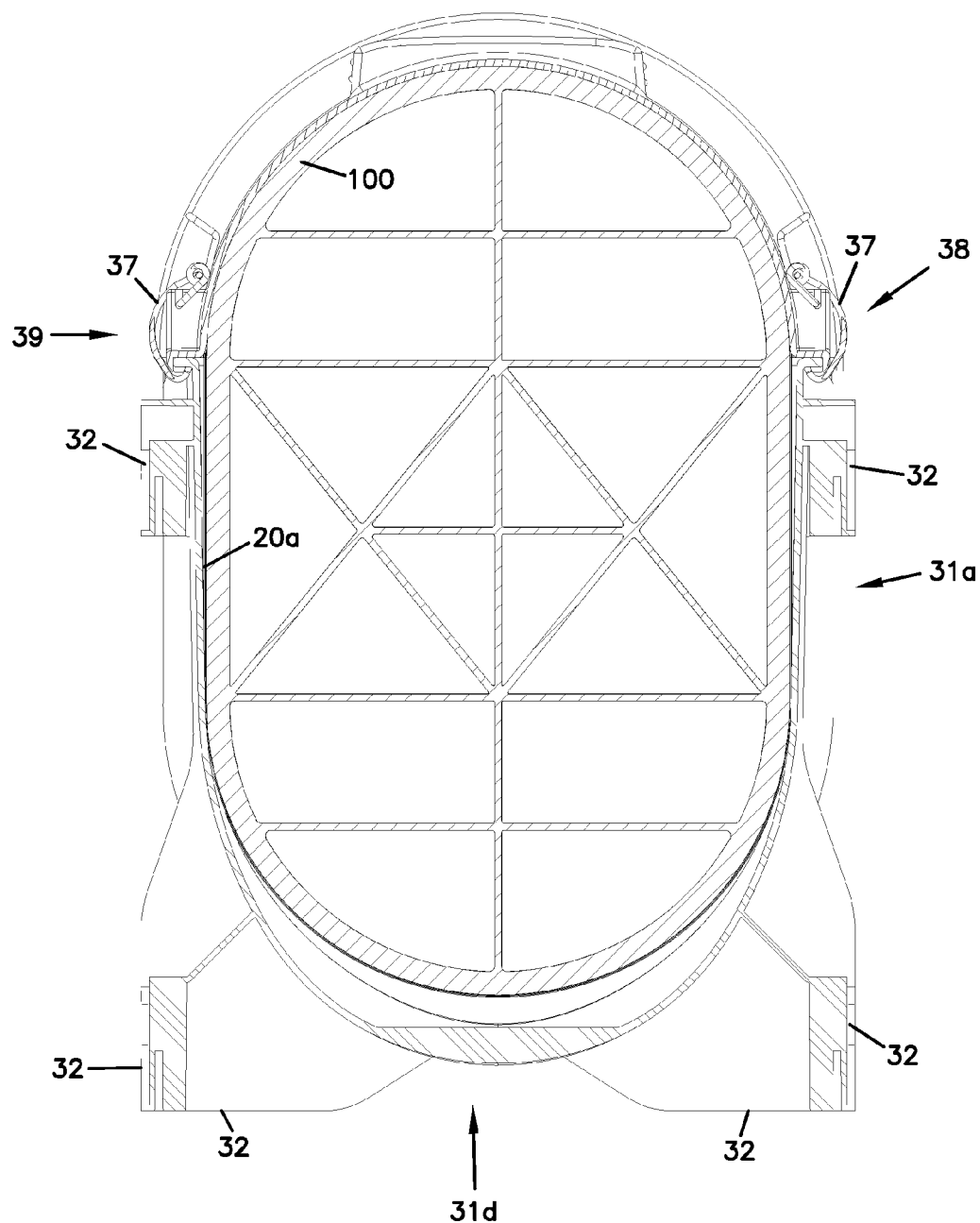
FIG. 4 is a vertical cross-sectional view taken along line 4-4, FIG. 1.

Referring to FIGS. 3 and 4, attention is directed to outlet section 28 which defines: receiver 70a (FIG. 3), step 71; side wall 72; end wall 73; and, outlet 74 (FIG. 3). Step 71 is in a portion of outlet section 28 adjoining central main filter cartridge receiving section 27. An inner radial (annular) surface 71a of step 71 provides a seal surface for housing seal arrangement 51, in particular a radial seal surface. Portion 71b of step 71 provides an inlet stop surface for end 51a of housing seal arrangement 51. Thus, for the assembly 20 depicted, although the main filter cartridge 43 is installed in the central section 27, the cartridge 43 is sealed by engagement between the housing seal arrangement 51 and a portion 71a of the outlet section 28. This is advantageous, because there is no issue with any leakage between section 27, 28 of the housing 21, since seal 51 engages the housing 21 downstream of this juncture.

Inner surface 72a of side wall 72 forms a seal surface for secondary or safety element 45, i.e., a radial seal engagement surface for radial seal member 66. An extent of insertion of secondary or safety element 45 into outlet section 28 is limited, by framework 76, in outlet section 28. Thus, although the safety element 45 is installed by insertion into the central section 27, in use it is actually mounted within the outlet section 28.

Outlet 74, FIG. 3, is a flow outlet, for air from filtered air cleaner 20. For the particular arrangement depicted, outlet 74 is preferably not centered in end wall 73, but rather is positioned in one side 74a thereof. Herein, an outlet 74 not centered in an associated outlet section 28, FIG. 3, will be characterized as "eccentrically" positioned. Alternately stated, referring to FIG. 3, outlet 74 is not centered (vertically) in section 28. Rather, it is positioned closer to an end 74a than end 74b.

From the above, it is apparent that the outlet section 28 shown, FIG. 1, has opposite curved ends 28a, 28b joined by a pair of opposite sides 28c, 28d. (In FIG. 1 side section 28c is visible, side section 28d would typically be a mirror image.) In typical preferred arrangements central portions of sides 28c and 28d are straight, and parallel to one another.

Still referring to FIG. 3, attention is directed to precleaner section 25. Precleaner section 25 includes outer wall 80, dust ejector port 81, and separator tube arrangement 83. Outer wall 80, FIG. 1, generally has an oval perimeter, with opposite curved ends 80a, 80b and opposite side walls 80c, 80d, FIG. 1. For the particular preferred arrangement shown, central portions of the opposite sidewalls 80c and 80d are straight and parallel with respect to one another. It is noted that in FIG. 1 section 80c is viewable; section 80d would typically be a mirror image. In the arrangement shown, ejector port 81 is positioned at one of the curved ends 80b, although alternatives are possible. In typical use, a tube of a scavenge system would be attached to dust ejector port 81, to draw ejected dust out of the housing 21, from precleaner 25. In some arrangements a flexible evacuator valve could be positioned over aperture 81a, when a scavenge system is not used. Such valves are common in air cleaner arrangements, and one is depicted for example in PCT publication WO 03/084641 A2 at FIG. 4.

Figure 2:
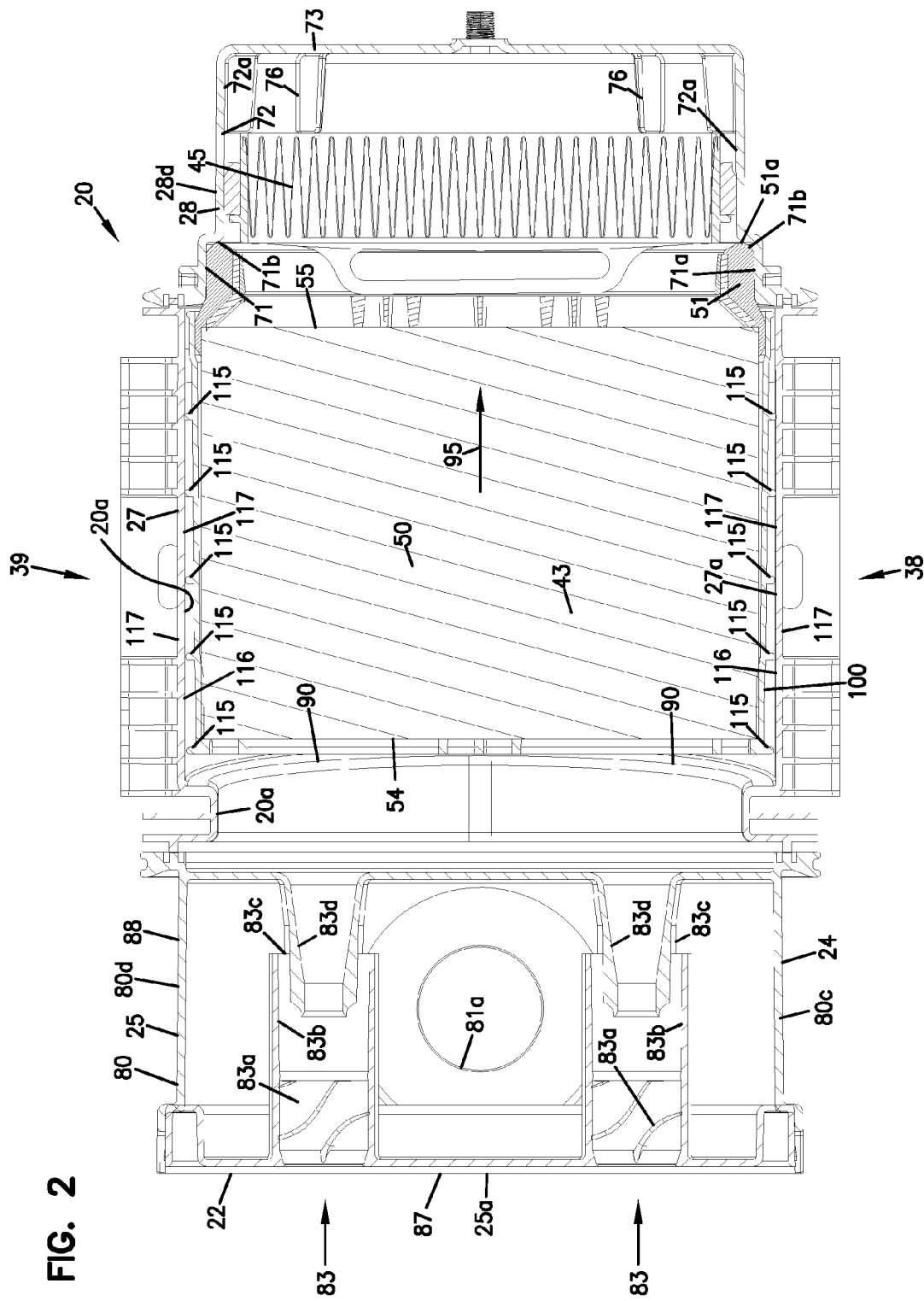
FIG. 2 is a horizontal cross-sectional view taken along line 2-2, FIG. 1.

Separator tube arrangement 83 generally comprises a plurality of separator tubes 83, FIGS. 1, 2 and 3. Such tubes are generally described, for example, in U.S. provisional 60/556,133, filed Mar. 24, 2004 and PCT Publication WO 03/084641, published Oct. 16, 2003, the complete disclosures of which are incorporated herein by reference.

The tubes 83 can be used in a variety of different numbers and orientations. Generally they will be selected for the particular instances of use expected. Referring to FIG. 2, in general the tubes 83 are configured to: (a) impart a circular momentum to inlet air upon passage through use of inlet blades or fins 83a; (b) as a result, to drive some particulate to an outside portion 83b of the tube, and eventually out of the tube 83 through outlet 83c; and, (c) to allow the air to pass into a center exit tube 83d, and then into the main air cleaner receiving section 27.

Referring to FIG. 1, the precleaner 25 includes an end piece 25a secured to side wall 80. The precleaner 25 can be preassembled, before being attached to main filter cartridge receiving section 27. Referring to FIG. 2, precleaner 25 can be formed into two molded components comprising end piece 87 (or piece 25a) with fins 83a and tubes 83b thereon; and, body 88, with tubes 83d therein and sidewall 80. The two components 87, 88 can then be secured together to form the precleaner 25. This general type of assembly was described for example in PCT publication WO 03/084641, incorporated herein by reference.

It is noted that the inlet section 24, in this instance comprising the precleaner 25, has an eccentric configuration. The eccentric configuration is provided by the location of the outlet tube 81 in one of the ends 80a, 80b, FIG. 1. Eccentricity is also provided in the particular precleaner 25 depicted, by the pattern of installation of the tubes 83. From this eccentricity, it can be seen that the precleaner 25 can be mounted in one of two rotational positions, relative to sections 27. Advantages from this will be apparent from the discussions below.

Referring to FIG. 3, the air cleaner 20 includes an internally received loading cam or ramp arrangement 90. During installation of primary filter cartridge 43 (when cover 35 is removed), the cam or ramp 90 is engaged during the insertion process, biasing the cartridge 45 in the direction of arrow 95, i.e., into sealing position. When access cover 35 is then secured in place, projection 96, in cover 35 adjacent end 98 of primary filter cartridge 43 prevents the filter cartridge 43 from backing out of engagement at seal 51. That is, projection 96 helps secure the cartridge 43 locked in position, for proper operation. A similar loading cam or ramp arrangement 90, and an access cover arrangement having a projection 96 thereon, are described in U.S. patent application Ser. No. 03/14350 published as WO 03/095068 on Nov. 20, 2003, the complete disclosure of which is incorporated herein by reference.

Typically a section of ramp 90 is provided in each side 38, 39, of the housing 21, and in a bottom. Only one side is viewable in FIG. 3; the opposite side would be a mirror image.

Herein the cam or ramp 90 will sometimes be referred to as a "stationary" cam or ramp 90, since in operation it does not move at all. Rather it is fixed in position in section 27, and the cartridge 43 is biased during insertion into section 27. The stationary cam or ramp 90 is positioned to operate to cause biasing without interaction with the cover 35, if desired. This means that in some preferred arrangements the biasing of cartridge 43 will have occurred even before the cover 35 is in position.

A filter cartridge similar to that described in U.S. provisional application 60/532,783, incorporated herein by reference, can be used for the filter cartridge 43. Such an element generally has, on end 50f of media pack 50, FIG. 3, a permanently positioned structural component for engagement with ramp 90. However, preferably for the particular assembly depicted in FIG. 3, the media pack 50 does not include such structure positioned thereon at end 50f. Rather, the air cleaner 20 includes, as depicted, an optional sheath, band, or cassette component 100 that is not permanently secured to the media pack 50, as discussed in detail in the next section.

IV. The Sheath or Cassette Component 100

Referring to FIG. 3, the sheath or cassette component 100 surrounds and contains the media pack 50. The cassette component 100 is depicted in detail in FIGS. 5-7A.

Typically and preferably, the sheath 100 and media pack 50, are manually separable. By the term "manually separable" in this context, it is meant that the two components can be separated under hand manipulation by service personnel, to allow the cassette 100 to be re-used even when the filter cartridge 43 is replaced. Generally all that is required for the separation, in a preferred arrangement, is pulling the two parts away from one another, axially. This will be understood from further detailed discussion of the cassette 100.

Figure 7A:
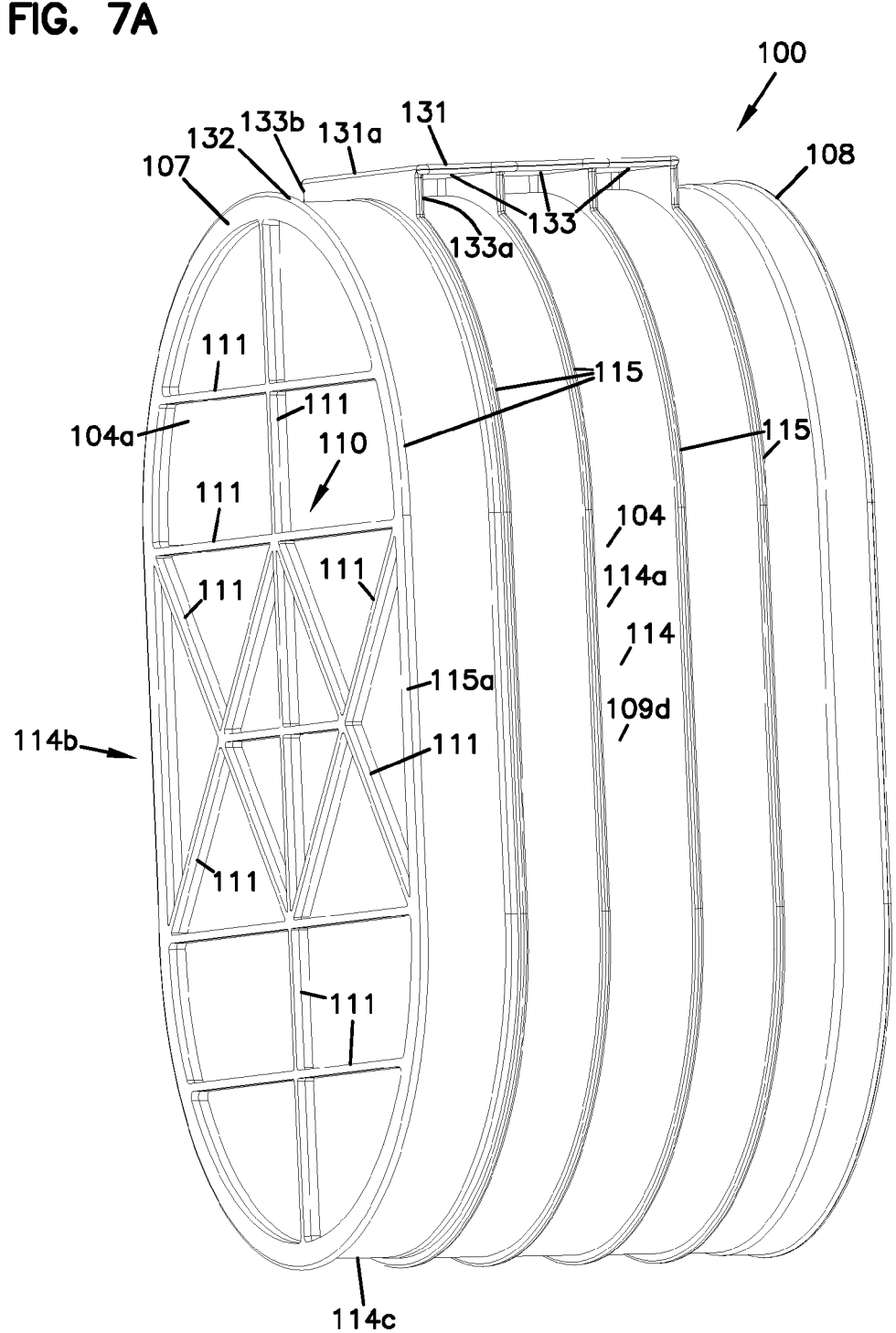
FIG. 7A is an inlet end perspective view of the cassette component depicted in FIG. 5.

Referring to FIG. 7A, cassette component 100 includes an outer wall 104, defining interior 104a configured for receipt therein of the media pack 50, FIG. 3.

The outer wall 104 includes opposite ends 107 and 108. End 107 is positioned, in use, adjacent inlet face 54 of the media pack 50; and, end 108 is positioned, in use, adjacent the housing seal arrangement 51. Thus, end 107 is an inlet end and end 108 is an outlet end, with respect to typical air flow.

Preferably, end 108 is open, to allow receipt of media pack 50, by insertion therethrough, into interior 104a, during use.

The particular cassette arrangement 100 depicted includes, extending across end 107, grid arrangement 110 comprising cross pieces 111. Cross pieces 111 form a grid 110 extending adjacent inlet face 54 of media pack 50, during use. Preferably the grid 110 is formed integrally to the outer wall 104; in this context the term "integrally" and variants thereof is meant to refer to parts that cannot be separated. Typically the grid 110 and outer wall 104 are formed as a single molded plastic piece, for example from a polyamide or polyolefin. Typical useable materials would be Nylon 6/6 or polypropylene. The plastics could be glass filled.

The specific configuration for the grid 110 is a matter of choice, and can be selected with designs for aesthetic or source indicating purposes. For appropriate function, all that is preferred is enough extension across end 107, to ensure end support for the media pack 50, FIG. 3, at this location, in use.

Herein, end 107 of cassette 100 will sometimes be referred to as closed, since grid 110 extends there across, to prevent insertion of any portion of media pack 50 therethrough, during assembly. It is noted that both ends 107 and 108 are open, with respect to air flow.

Figure 5:
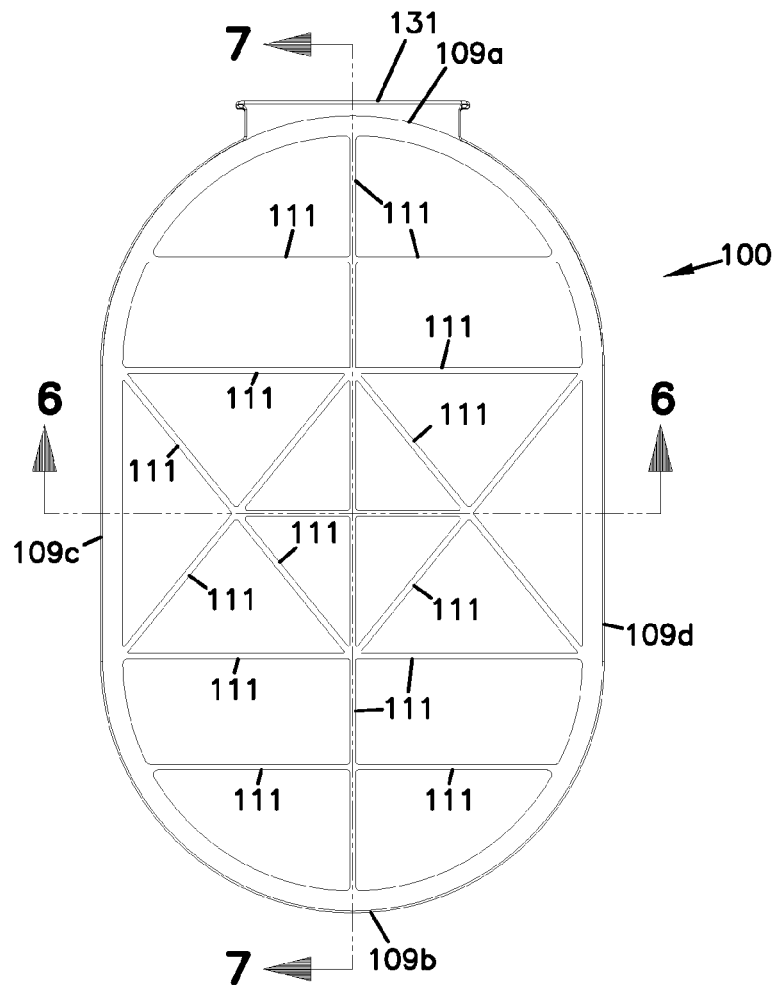
FIG. 5 is an end view of a cassette component useable in the assembly of FIG. 1.
Figure 6:
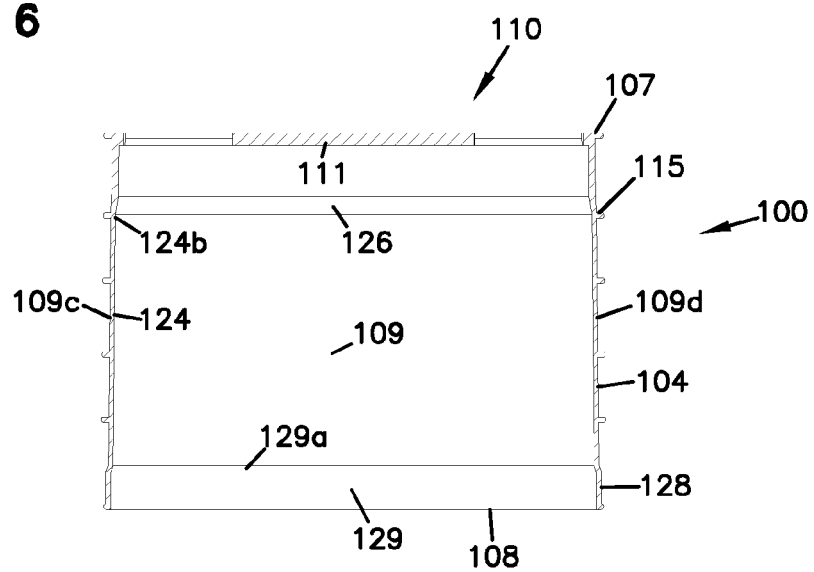
FIG. 6 is a cross-sectional view taken along line 6-6, FIG. 5.

Referring to FIG. 5, cassette 100 generally has an outer perimeter shape comprising opposite curved ends 109a, 109b and two opposite sides 109c, 109d. In the typical preferred arrangement shown, central sections of sides 109c and 109d are straight and parallel to one another. It is noted that curved end 109a includes structure projecting outwardly therefrom, as discussed below, in a central portion thereof.

Outer wall 104, FIG. 7A, includes an outer surface 114 with spaced, radially outwardly projecting, ribs 115 thereon. The ribs 115 generally extend along opposite sides 114a, 114b and across bottom 114c. Referring to FIG. 2, the ribs 115, on the sides 114a, 114b, are preferably sized to extend across gaps 117, to help support a received media pack 50 centrally within housing interior 20a. Ribs 115 can actually be sized to engage inner surfaces 116 of walls 117 at these locations, if desired.

It is noted that one rib 115a, FIG. 7A, is located at inlet end 107. This rib 115a is positioned to engage cam or ramp 90, as discussed below, during insertion of cassette 100 with a filter cartridge 45 associated therewith, into air cleaner housing 21, for use.

Referring to FIG. 7, the preferred outer wall 104 has an inner surface 104b that tapers to a narrow end section 121 sized to pinch end portion 122 of media pack 50, FIG. 3 when inserted therein. This will help support the media pack 50 at this location, and secure the media pack 50 against movement at this location, in use. The engagement between the cassette 100 and media pack 50, merely being by pinching or compression at location 121, facilitates manual insertion and also manual removal of a media pack 50, into cassette 100 and thus separation and engagement between the media pack 50 and cassette 100 during servicing operations.

Referring to FIG. 7, narrow end 121 is formed including transition step 123, to cause interior 104a of side wall 104 to have a central region 124 of a first cross-sectional size and an end portion 125 adjacent end 107 of a second, smaller, cross-sectional size. Preferably step 123, and thus section 125, projects inwardly, in total, a distance of about 0.5 mm-2 mm, typically about 1 mm, relative to region 124b. Preferably region 125 is sized to snuggly receive the media pack, with no more than 1.5 mm of compression (pinch) therearound. Preferably region 125 extends over an axial length of extension, between ends 125a and 125b a distance of at least 5 mm, typically at least 10 mm and usually within the range of 15 to 25 mm. Herein, region 125 will sometimes be referred to as a media pack support shoulder. The particular media pack support shoulder 125 depicted, is continuous. However, the shoulder 125 may comprise spaced structures, as opposed to a continuous shoulder in cassette 100.

Typically and preferably, whether continuous or not, support shoulder 125 includes: portions projecting from the opposite curved ends (50c, 50b, FIG. 20) to engage a media pack; and, portions projections from the opposite sides (50d, 50e, FIG. 20) to engage a media pack, with the length of radial extension along each of the side portions engaging a media pack (i.e., around the media pack) being over distance of at least 15 mm, preferably at least 30 mm; and, with the length of radial (arcuate) extension along each curved end portions engaging a media pack being at least 15 mm and preferably at least 30 mm. Again, preferably the shoulder 125 is continuous, and it engages the media pack 50 continuously, therearound. As a result of being continuous, it compresses the media pack the same amount, there around.

In general, the media pack support shoulder 125 releasably radially supports the media pack 50, in this instance at an end thereof opposite the housing seal arrangement 51, FIG. 3. Again, the engagement is such that the media pack 50 and the filter cartridge 43 can be manually separated from the cassette 100, so that the cassette 100 can be reused.

Again, in use, the support provided by support shoulder 125, against both the opposite curved ends and the opposite sides of the media pack 50, operates to support the media pack 50 at end 50f, FIG. 3, when installed. This means that the media pack 50 is supported adjacent both of opposite end faces 54 and 55, i.e., adjacent end 54 at support shoulder 125 and adjacent end 55 at housing seal 51, when the media pack 50 is installed within housing 21. This helps avoid damage to the media pack 50 during vibration of assembly 20 under operational conditions.

It is noted that if constructed in the preferred way as characterized above, whether continuous or not, the shoulder 125 will engage the media pack 50 along four portions thereof including: opposite ends 50b, 50c and opposite sides 50d, 50e, and thus can be characterized as a 360° or four sided pinch or support with forces of pinch or support directed toward the media pack from at least four different directions. Again this will sometimes be referred to as a 360° support, a four sided support of the media pack or support with forces from at least four different directions against the media pack.

In general, step 123 is preferably tapered and not abrupt, so as to assist in positioning of a media pack with an interior 104a, without damage. Also, typically section 124 tapers downwardly between regions 124a and 124b somewhat, for example at an angle within the range of 0.5°-1.5°.

Typically cassette 100 is sized such that when a media pack is positioned therein, for use, the media pack is squeezed as described above, adjacent region 121, and is against region 124 at or near end 124b, or is not spaced therefrom by more than about 1.5 mm, typically no more than 0.5 mm.

At end 108 the outer wall 104 can be configured in several different ways. The particular arrangement depicted, FIG. 7, includes an outer flare or flange 128 with step 129 therein, adjacent end 108. Step 129 and flange 128 are sized to provide an extension of end 108 of outer wall 104 over a portion of peripheral seal portion 130 of the seal material 131 forming radial seal 57, FIG. 3. The peripheral seal portion 130 generally comprises the portion of seal material integral with radial seal portion 57, and sealing radial seal portion 57 to media pack 50. Preferably the axial extension of region 129 is within the range of 5 mm-25 mm, typically 10-20 mm.

Referring to FIG. 7, transition portion 129a between step 129 and region 124a, provides for a gradual increase in size at this location.

In the alternative, instead of including step 129 and flange 128, outer wall 104 could be sized such that end 108 simply axially terminates short of, or at, the media pack peripheral seal portion 130.

Still referring to FIG. 7, preferably step 129 is configured such that internal surface 128a of flange 128 is sized relative to section 124a such that step 129 has a constant value of step outwardly, from region 104, within the range 0.25 to 2.0 mm, around its perimeter.

End portion 107 of cassette component 100 is sized and positioned to engage loading cam or ramp 90, FIG. 3, during installation. Thus, in typical use, filter cartridge 43 would be installed in interior 104a of cassette component 100 by insertion through end 108, at a location exterior to the air cleaner 20. The cassette component 100 with the filter cartridge 43 installed therein, would then be installed (inserted) through an access opening into interior 27a of main filter element receiving section 27, with access cover 35 removed. During installation, engagement between cassette component 100 and (stationary) loading cam or ramp 90 forces the cassette component 100 and received primary filter cartridge 43, in the direction of arrow 95, FIG. 3, and into a loaded position with the primary filter cartridge 43 sealed at radial seal 57. Access cover 35 can then be positioned, with projection 96 extending to a location preventing primary filter cartridge 43 and cassette component 100 from backing out of the loaded and sealed position.

If desired, in some assemblies the access cover 35 can be secured to the cassette component 100, to facilitate assembly. This securement can be permanent or temporary, as desired.

Herein, when it is stated that the filter cartridge 43 or media pack 50 are inserted into the cassette 100, it is not necessarily meant that 100% of the axial length of the filter cartridge 43 is inside of the cassette 100. For example as shown in FIGS. 2 and 3, a portion of seal arrangement 51 projects outwardly, from cassette 100. For typical, preferred, arrangements, the media pack 50 is completely contained within the axial extension cassette 100, or at least 94% of the media pack axial length (i.e., the length between end faces 54 and 55) is so contained.

There is no requirement that the cassette 100 be continuous and have no apertures or other openings therein, in side wall 104, which expose side portions of the media pack 50. However an arrangement, as shown, with no apertures or openings therein to expose side portions of media pack 50, is preferred for media pack protection.

It is noted that for the particular arrangement depicted, FIG. 7A, the cassette component 100 includes projection arrangement 131 at curved end 132. The projection arrangement 131 includes platform 131a (in this instance flat) with receivers 133 thereunder (preferably in both sides 133a, 133b) to provide for easy grasping of the cassette component 100 during handling. Referring to FIG. 3, the projection 41 in access cover 35 defines a recess 41a therein, to receive the projection arrangement 131. Preferably the platform 131a has a perimeter area (or outer surface area) of at least 3600 sq. mm., typically at least 7000 sq. mm. Preferably the receivers 131 are positioned so that a user's fingers can project into them in a direction perpendicular to the axial direction of the media pack 50.

The relatively large platform 131a is convenient to grasp, and helps ensure that the cassette 100, and thus the primary filter cartridge 43, are in proper orientation once installed. Receipt of the projection 131 into the receiver 41 on the access cover 35, helps ensure that proper positioning is maintained after installation.

Attention is now directed to FIGS. 8-14, which are meant to show, schematically, operation of an arrangement analogous to that of FIGS. 1-7A. It is noted that some of the detail in FIGS. 8-14 is different, for example the access cover does not include a projection thereon, with a receiver toward the inside, since the cartridge component does not include a projection analogous to projection arrangement 131. However, in general, features are analogous and thus are numbered and described accordingly.

Figure 8:
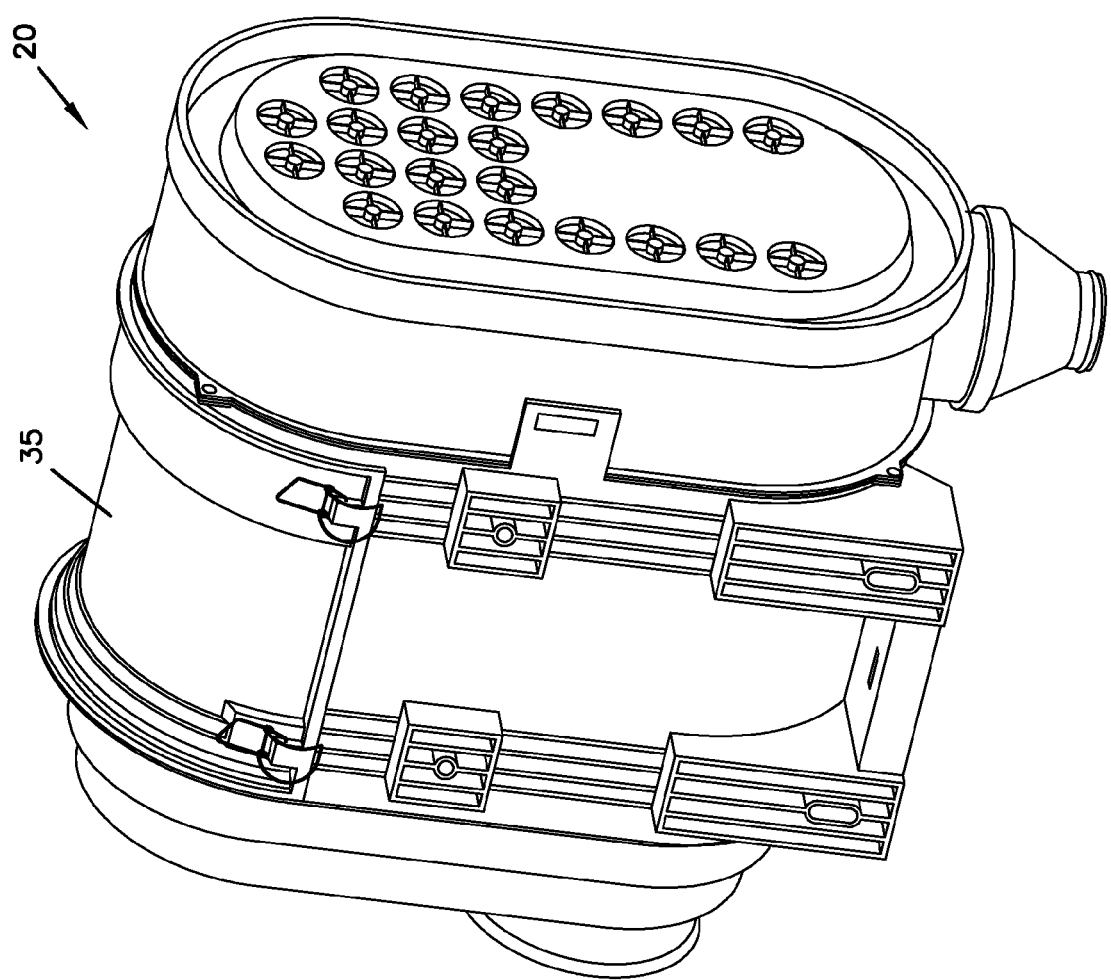
FIG. 8 is a schematic, perspective view of an assembly having features analogous to those of the assembly shown in FIG. 1.
Figure 9:
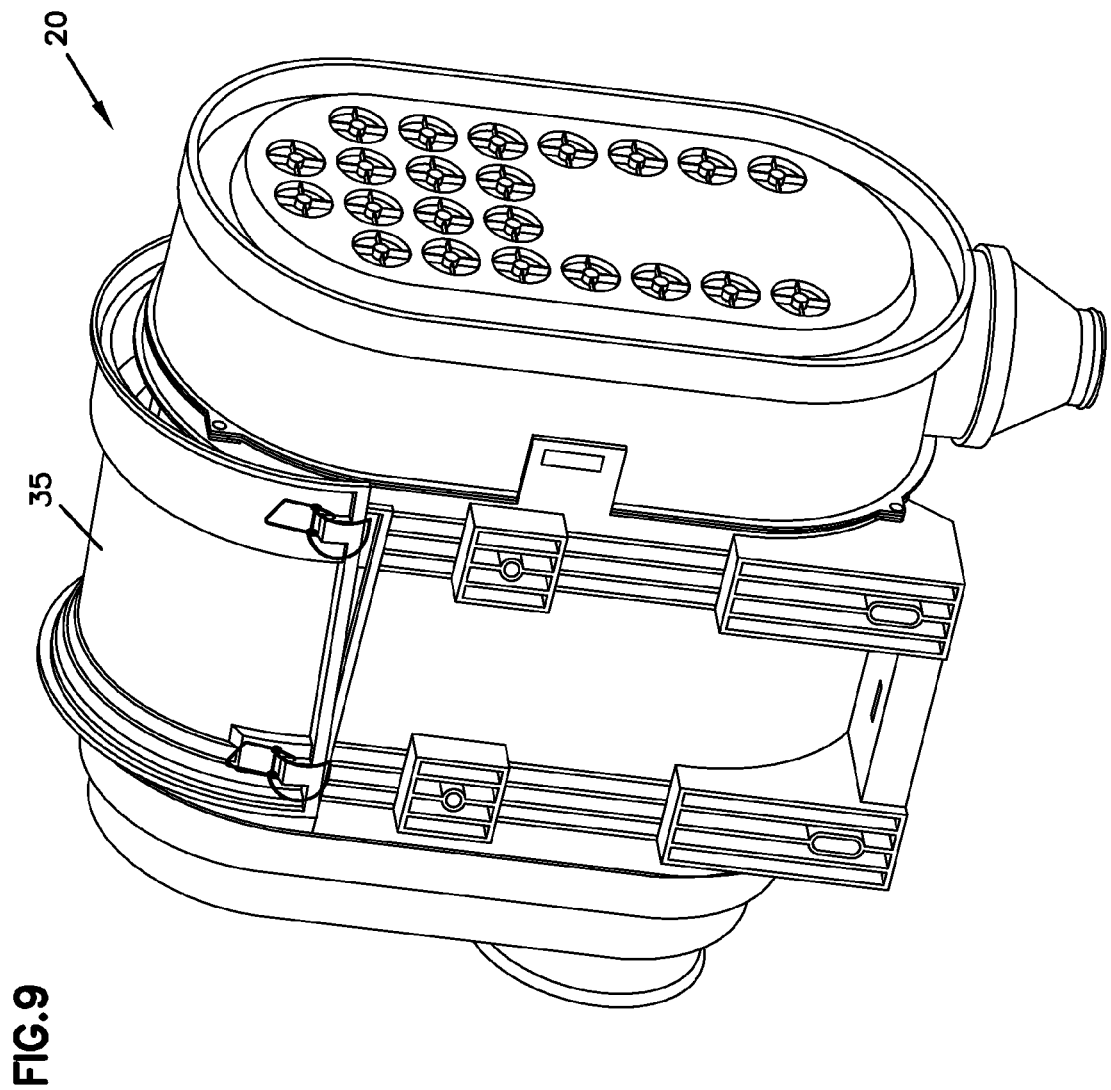
FIG. 9 is a schematic depiction of the assembly of FIG. 8 shown during an initial part of a step of cover removal.
Figure 10:
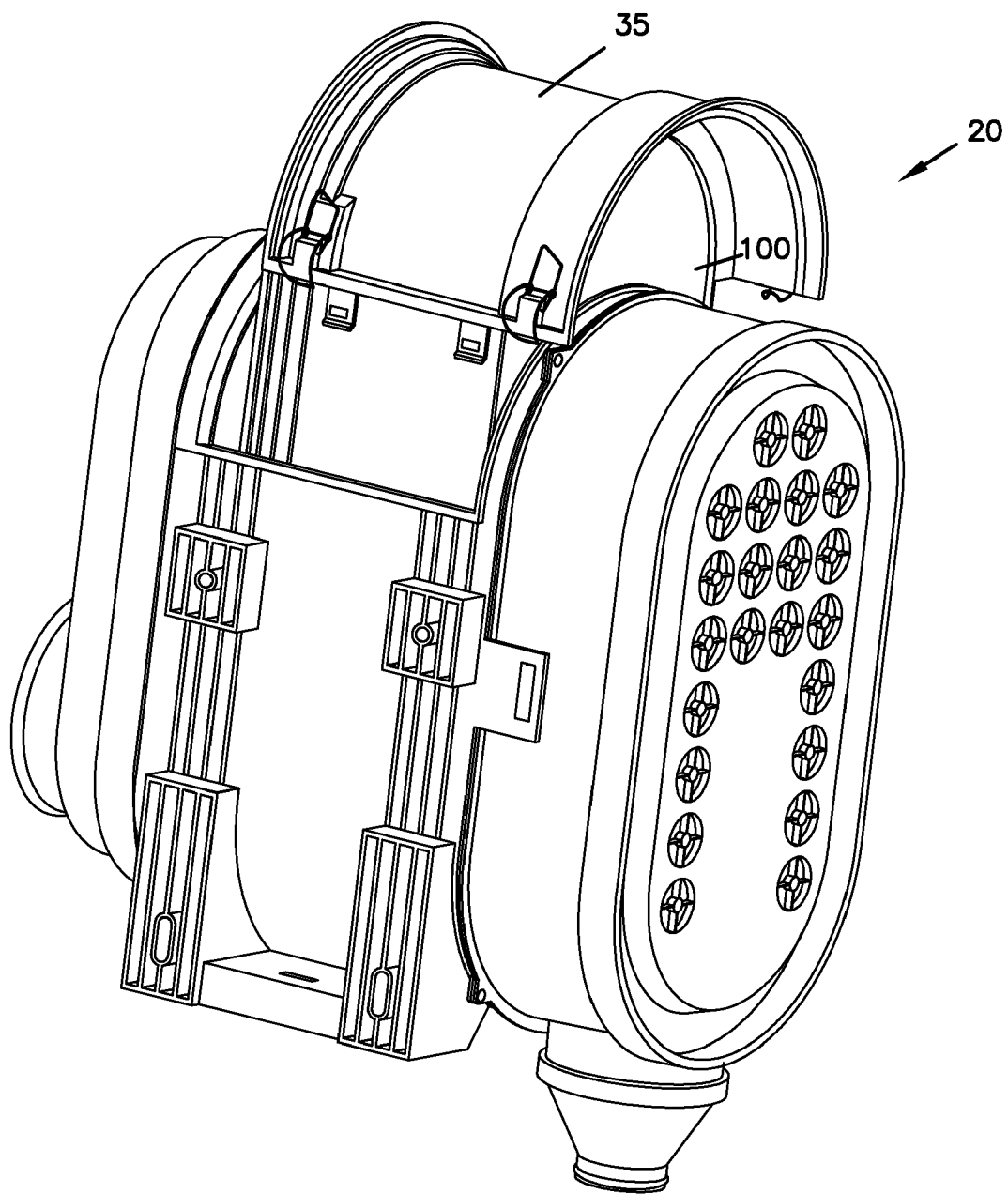
FIG. 10 is the arrangement of FIGS. 8 and 9, shown during a later part of cover removal, relative to FIG. 9.

Referring to FIG. 8, then, air cleaner 20 is schematically depicted, completely assembled and closed. In FIGS. 9 and 10, removal of the access cover 35 is depicted. In FIG. 10, removal of the access cover 35 is shown also removing the cassette component 100 since in this instance the cassette component 100 is connected to the access cover 35. The connection between the axis cover 35 and the cassette 100 can be permanent, or a removable snap fit. A removable snap fit would typically be preferred, if connection is used. In alternate preferred embodiments, such as shown in FIG. 1, the access cover 35 would be removable without also removing the cassette component 100, since the two would not be connected to one another. (It is noted that in FIG. 8 the cassette component 100 is depicted schematically, i.e., without ribs and a grid, for example.)

Figure 11:
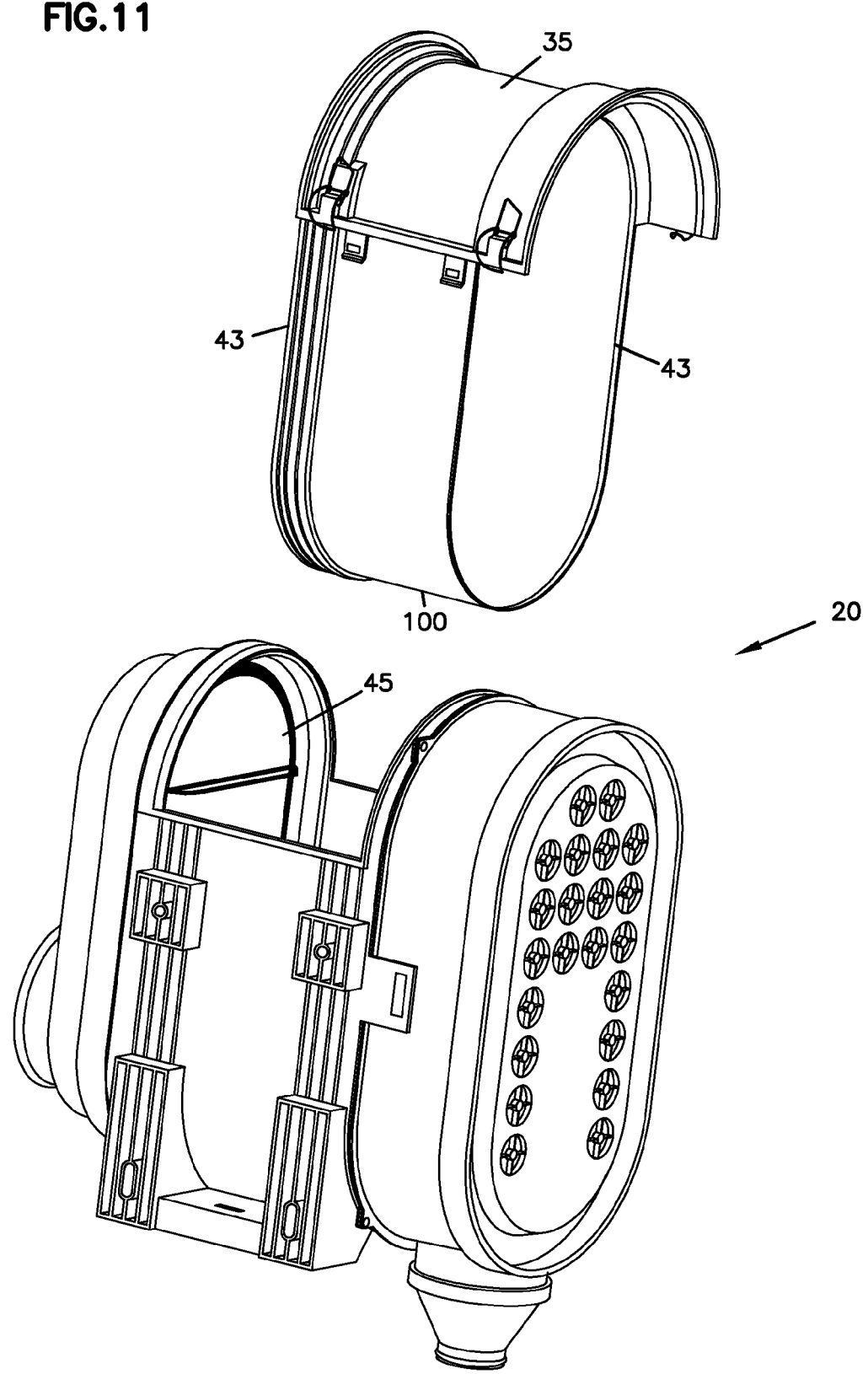
FIG. 11 is a view of arrangement shown in FIGS. 8-10, shown with a cover removed, and a filter cartridge component removed.

Referring to FIG. 11, the assembly 20 is depicted with the access cover 35 and cassette component 100 completely removed, from a remainder of the housing 21. In FIG. 12, the primary filter cartridge 43 is shown removed from the cassette component 100. Within the remainder of the housing 21, the secondary or safety element 45 can be viewed.

It is noted that in FIG. 12, the safety element 45 is shown mounted inverted, relative to its position in FIG. 3. That is, an opposite end of the safety element 45 is directed upwardly, than for the depiction in FIG. 3. This indicates that alternate possibilities can be accommodated, with principles according to the present disclosure.

Figure 13:
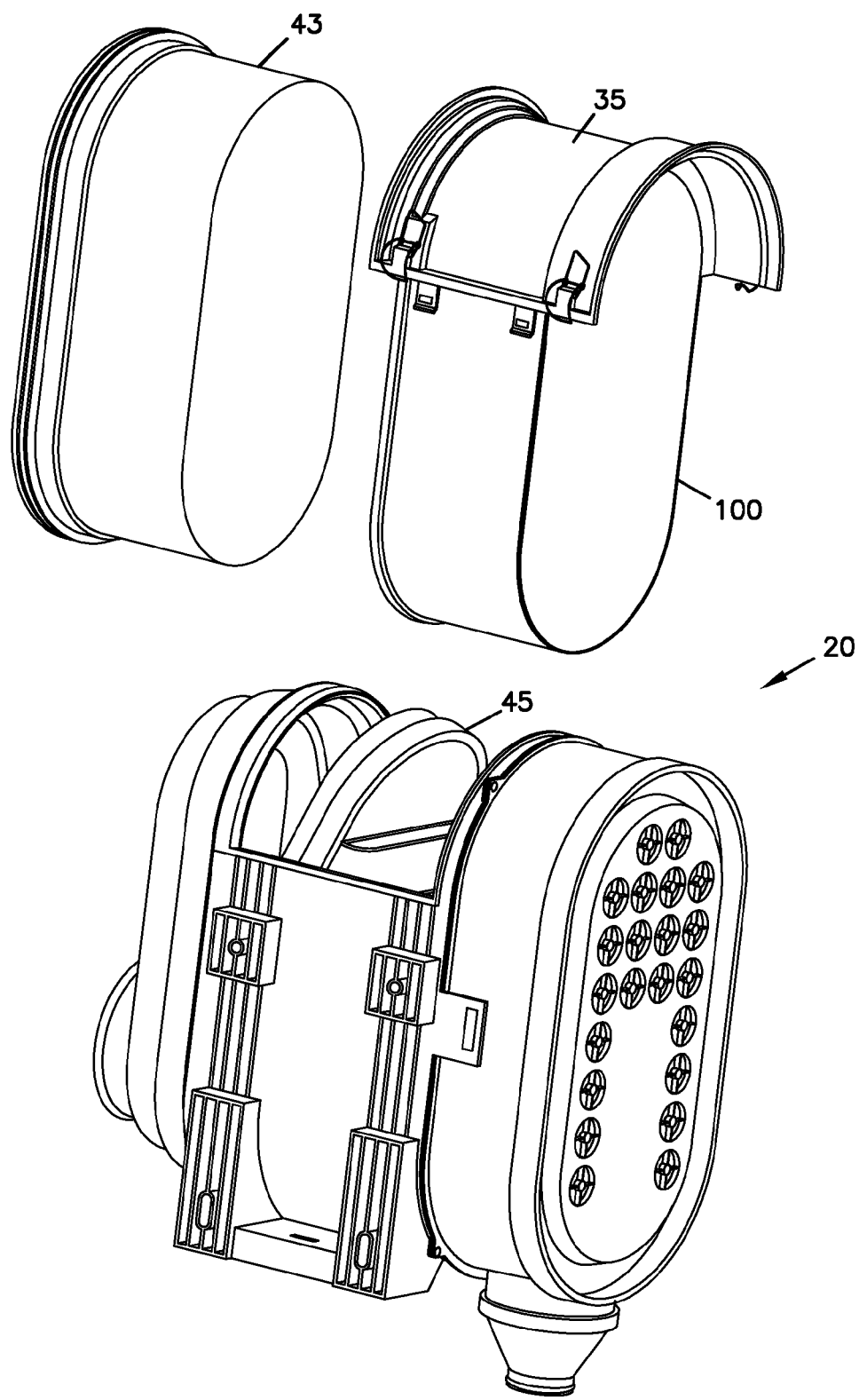
FIG. 13 depicts FIG. 12 with partial removal of a safety or secondary filter.

In FIG. 13, the air cleaner 20 is shown during a step of removing the secondary or safety element 45. In FIG. 14, the secondary or safety filter 45 is shown completely removed.

V. Configuration of the Housing 21 for Variation in Mounting and Attachment to Other Engine Components Attention is now directed to FIG. 15. In FIG. 15, housing components comprising: the inlet section 24 (precleaner section 25); central (main air filter cartridge receiving) section 27; and, outlet section 28, are shown separated from one another. Typically these components to the housing 21 would be separately assembled (i.e., be preformed), and then be secured together to form the air cleaner 20, FIG. 1. The securement together can be by removable attachment, or by an ultrasonic welding or similar technique that prevents the components from being again separable. Typically and preferably components or housing sections 24, 27 and 28 are permanently secured in the assembly 20.

Herein, certain preferred components such as inlet section 24 (i.e. precleaner section 25) and outlet section 28 will sometimes individually be referred to as a "preform" or as a "preformed component." The term "preform" and variants in this context is meant to refer to a component that is formed separately from central section 27, and is then secured thereto to form the air cleaner housing 21.

Referring to FIG. 15, central main air filter cartridge receiving section 27 includes an upstream or inlet edge 27a and a downstream or outlet edge 27b. Typically the inlet component 24 (precleaner 25) would be preformed from plastic and be assembled, and then be secured to upstream edge 27a by welding (for example sonic welding). Typically outlet section 28 would be preformed from plastic and would be secured to downstream edge 27b by welding (for example sonic welding).

This assembly approach allows the outlet section 28 to be positioned with the outlet tube 74 near cover 35 (not as shown in FIG. 15) or away from cover 35 (as shown in FIG. 15). Further it allows the option of positioning the precleaner section 25, with dust ejector port 81 directed opposite cover 35, as shown, or alternatively toward cover 35. This allows for four different overall assembly configurations, using the same components. Alternate configurations of outlet sections 28 can be used, as well as alternate configurations for inlet section 24 allowing for still more possibilities.

Still referring to FIG. 15, for the particular assembly 20 depicted therein, or in FIG. 1, the inlet section 24 (precleaner 25) is capable of being mounted in two different rotational positions, since this section 24 is asymmetric. The two orientations, in FIG. 15, would be with outlet 81 directed downwardly or upwardly. An inlet section 24 which is capable of two different rotational positions for mounting on central section 27, will be referred to herein as an eccentric component, or as a component having two different possible mounting orientations.

Similarly, outlet section 28 is eccentric, since outlet 74 is not centrally positioned. Thus section 28 is mountable in two possible rotational positions on section 27: a first position in which outlet 74 is positioned where shown in FIG. 15; and, a second position in which section 28 is rotated 180°, in section 74 this position, vertically in FIG. 15, near access cover 35.

These possibilities can be used to advantage, in providing for a unit mounted on equipment, with respect to: ease of access to the service cover for servicing; appropriate projection of the dust ejector outlet; and, preferred positioning of the outlet 74 for engagement with other equipment in the system. This is illustrated for example in FIGS. 16A-X, which provide for some but not all of the possibilities.

It is noted that above the mounting arrangement 31 for air cleaner 20 was characterized above as preferably being a 3-sided mounting arrangement 31a, or a boxed-U shaped arrangement 31a. This is because the mounting arrangement, shown in FIG. 16A, has three sides, comprising opposite, preferably parallel, sides 31b and 31c with base 31d extending therebetween, the angle of engagement between the sides 31b, 31c typically being perpendicular to the base 31d.

Referring to FIG. 15, typically when a three-sided boxed U-shaped mounting arrangement is used, on a center section 27, the access cover 35 is positioned opposite the central base 31d of the mounting arrangement. This is also shown in FIG. 1.

FIG. 16A, for example, shows the configuration of FIG. 15 mounted on central, bottom, or base section 31d of the mounting arrangement; the equipment mounting surface or structure being schematically shown at A. FIG. 16B shows an analogous mounting of the air cleaner housing portion 27, but with the outlet section 28 inverted (or mounted on section 27 rotated 180° relative to FIG. 16A). FIG. 16C depicts the arrangement mounted inverted, relative to FIG. 1. To accomplish the configuration of FIG. 16C, the assembly, FIG. 15, is to be made with the precleaner section 25 inverted or rotated 180° from the position of FIG. 15. Also, the cover 28 is rotated 180° from the position of FIG. 15.

FIG. 16D shows an analogous mounting to FIG. 16C, but with the outlet section 28 inverted relative to FIG. 16C, and thus in the same orientation, relative to the cover 35, as shown in FIG. 15.

FIG. 16E shows a side mounting, on one of the two sides (side 31c) of the housing section 27, in this instance with the outlet section 28 and precleaner section 25 in the same orientation as FIGS. 16A and 15. In FIG. 16F, the same mounting orientation is shown, but with the outlet section 28 inverted.

FIG. 16G shows a mounting on the opposite side (side 31b) but with the outlet section 28 and precleaner section 25 oriented in the same positions as FIGS. 16E, 16A and 15. FIG. 16H shows the same mounting orientation as FIG. 16G, but with the outlet section 28 inverted.

FIG. 16I depicts the air cleaner mounted with the main filter cartridge receiving section 27 inverted relative to FIG. 16G, and with the outlet section 28 and precleaner section 25 oriented analogously to FIG. 16C. FIG. 16J depicts an analogous mounting of the main filter cartridge receiving in section 27 to FIG. 16I, but with the outlet section 28 inverted.

FIG. 16K shows the assembly in the same configuration as FIGS. 16C and 16I, but mounted on an opposite side from 16I. FIG. 16L shows the assembly in the same orientation as FIGS. 16D and 16J, but with the mounting on an opposite side of section 27 from 16J.

In FIG. 16A-L, the mounting was generally in a "vertical" orientation; the term "vertical" in this context meaning mounted with the access cover 35, FIG. 1, directed either up or down; or, alternatively stated, with base 31d directed either up or down. In FIG. 16M-X, orientations and alternatives for horizontal mounting are shown. When an arrangement such as that described herein as characterized as "horizontally mounted" or by variants thereof, it is meant that the cover 35 is neither directed upwardly or downwardly, but rather is directed horizontally.

For the depictions in FIGS. 16M-16R, it is assumed that the dust ejector outlet would be attached to a scavenge system. When this is the case, the ejector does not need to be directed downwardly because a scavenge system typically applies a vacuum draw to remove the dust through the ejector tube.

Figure 16O:
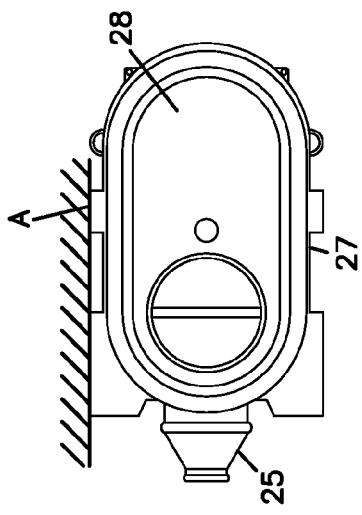
FIG. 16A-X are schematic depictions showing how an assembly having certain features as shown in FIG. 8 can be mounted in a variety of orientations.
Figure 16R:
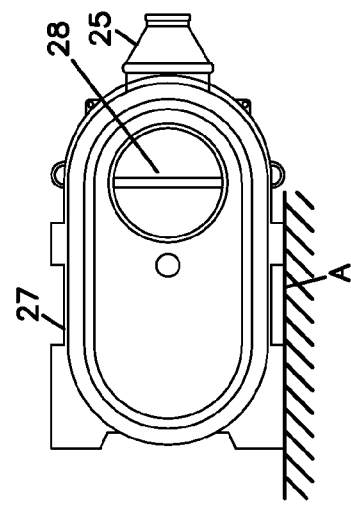
Figure 16N:
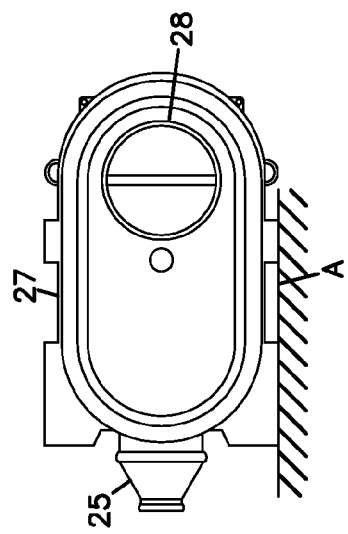
Figure 16Q:
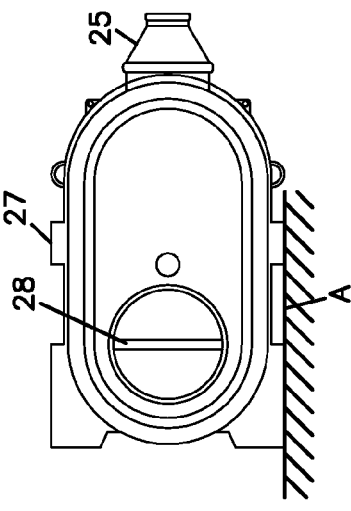
Figure 16M:
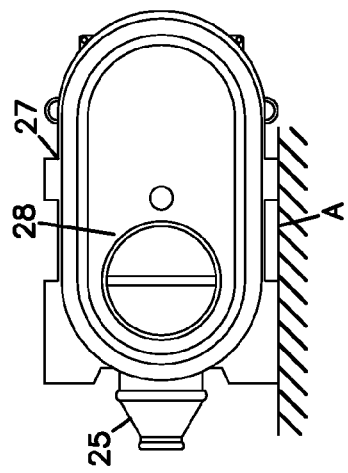

In FIG. 16M the assembly is depicted and mounted horizontal instead of vertical, but configured with the outlet section 28, central main filter cartridge 27 and precleaner section 25 oriented analogously to FIG. 16A.

Figure 16P:
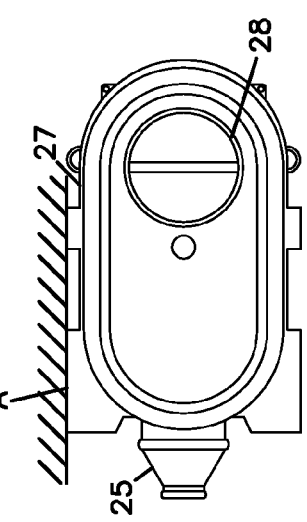
Figure 16S:
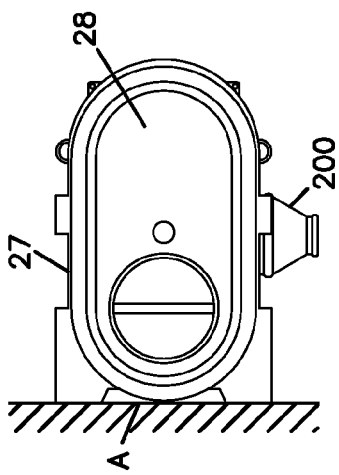

FIG. 16N shows the assembly with the outlet section 28, precleaner section 25 and main filter cartridge section 27 oriented analogously to FIG. 16B, except mounted horizontally on a side. FIG. 16O shows the assembly in an orientation analogous to FIG. 16M, except suspended from an opposite side; and FIG. 16P shows an analogous configuration to that shown in FIG. 16N, except suspended from an opposite side.

FIG. 16Q shows the air cleaner configured as shown in FIG. 16D except mounted in a horizontal orientation. FIG. 16R is analogous to FIG. 16Q, except with outlet section 28 rotated 180°.

FIG. 16S-X shows that still other alternate configurations are possible, by using a precleaner section 200 alternate to precleaner section 25, FIG. 1. The precleaner section 200 used, would include the outlet projection 201 in one of the sides 140, 141, FIG. 1, instead at one of the ends. Also, the inlet separator tubes 83 may be positioned differently. In other fashions, the componentry could be the same as the embodiments of previous figures.

Figure 16T:
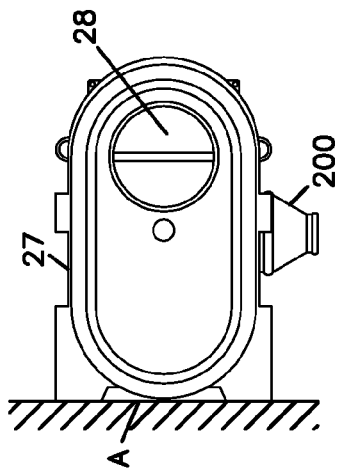
Figure 16U:
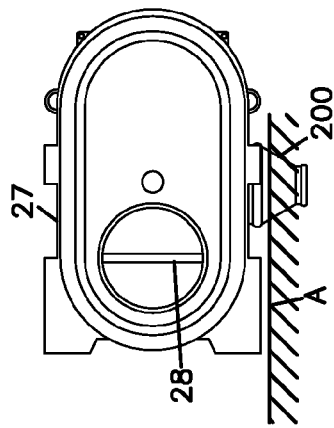
Figure 16V:
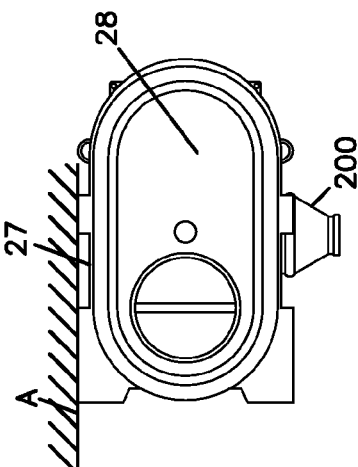
Figure 16W:
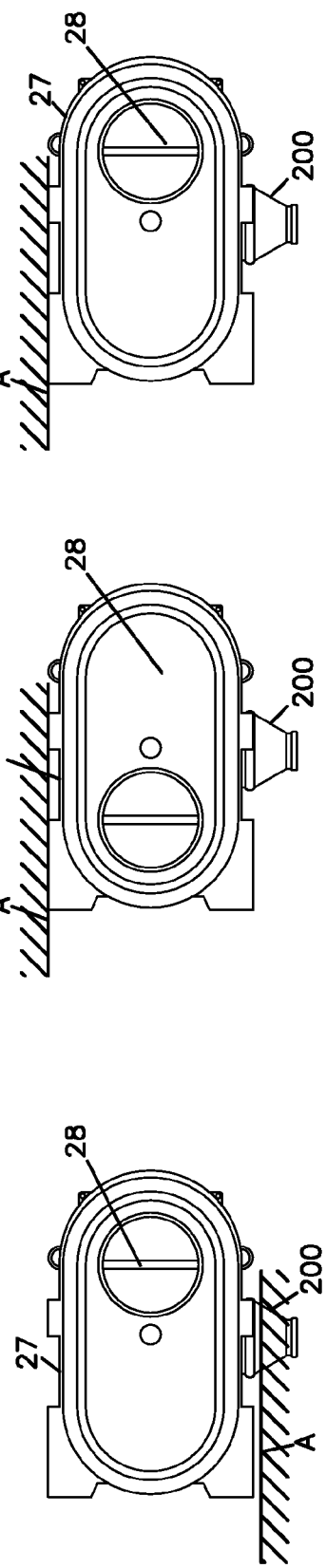
Figure 16X:
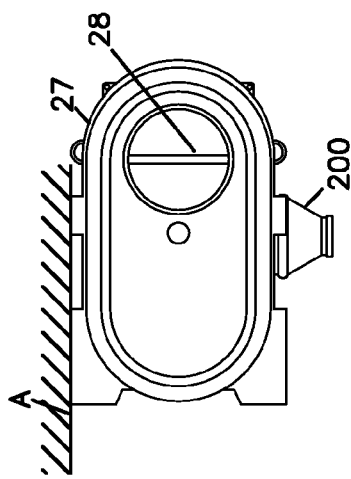

FIG. 16T is analogous to 16S, except outlet section 28 has been rotated 180°. FIG. 16U is analogous to 16S, except the arrangement is mounted on a side. FIG. 16V is analogous to 16U, except with section 28 rotated 180°. FIG. 16W is analogous to 16U except mounted from an opposite side. FIG. 16X is analogous to 16V except mounted suspended from an opposite side.

It is also noted that in some systems instead of a precleaner, an inlet arrangement could be provided mounted at edge 27a, FIG. 15. The inlet arrangement can simply be an inlet tube, as opposed to a precleaner.

VI. Alternate Cover Configurations

Figure 17:
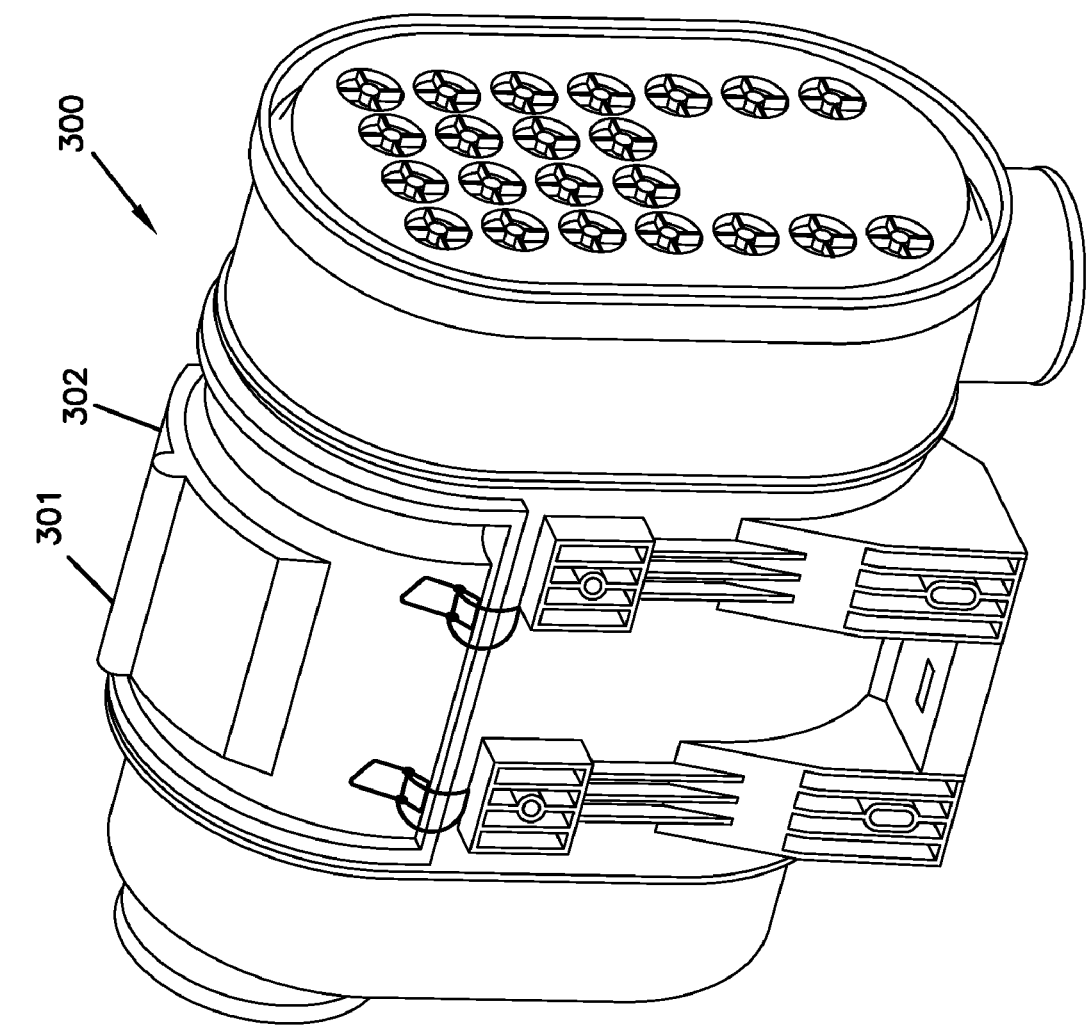
FIG. 17 is a perspective view of an alternate embodiment to the air cleaner depicted in FIG. 1.

Attention is now directed to FIG. 17, which shows an alternate assembly 300. It differs from the assembly 20, FIG. 1, in that projection 301 in access cover 302 is of different configuration, and an internally received cassette, not shown, would have an analogous projection on an outer region thereof. It is noted that such a projection would be curved, with a central, axial, ridge.

Referring to FIG. 3, it is noted that projection 131 and receiver 41 help ensure the cartridge 100 is in an appropriate position, for operation, when cover 35 is positioned in place and the assembly 20 is used. Analogous features in assembly 300 will operate in an analogous manners.

VII. The Primary or Main Filter Cartridge 45

In FIGS. 19-21, the cartridge 43 is depicted. Referring to FIG. 19, cartridge 43 includes media pack 50 having housing seal arrangement 51 secured thereto. Typically and preferably the housing seal arrangement 51 comprises a region of molded in place compressible seal material, for example a polyurethane foam, having a region forming a radial seal as described above. In FIG. 19, the seal region is indicated at 51b.

The seal arrangement 51 further includes a portion of seal material 130 engaging media pack 50 and securing the seal arrangement 51 thereto. Preferably region 130 is integral with region 51b; i.e., they are molded simultaneously from one pool of resin.

Referring to FIG. 21, a grid 52 is depicted with projection 58 thereon. The projection 58 provides a back up to seal region 51 and in particular radial seal region 51b. Preferably the grid 52 and support 58 are integral with one another and form a molded preform (molded from a rigid material such as a nylon or polypropylene) secured to end 55 of media pack 50, and sealed thereto by region 130 of sealant material.

As an example only, a useable cartridge 43 would have a longer dimension, between curved ends 50b, 50c, about 330 mm and a shorter dimension, between opposite sides 50d, 50e, of about 203 mm. The axial length of the media pack can be chosen for the amount of dust load desired, for a given air cleaner configuration.

Referring to FIG. 21, it is noted that at the outlet end, individual inlet flutes, shown schematically at 500 are darted closed, as illustrated schematically at 501. This is an optional approach to closure, as described for example in PCT publication WO 04/007054, published Jan. 22, 2004, incorporated herein by reference. Also as indicated in FIG. 21, seal material forming the housing seal arrangement 57 and seal region 130 also projects inside of the outermost wrap or coil 502 of media. The optional approach is described for example in U.S. provisional application 60/532,783, incorporated herein by reference.

The media material is a matter of choice, for the specific application and level of efficiency desired. The media may have a fine fiber application to one or more sides thereof. Conventional materials, or materials yet to be developed, can be used.

VIII. Z-Filter Media Generally

Z-filter media was described, generally, above in connection with FIGS. 26-30.

Figure 22:
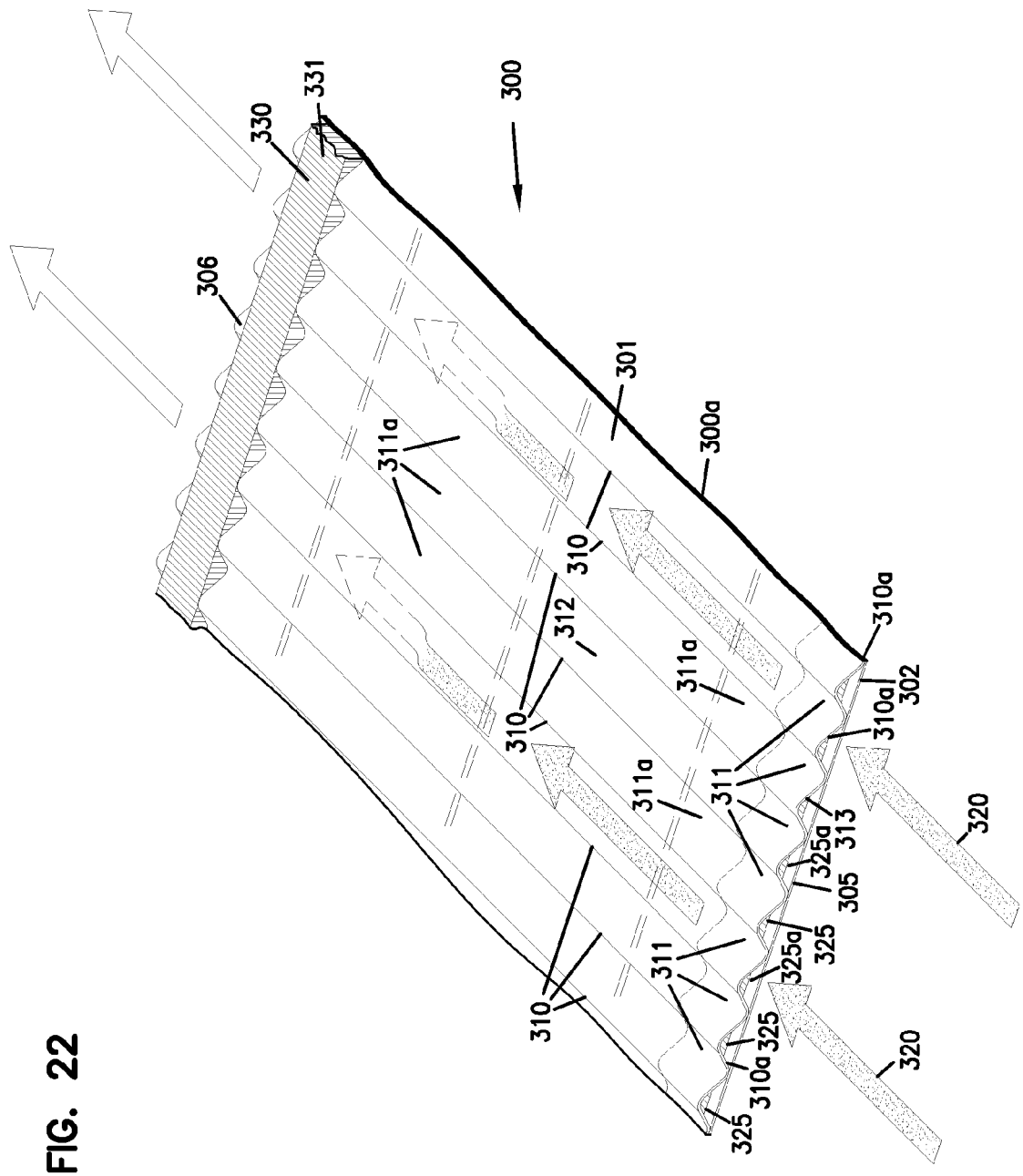
FIG. 22 is a fragmentary view of z-filter media useable in the filter cartridge of FIGS. 3 and 19-21.

Attention is now directed to FIG. 22. In FIG. 22 z-filter media is generally indicated at reference numeral 300. In FIG. 22, an example air flow direction opposite to FIG. 26 is shown, as an example. Thus, z-filter media 300 generally comprises a fluted or corrugated sheet 301 secured to a facing sheet 302, for example by sealant or other means. The facing sheet 302 may be non-corrugated, although in some instances it may also be corrugated for example as described in U.S. provisional application 60/543,804, filed Feb. 11, 2004 and incorporated herein by reference.

Referring to FIG. 22, the media 300 has opposite ends 305 and 306. End 305 can form inlet face 54, FIG. 3; and end 306 can form outlet face 55, FIG. 3; although an opposite approach is useable and sometimes preferred.

Corrugated sheet 301 comprises: (a) a plurality of alternating ridges 310 and troughs 311; and, (b) opposite sides 312 and 313. Generally troughs 311 on side 312 form inlet flutes 311a, and air can enter them in the direction of arrows 320 along end 305. On opposite side 313 the ridges 310 define outlet flutes 310a which are closed at or near end 305 at 325. Closure 325 may be formed in a variety of manners including by sealant 325a, folding or other arrangements. Air cannot enter (or leave) flutes at an end closed by sealant 325a.

Adjacent end 306, flutes formed in side 312 by troughs 311 are closed at 330 in this instance by sealant 331.

In general, media strip 300a is formed by corrugated sheet 301 and facing sheet 302 secured to one another and then either cut and stacked or coiled into a media pack, the media pack of FIG. 3 being coiled with the facing sheet directed outwardly. Air can enter the inlet flutes 311a, but cannot exit at end 306 unless it passes through the media 301 into outlet flutes 310a. (Of course if oriented so air flows in an opposite direction, the air enters flutes 310a at end 306, and exits flutes 311a at end 305.)

In general, then, z-filter media can be characterized as comprising a corrugated fluted sheet secured to a facing sheet and configured to provide a plurality of inlet flutes and outlet flutes. The inlet flutes are open at an inlet face of the arrangement and closed in an outlet face, for example by sealant. Typically the outlet flutes are closed at the inlet face and open at the outlet face. The closure can be immediately adjacent the associated face, or spaced therefrom slightly, depending upon the nature of the processing steps used to form the arrangement. The z-filter media can then be coiled, or can be cut into strips and stacked, again depending on the arrangement.

IX. The Safety Element, FIGS. 23-25

Figure 23:
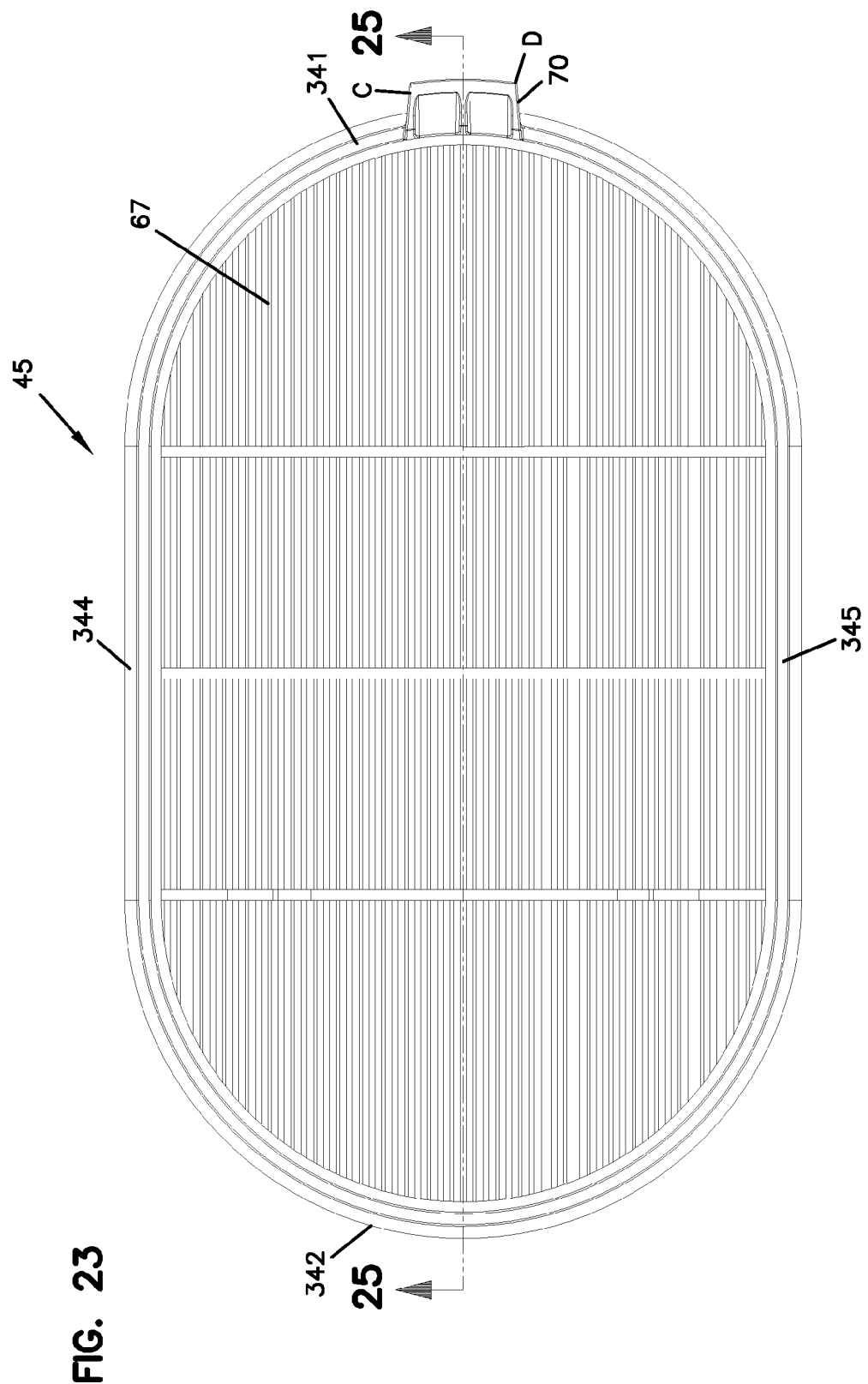
FIG. 23 is a top plan view of a safety element useable in the assembly of FIG. 1-3.
Figure 24:
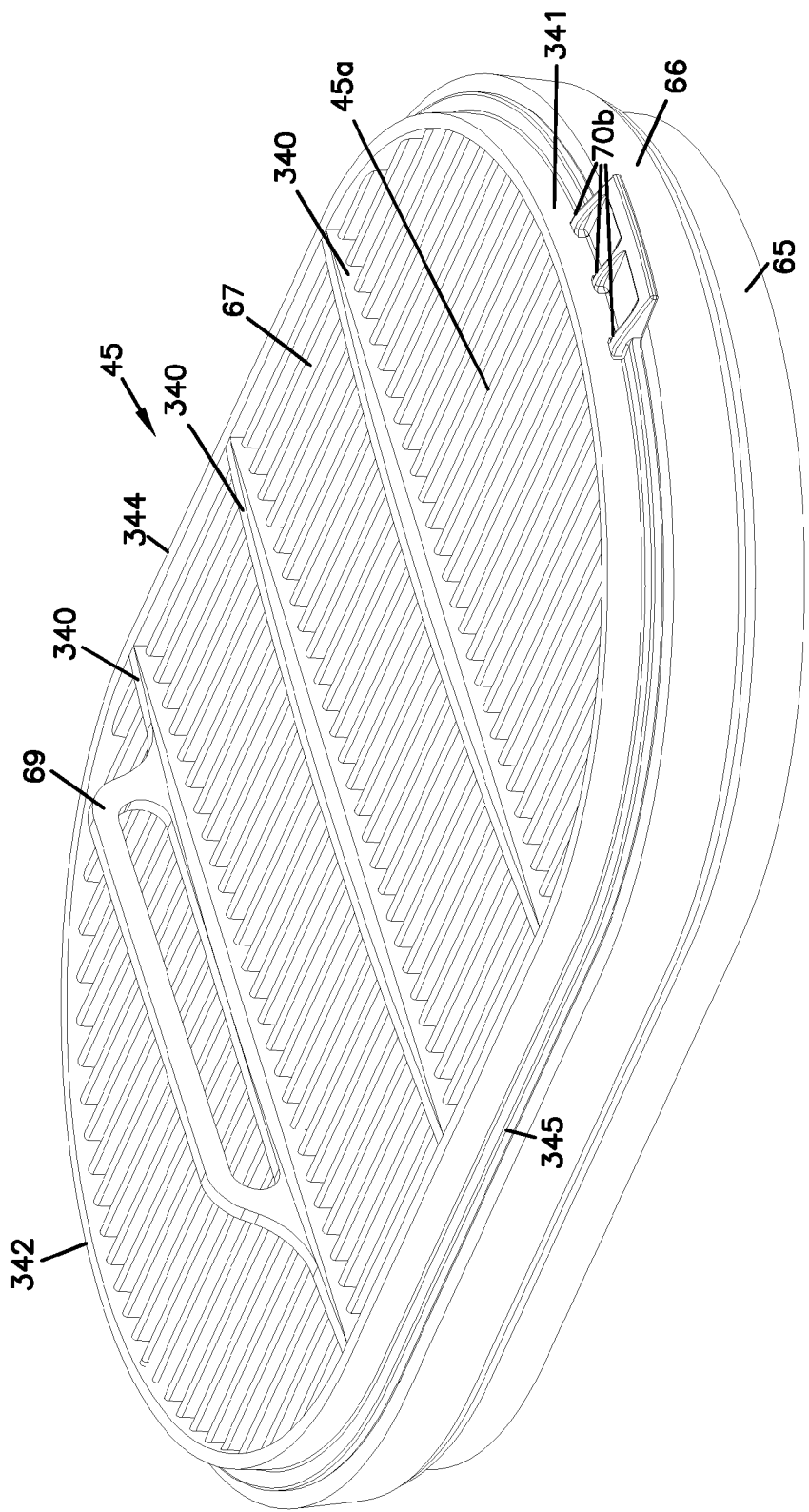
FIG. 24 is a inlet end perspective view of the safety element depicted in FIG. 23.
Figure 25:
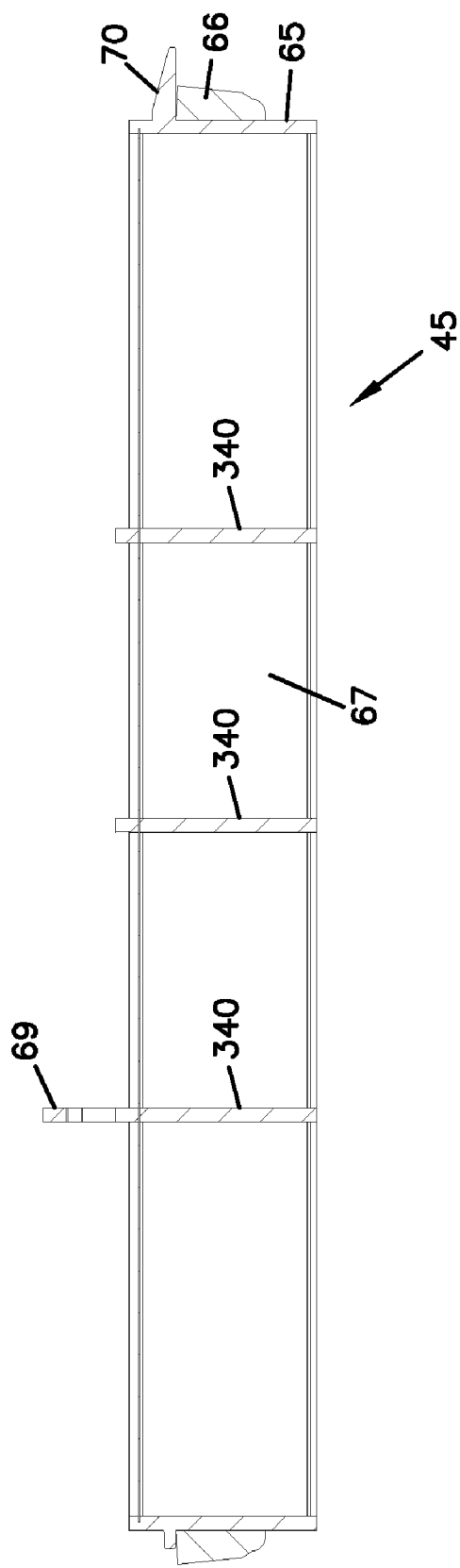
FIG. 25 is a cross-sectional view taken along line 25-25, FIG. 23.

Attention is now directed to FIG. 23 in which safety element 45 is depicted. The safety element 45 is shown in perspective view, in FIG. 24. Referring to FIG. 24, the safety element 45 comprises a preformed outer skirt 65, radial seal 66, end projection 70, handle 69 and media 45a. The media 45a is preferably pleated, is surrounded by skirt 66 and is secured in position by comb (pleat spacer) projections 340 extending across skirt 66. The skirt 66 generally has an oval shape with opposite curved ends 341, 342 and opposite sides 344, 345.

Referring to FIGS. 23 and 24, typically projection 70 is centered in one of the curved ends 341. Preferably it has a width (distance of extension between point C and D of FIG. 23) of at least 10 mm, typically at least 20 mm, for example 25-40 mm. Further, it preferably has a distance of projection, radially outwardly from skirt 64, FIG. 25, (i.e., in a direction opposite end 342) of at least 5 mm, typically at least 10 mm. Referring to FIG. 24, projection 70 includes ribs 70b, for engagement with recess 70a, FIG. 3.

It is noted that in FIG. 3, the safety element 45 is shown mounted with the handle 69 down and the projection 70 up. The assembly 20 could be configured for an opposite mounting.

X. Methods of Installation and Assembly

From the above descriptions, generally a method of installing an air filter cartridge into an air cleaner housing, through a side service access opening in the air cleaner, is provided. The method generally includes steps of: inserting an air filter cartridge comprising a media pack and housing seal arrangement secured to the media pack into a cassette defining an interior; and installing the resulting filter cartridge/cassette combination by insertion through the side access with biasing of the cassette axially upon engagement between the cassette and a stationary cam member positioned within the air cleaner housing. Preferably the method is conducted with an air filter cartridge media pack as defined, and with the housing seal as defined. Most preferably it is conducted such that the step of inserting the media pack into the cassette including pinching an end of the media pack opposite the housing seal arrangement in a media pack support arrangement in the cassette, with pinching being directed against four sides of the media pack.

Also provided is a method of assembling an air cleaner assembly including steps of securing an outlet section having an eccentrically positioned hollow tube therein to a central housing section having a box U-shape mounting arrangement thereon; and securing an inlet section, preferably comprising a precleaner with an eccentrically positioned dust ejector outlet, to the central housing section. The step of assembly further would preferably include a step of installing an air filter cartridge in the central housing section, the air filter cartridge comprising a media as described and a housing seal arrangement as described. Preferably, the method involves installing the air filter cartridge into the housing the general method involving insertion of the cartridge into a cassette, and then installing the resulting cassette/filter cartridge combination.

XI. Assembly Configuration

Herein, the preferred assembly depicted is provided to accommodate a media pack having an oval shape in cross-section or outer perimeter. By oval shape as previously indicated, it is meant that the media pack has at least two opposite curved ends (or sides) and a pair of opposite sides extending therebetween. The opposite sides can be straight, as described, or can be curved.

Preferred configurations to accommodate this were provided to sections of the housing and the safety element as well.

Of course alternate configurations are possible. For example the media pack can be provided with a circular configuration and correspondingly the housing sections and safety element can be provided with circular configurations, although still further alternatives are possible.

XII. Example Air Cleaner Configurations Having a Two-Stage Construction with: a Precleaner; Side-Load; a Main Filter Element; and, a Safety Filter Element A. The Example of Air Cleaner, FIGS. 31-46.

The reference numeral 600, FIGS. 31, 32, depict an air cleaner assembly embodying any of the principles described previously above. Referring to FIG. 31, air cleaner 600 comprises housing 601. Internally received within housing 501 are included, as described below, a filter cartridge and a safety filter.

Housing 601 generally comprises a main central body 605, an access cover 606, inlet section 607 and outlet section 608. The inlet section 607, in the air cleaner 600 depicted, comprises a precleaner section 609 generally as described above in connection with FIG. 1 and related descriptions. At 610 a dust ejector or drop tube for the precleaner section 609 is provided. Typically outlet 611 would be provided with a dust ejector valve, as previously described, or it would be attached to a scavenge tube. When used as a drop tube, it is preferably oriented to point down, when air cleaner assembly 600 is installed for use. When used as a scavenge tube, with a suction draw, it will typically be pointed down also, although alternatives are possible.

Outlet section 608 includes a non-centrally disposed outlet aperture 615, analogous to those described above.

Preferably, a modular construction is used for housing 601. Thus section 507 can be mounted in either of two rotational orientations. Although alternatives are possible, typically once mounted, it would be permanently secured in place through heat staking, welding or similar attachment. Also, cover outlet section 608 can be mounted in either of two rotational positions, again typically permanently through heat staking, welding or other approaches.

Figure 36:
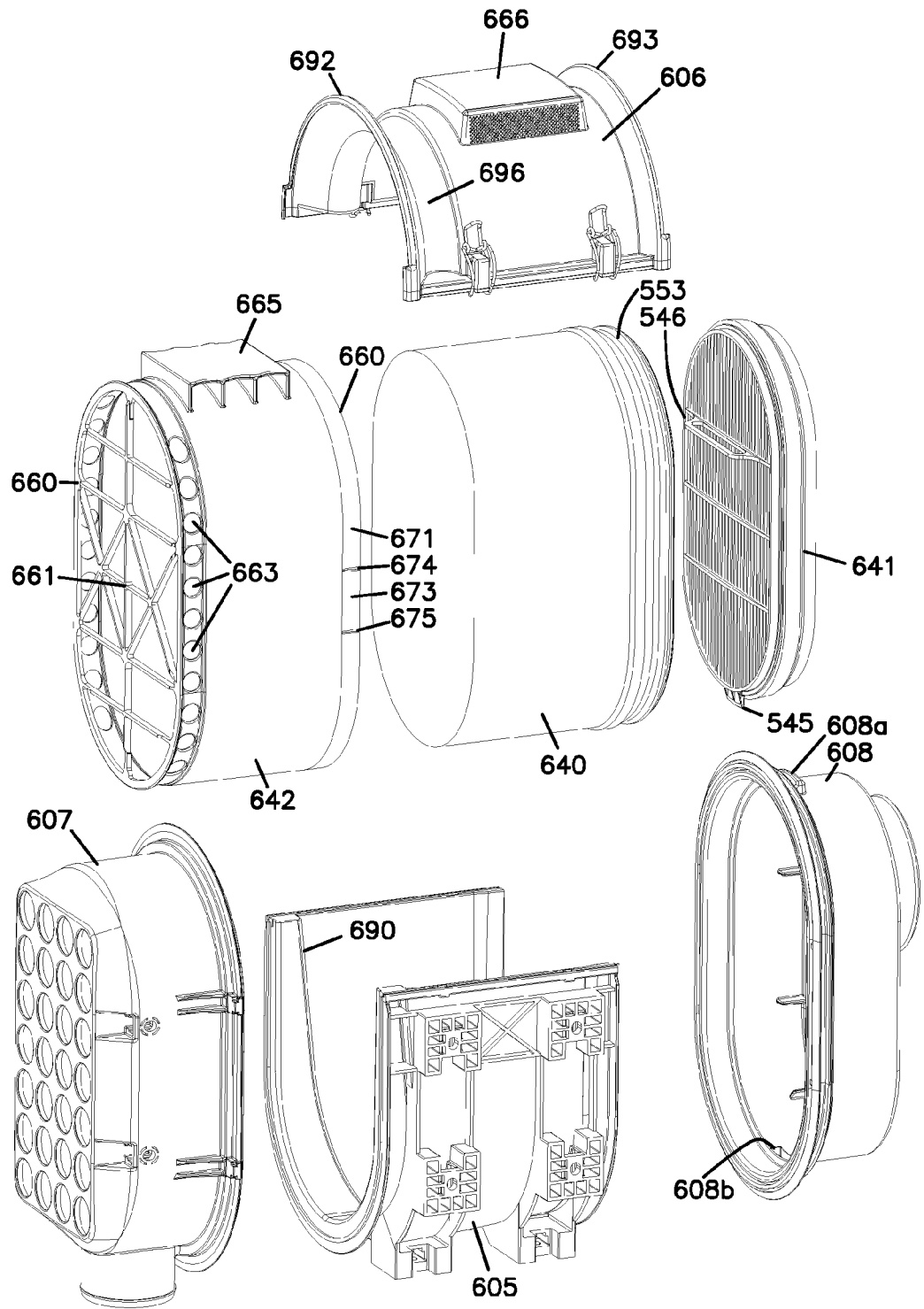
FIG. 36 is an exploded perspective view of the air cleaner of FIG. 31.
Figure 37:
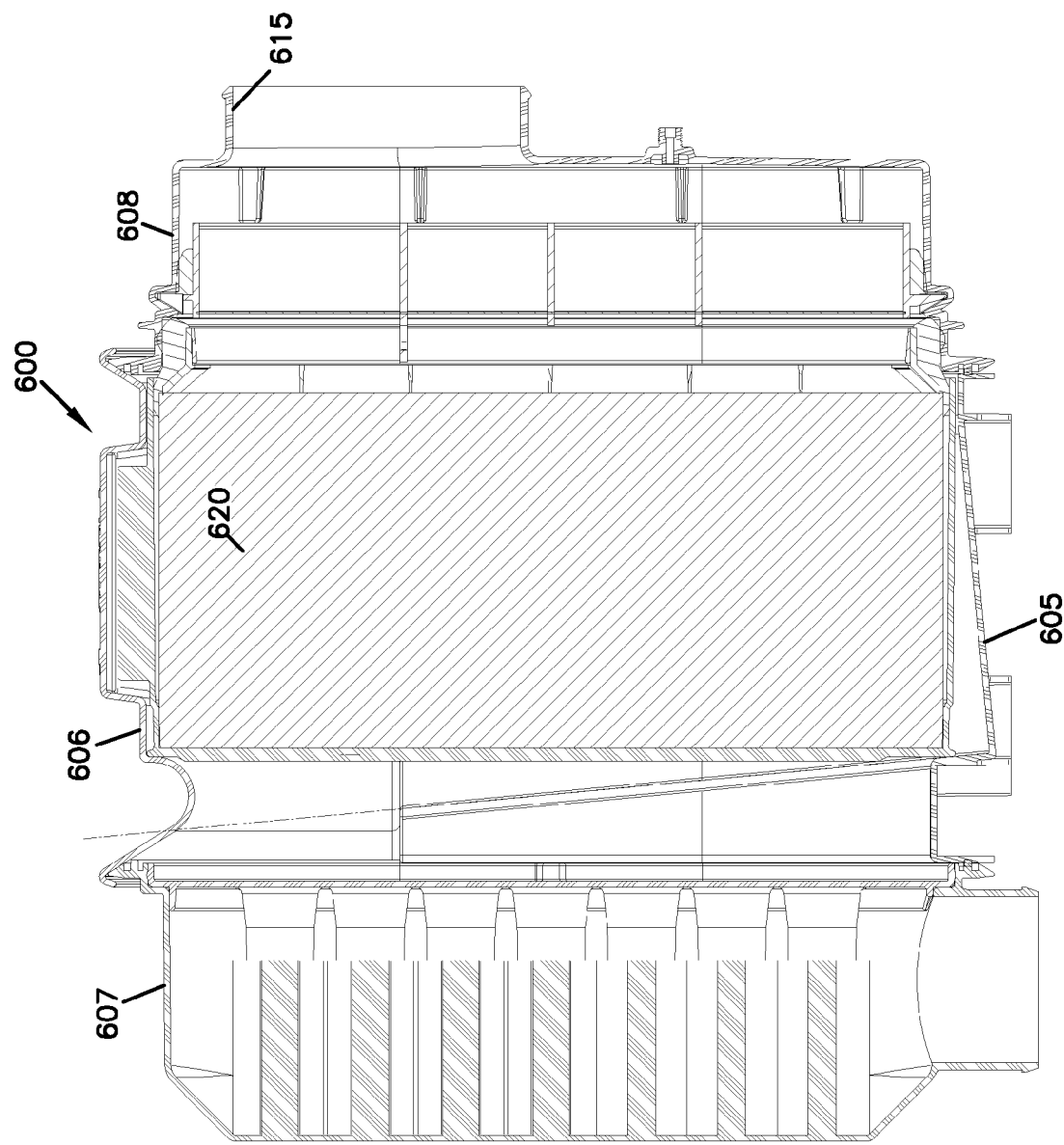
FIG. 37 is a cross-sectional view of the air cleaner of FIG. 31, taken along lines 37-37, FIG. 35.
Figure 38:
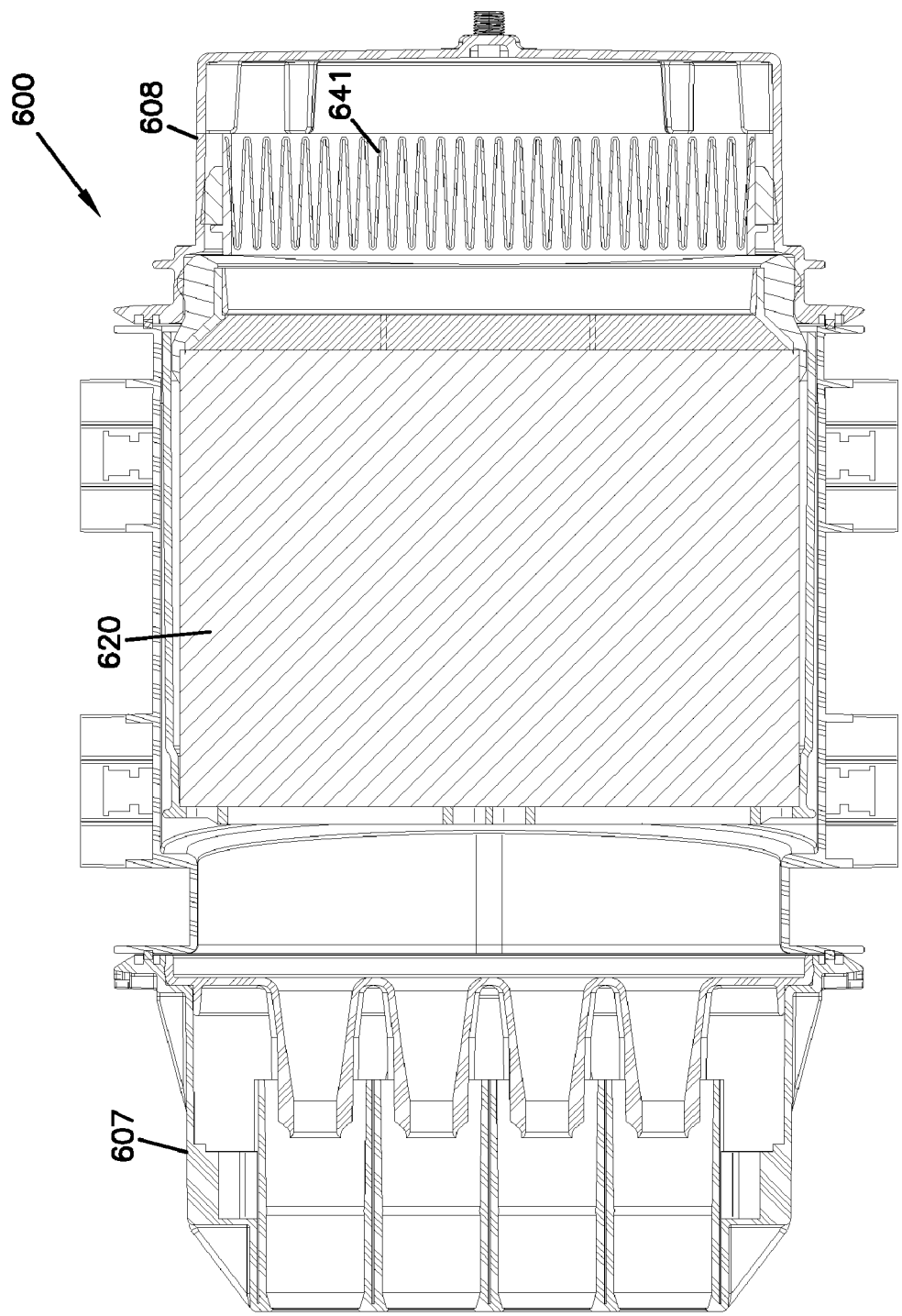
FIG. 38 is a cross-sectional view of the air cleaner of FIG. 31, taken along lines 38-38, FIG. 35.

In FIG. 36, the air cleaner 600 is depicted in exploded view, and the individual sections 605, 607 and 608 are viewable, along with access cover 606.

Referring again to FIGS. 31 and 32, access cover 606 is secured in place by releasable latches 620, on base or body 605. A variety of latch arrangements can be used, over center wire latches being shown as an example.

From FIGS. 31-35, it can be seen that central base member 605 is provided with a with a boxed, U-shaped, three-sided mounting arrangement 625, so that it can be mounted in a variety of orientations, as generally indicated and described previously or in for other embodiments.

It is noted that in alternate embodiments, as described previously (with respect to other sections), precleaner 607 could be provided such that ejector tube 611 extends outwardly from one of the opposite sides, 607b, FIG. 32, instead of from an end 607c, FIG. 31. This would allow for convenient and effective dust ejection, for instances when the assembly 600 is mounted in a different orientation.

Typically, section 607 would be provided with one or the other of the two ejector tube locations, one being closed although in some instances both could be provided.

Referring to FIG. 31, outlet section 608 is provided with two projections 608a, 608b, extending opposite from one another, along opposite narrow curved ends of the section 608. Internally, a receiver is located within each of these projections 608a, 608b, for use as described below.

Figure 33:
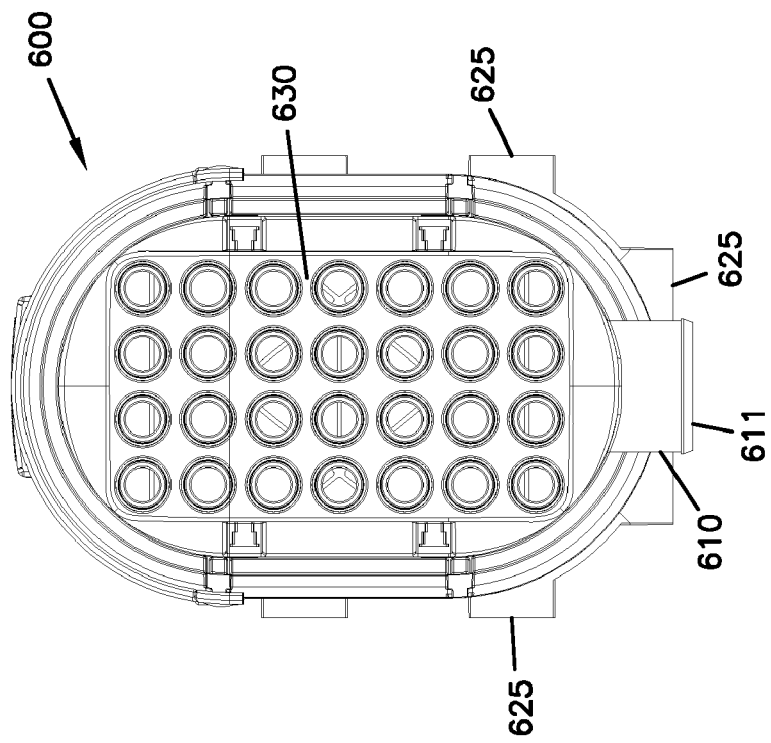
FIG. 33 is an inlet end view of the air cleaner of FIG. 31.

In typical operation, air to be filtered will enter inlet 607 at face 630. Referring to FIG. 33, it can be seen that in face 630 inlet ends of a plurality of centrifugal separators or cyclonic separators are provided.

Figure 34:
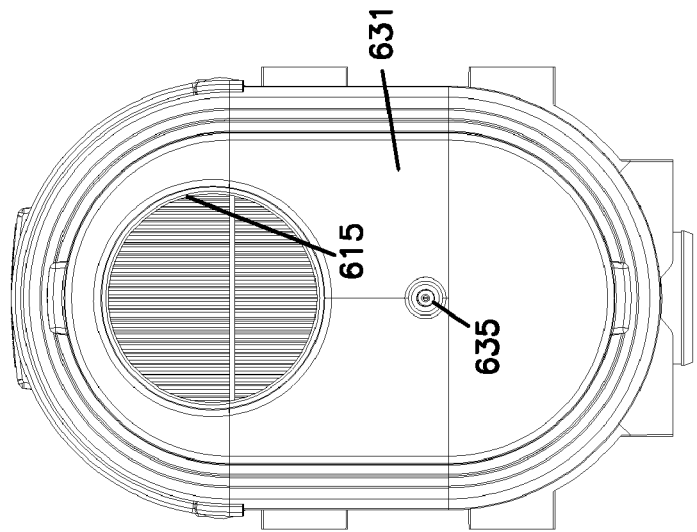
FIG. 34 is an outlet end view of the air cleaner of FIG. 31.

Filtered air would then exit the air cleaner 600 at an opposite end 631 through outlet 615. In FIG. 34 it can be seen that outlet 615 is provided in section 608, along with a pressure indicator 635.

Attention is now directed to FIG. 36, in which air cleaner 600 is depicted in exploded, perspective view. In FIG. 36, the following internally received componentry can be viewed: primary filter element 640, safety element 641 and filter element receiving cassette 642.

Attention is first directed to safety element 641. In general safety element 641 is similar to safety element 45, FIG. 24, except as follows. In particular projection 645 is directed downwardly. It is noted that for the particular embodiment shown in FIG. 36, outlet section 608 includes recess 608b, so that projection 645 could be positioned therein, during a step of securing safety element 641 in position, by grasping handle 646. Of course safety element 641 could be oriented in the opposite rotational mounting position, with projection 645 extending into receiver 608a. By having two receivers 608a, 608b, no matter how section 608 is rotationally mounted, projection 645 can be extended therein, whether directed downwardly or upwardly.

Figure 39:
FIG. 39 is a side elevational view of a filter cartridge useable in the air cleaner assembly of FIG. 31.
Figure 40:
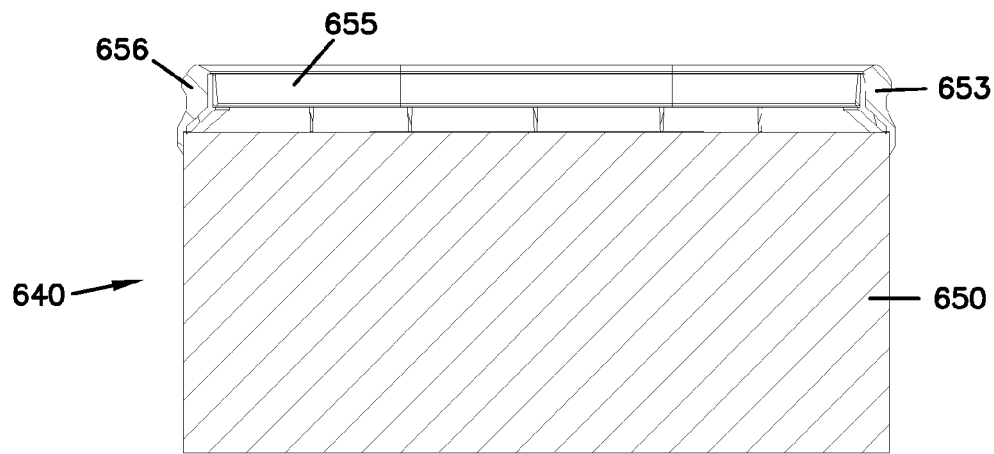
FIG. 40 is a cross-sectional view of the filter cartridge of FIG. 39.
Figure 41:
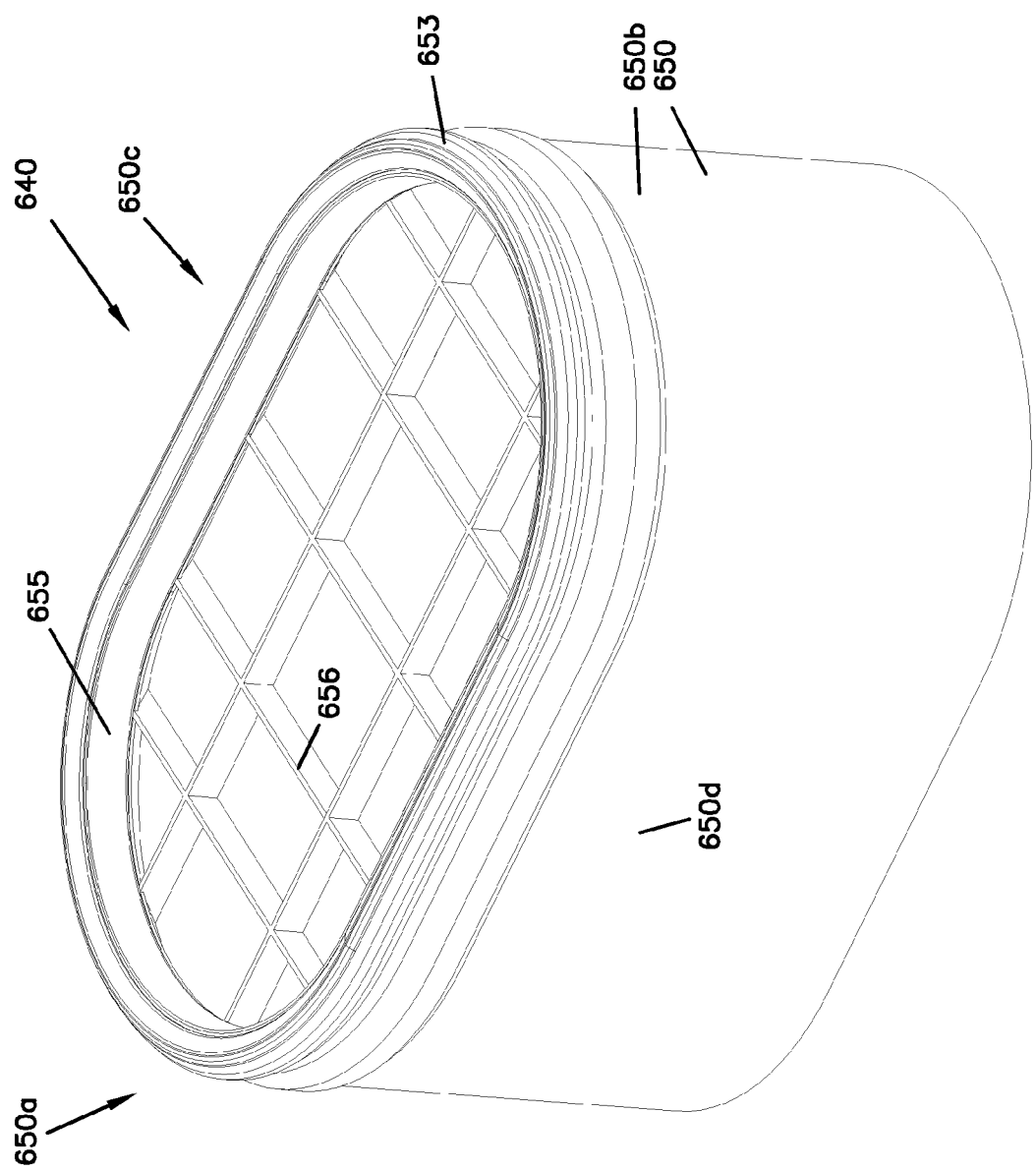
FIG. 41 is a perspective view of the filter cartridge of FIG. 39.
Figure 42:
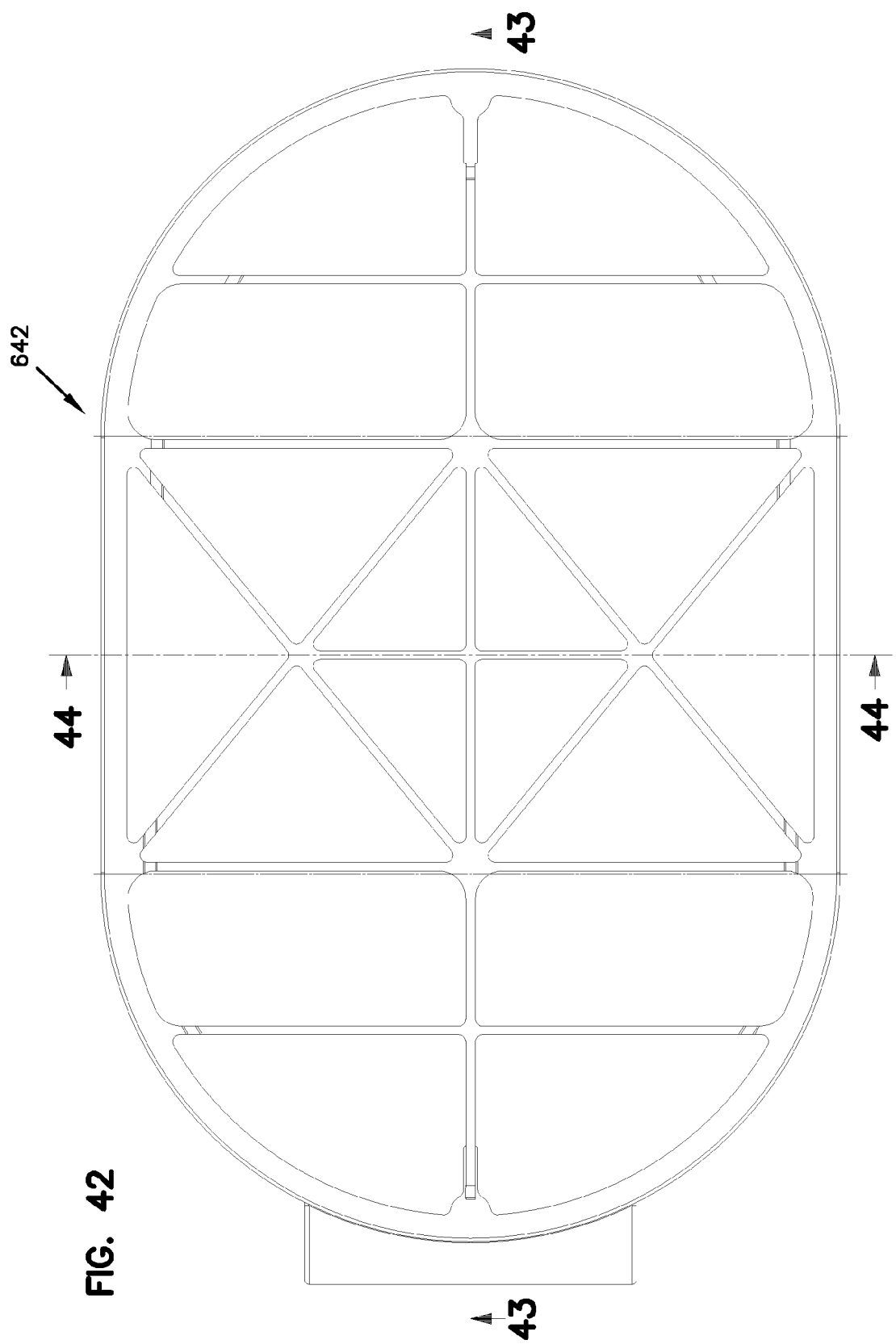
FIG. 42 is an inlet end view cassette useable to receive the filter cartridge of FIG. 39 within the air cleaner of FIG. 31.

Filter cartridge 640, depicted in side elevational view in FIG. 39, cross-sectional view in FIG. 40 and perspective view in FIG. 41 generally comprises a media pack 650, in this instance a coiled z-filter media pack. The coiled z-filter media pack 650, in the example shown, is generally oval cross-section, in this instance racetrack, with opposite curved ends (FIG. 41) 650a, 650b and opposite sides 650c, 650d. The sides 650c, 650d can be straight and parallel, or can have slight curvature and be opposite one another.

The filter cartridge 640 further includes a seal arrangement 653, in this instance oriented to form an outside radial seal. In FIG. 40 it can been that the seal arrangement 653 generally comprises a support 655 having seal material 656 thereon. This general approach was described above, in connection with FIGS. 19-21.

Referring to FIG. 41, it can be seen the support 655 includes grid work 656 extending there across.

Although alternatives are possible, filter cartridge 650 with features as described in connection with FIGS. 39-41, and previously herein, will be convenient for arrangements according to the present disclosure.

Figure 45:
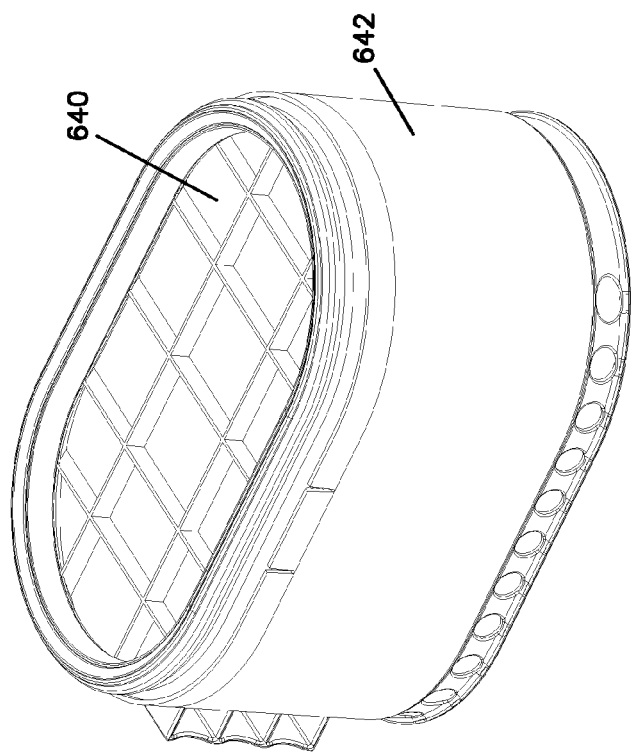
FIG. 45 is an outlet end perspective view of a sub-assembly comprising a filter element according to FIG. 39 received within a cassette according to FIG. 42.
Figure 46:
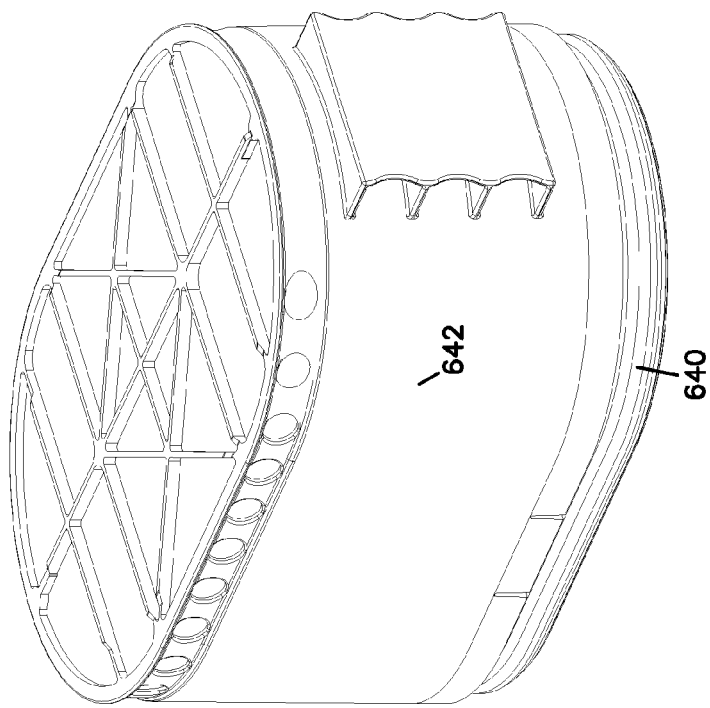
FIG. 46 is an inlet end perspective view of an inlet end of the assembly of FIG. 45.

Referring again to FIG. 36, cassette 642 is sized to receive filter cartridge 640 therein, with seal arrangement 653 projecting therefrom, during use. This combination of the two components (i.e., cassette 642 and filter 640), is shown in FIGS. 45 and 46. In FIG. 45 the perspective view depicts the air flow outlet end; and, in FIG. 46 the perspective view depicts the air inflow end.

Referring to FIG. 36, in this instance the cassette 642 has, adjacent air flow inlet end 660: grid work 661 extending across opening 662; and, a plurality of apertures 663, through a side wall of the cassette. These apertures 663 facilitate manipulation of the cassette, in some applications.

Figure 43:
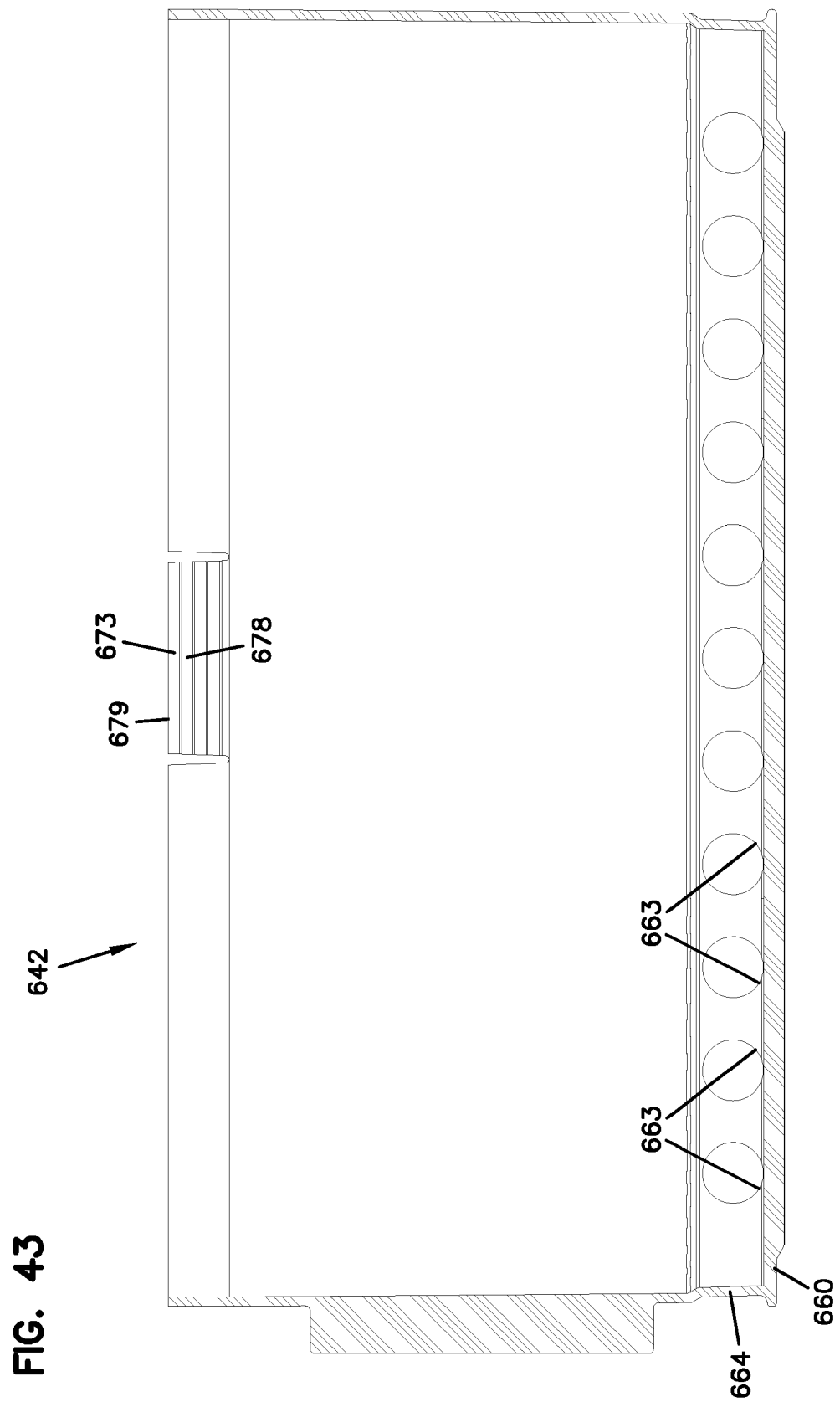
FIG. 43 is a cross-sectional view of the filter cartridge of FIG. 42, taken along line 43-43 thereof.

Referring to FIG. 43, preferably apertures 663 are located in an end region 664 of cassette 642 adjacent inlet end 660. Region 664 is preferably a region of smaller inside size, forming an internal shelf 664a, FIG. 43, for engagement with the media pack, analogously to region 121, FIG. 7.

Figure 44:
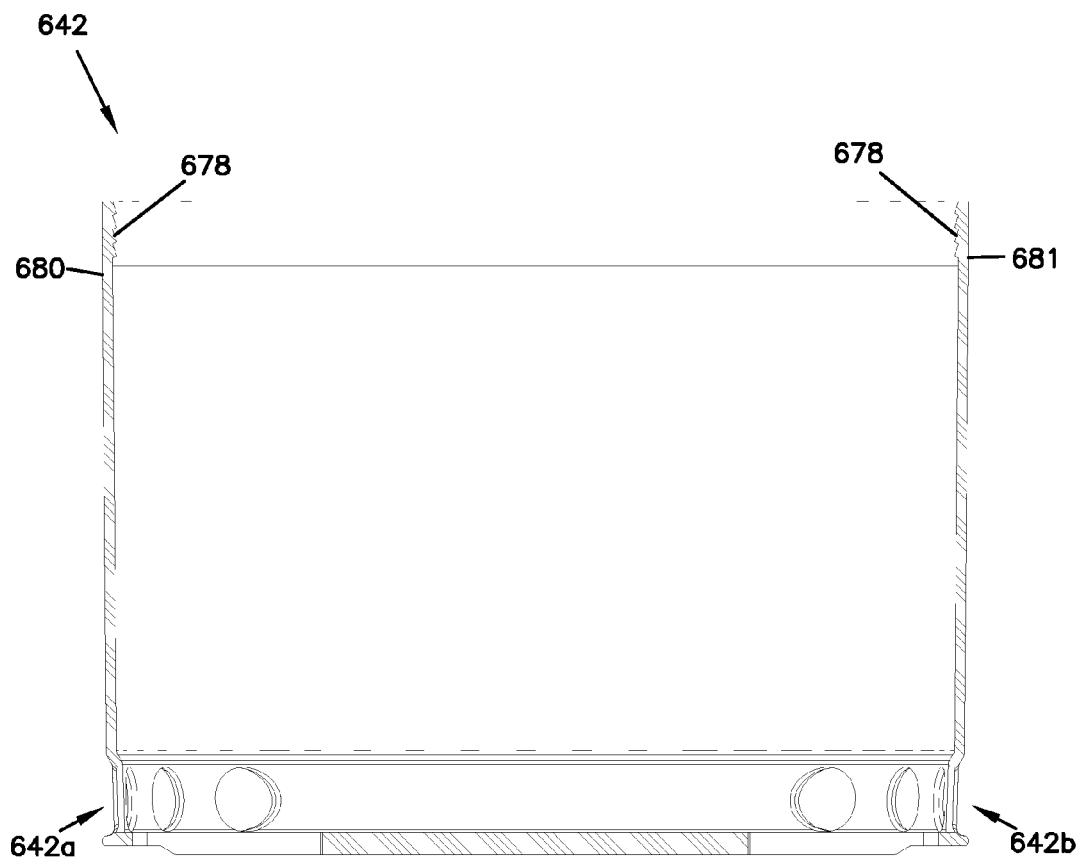
FIG. 44 is a cross-sectional view of the filter cartridge of FIG. 42, and taken along line 44-44 thereof.

Referring to FIG. 44, preferably apertures 663 are provided in lines on opposite sides 642a, 642b of cartridge 642. In this instance, opposite ends of the lines curve a little, over the opposite curved sides.

It is noted that the cassette 642 also includes handle arrangement 665 thereon, similar to arrangements previously described herein. Further, cover 606 includes a receiver 666 therein, to accommodate handle 665, again in accord with previous descriptions.

Referring to FIG. 36, at end 670, opposite end 660, cassette 642 includes a rim 671 having two central sections therein, a first indicated at 673, and second not being viewable in FIG. 36 but being located as a mirror image at an opposite portion of rim 671. Section 673 is a somewhat flexible tab separated from a remainder of rim 671 by sections or divider 674, 675.

In FIG. 43, cassette 642 is depicted in cross-section, the opposite side being a mirror image. In FIG. 43, tab 673 is viewable having teeth 678 thereon. The teeth 678 are preferably barb shaped, with a taper to a narrow point toward edge 679.

Referring to FIG. 36, in use when cartridge 640 is pushed into an interior of cassette 642 through end 670, when seal arrangement 653 is countered, teeth 678 will dig into or grab a portion of the seal arrangement 653, securing the cartridge 640 and cassette 642 together. Generally the barb size will be selected so as to permit disengagement under hand pressure.

For the particular cassette 642 depicted, FIG. 44, multiple rows, in this instance four rows of barbs or teeth are provided, in each side of the cassette. Alternative numbers can be used.

The teeth or barbs are preferably located to engage a portion of the sealing material on the media pack not involved in sealing against the air cleaner housing, in particular a portion of sealing material which overlaps the media pack. The material at this location is preferably a polymeric material which is sufficiently soft for the barbs to dig in and grab sufficiently. Polyurethane materials of the type described above for the seal region, are examples of materials appropriate for this.

As a twisting force is placed on the cassette, to manipulate the seal arrangement on the media pack into and out of sealing with the housing, the teeth tend to dig into or grab at the seal material, facilitating engagement and manipulation of the media pack. On the other hand, when twisting is stopped, the teeth are generally sized so as not to dig into the seal material as far as to inhibit manual separation. The teeth are preferably shaped and sized, so as not to irreparably damage the seal material where the engagement occurs. Preferred seal materials of the type described herein, along with tooth arrangements of the type shown and of the relative size shown, are examples of appropriate arrangements.

The preferred teeth 678 depicted are configured and oriented as one-way barbs. By the term "one-way barbs" in this context, it is meant that the teeth tend to dig into a portion of the seal arrangement 653 (not covering a portion which seals to the housing) when pulled in one direction, but tend to release when pushed or pulled in the other. Teeth 678 are preferably oriented so that they will tend to dig in, when the seal arrangement 653 is pulled out of sealing engagement with the air cleaner housing. This will facilitate removal of the cartridge 640 out of sealing with the housing, as desired. At least one toothed row is useable, preferably at least three rows are used. The preferred points of the teeth have one side generally perpendicular to a central axis of the cassette, and another side at an oblique angle to this axis.

Release of the cartridge 640 from the cassette 642, is straight forward when the one-way barb arrangement is used for the teeth 678. Hand pressure is all that is needed.

The apertures 663 facilitate carrying of the assembly resulting from a combination of cassette 642 and cartridge 640. However the apertures 663 also facilitate operation in a different mode. In particular, in some alternate embodiments, section 507 may be removable, to provide for service access to an interior of the air cleaner, as opposed to the use of a service access cover 606. In such an arrangement, the cartridge would be loaded through an end load as opposed to a side load. With such an arrangement, the apertures 663 facilitate pulling the cassette 642 and cartridge 640 out of sealing engagement within the assembly.

In FIG. 44, a different cross-section of cassette 642 is depicted. Barb-shaped teeth 678 in rim section 671 can be viewed on opposite sides 680, 681 of the cassette 642.

Referring to FIG. 36, it is noted that for the particular arrangement depicted, an internal cam or ramp 690 is provided in base 605, so that when cassette 642 is pushed in through an opening (when access cover 606, FIG. 31, is removed) the cassette 642 is biased to push seal arrangement 653 into a sealing engagement, in this instance into radial seal engagement, with a sealing surface in the housing 601. Such a biasing arrangement was previously described herein.

Still referring to FIG. 36, cover 606 includes opposite flanges 692, 693. Between flange 692 and central portion 695 of cover 606, is provided indent 696, which helps retain the cassette 642 and cartridge 640 in an appropriate orientation, from backing out of seal, as previously discussed.

Attention is now directed to FIG. 47, in which air cleaner assembly 700 is depicted. Air cleaner assembly 700 is generally analogous to air cleaner 600, except central section 705 and access cover 706 are dimensionally, axially, longer in dimension between locations X and Y. This allows for acceptance therein of a filter cartridge having a (relatively) longer length, for some applications. It is noted that the inlet section 707 and outlet section 708 may be similar to sections 607 and 608 respectively.

In FIG. 48, air cleaner 700 is depicted in exploded view. The larger (longer) filter cartridge 720 is readily viewable, as is a larger cassette 721, to accommodate the cartridge 720.

Figure 49:
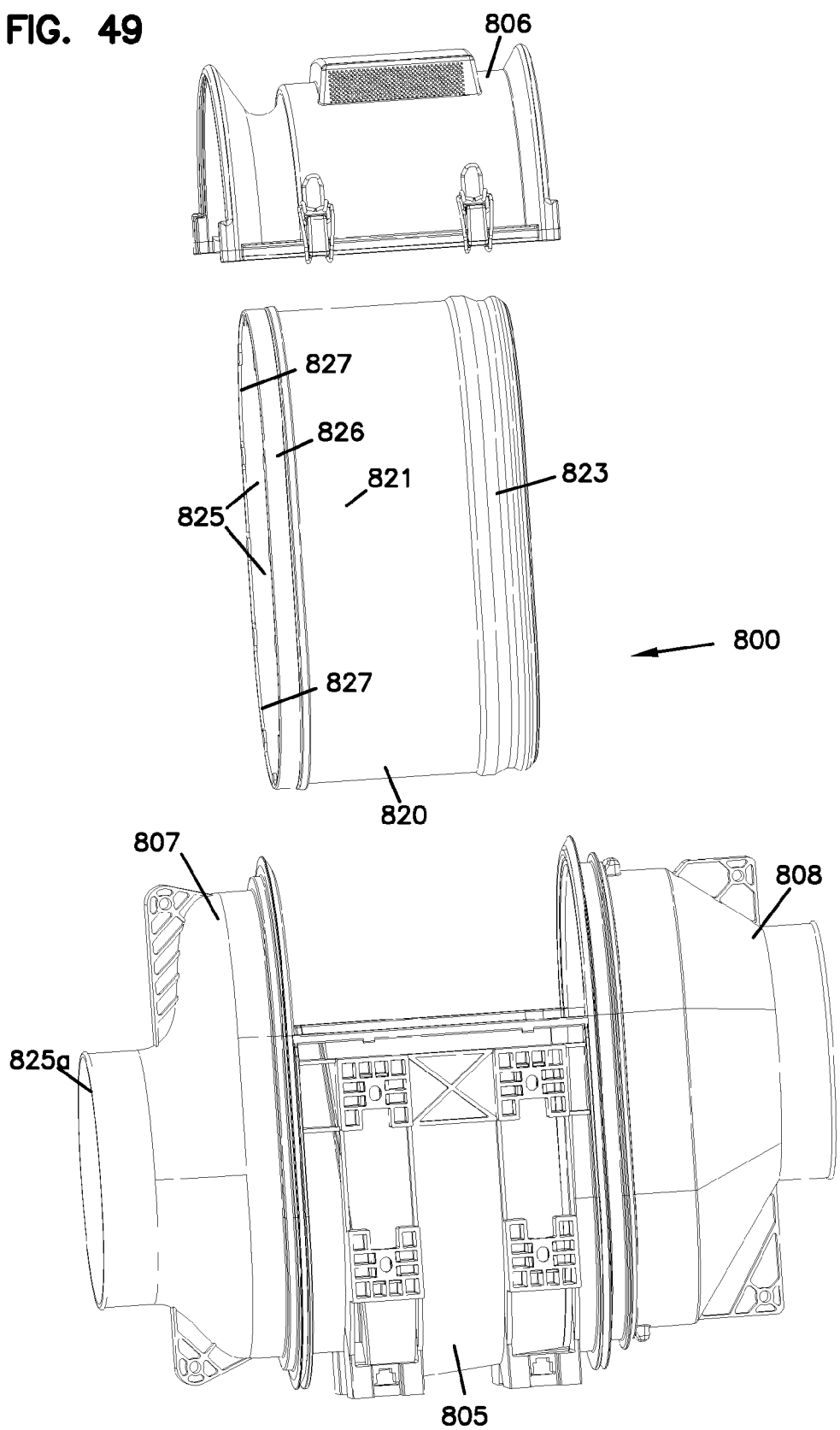
FIG. 49 is an exploded view of a fourth air cleaner assembly.

Attention is now directed to FIG. 49. In FIG. 49 air cleaner 800 is depicted in exploded view. The air cleaner 800 comprises base 805, access cover 806, inlet section 807 and outlet section 808. The base 805 may be analogous to base 605; and, the access cover 806 analogous to access cover 606. The particular air cleaner 800 depicted, however, is configured to utilization with a filter cartridge 820 without the use of a cassette. It is also configured to be used without a precleaner. Thus, inlet section 807 comprises an air flow inlet 825, but no air separation tubes. Further, air cleaner 800 is configured to be used without a safety element.

An air cleaner such as air cleaner 800 may be desirable for certain over-the-road applications, in which high dust volumes are not expected to be encountered.

Figure 50:
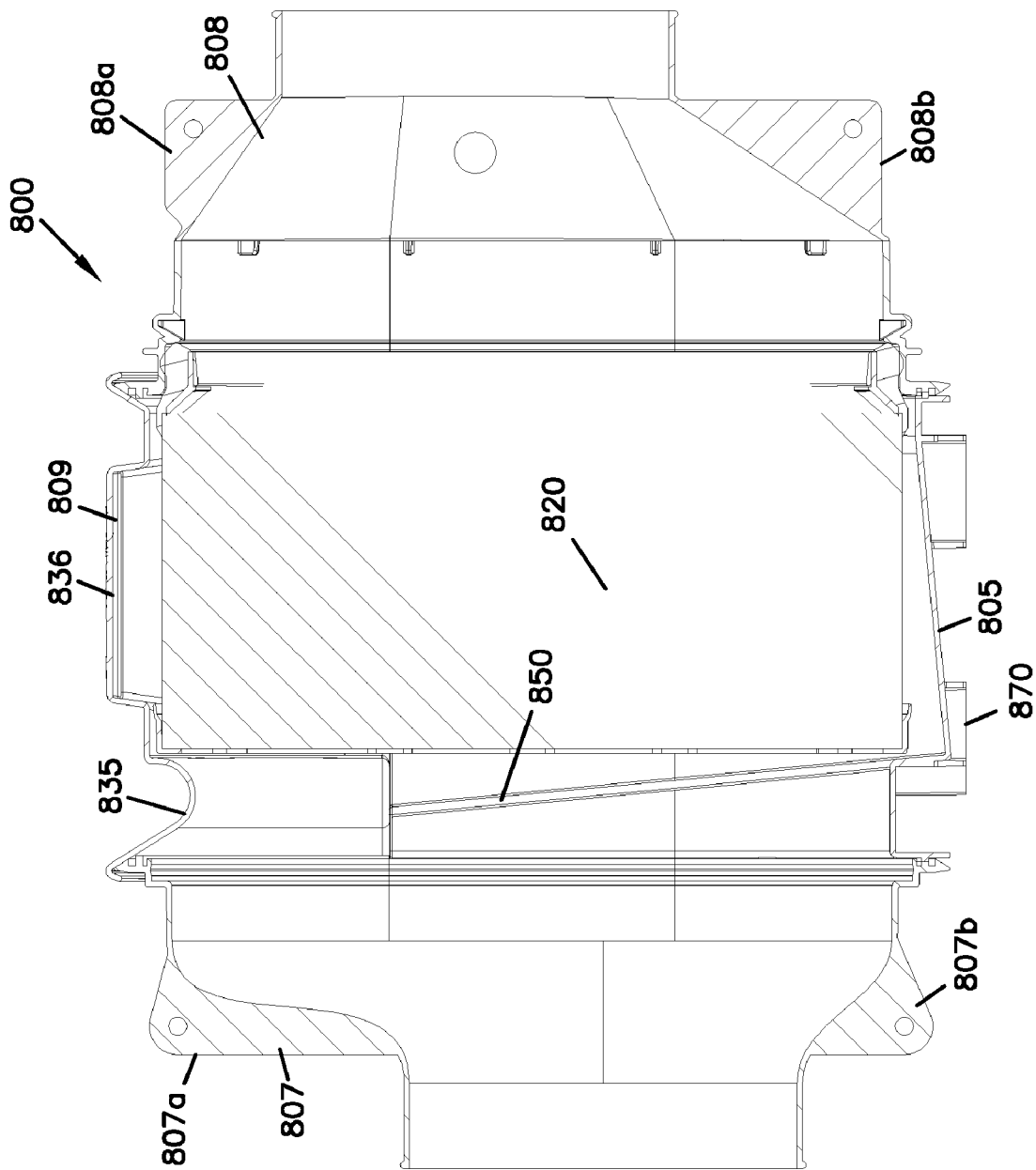
FIG. 50 is a cross-sectional view of the air cleaner assembly of FIG. 49.
Figure 54:
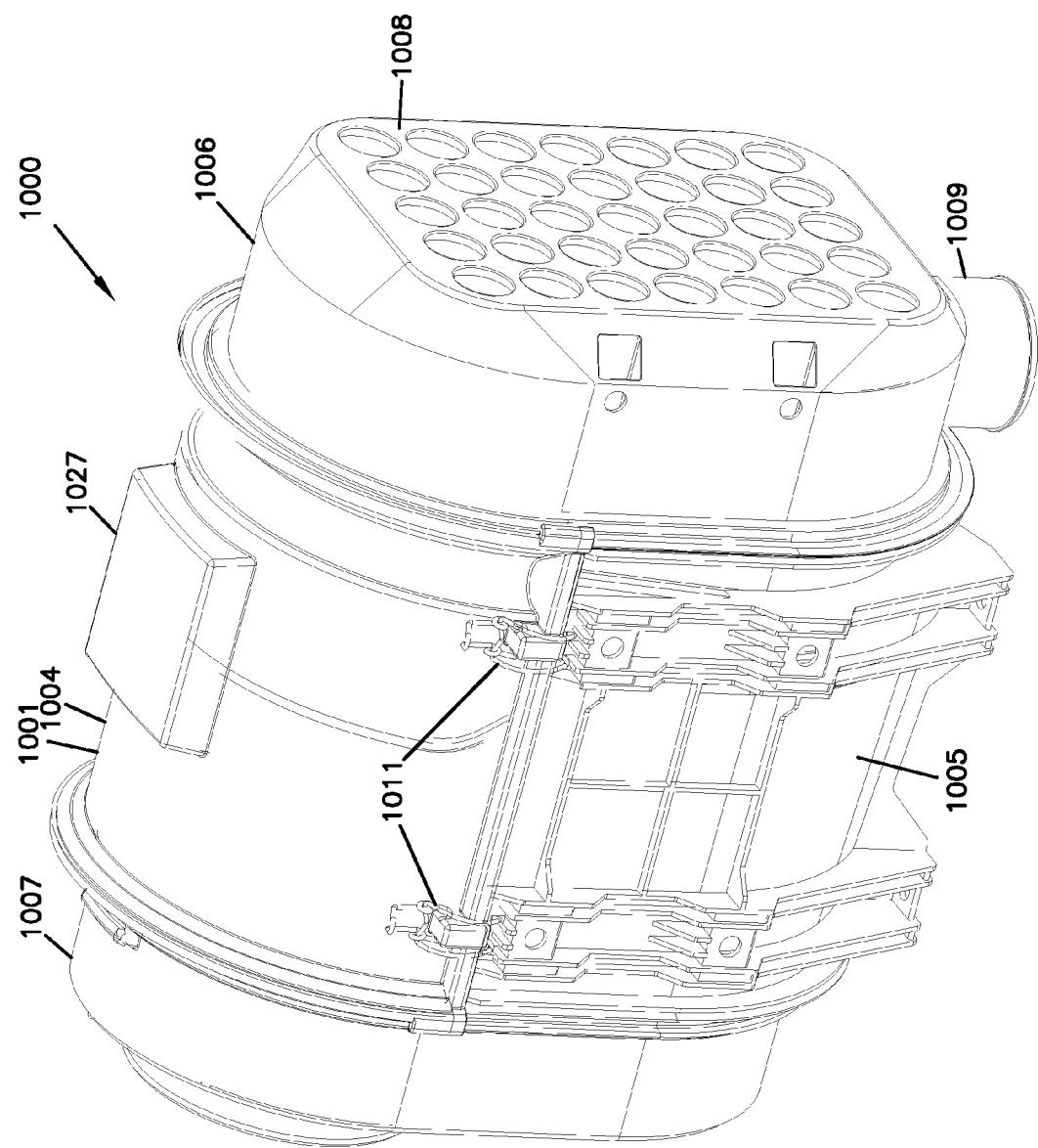
FIG. 54 is a perspective view of another embodiment of an air cleaner assembly in accordance with principles of this disclosure.

Still referring to FIG. 49, cartridge 820 comprises a z-filter media pack 821 as previously described, with seal arrangement 823 also as previously described thereon. At inlet end 825 is mounted preformed ring 826, with tabs 827 thereon extending over a portion of flow face 825. Preform ring 826 is positioned to engage cam or ramp 830, FIG. 50, to bias cartridge 820 into sealing engagement, during installation when access cover 806 is removed. In FIG. 50, air cleaner 800 is depicted in cross-section, so that this engagement will be understood. It is noted that projection 835 in access cover 806 helps prevent cartridge 820 from backing out of sealing. It is also noted that receiver 836 in cover 806 is not used in this application, however, its configuration allows for a modular assembly using components also appropriate for arrangements having a precleaner.

It is noted that sections 807, 808 can be preformed, and secured to central section 805 if desired, and can be provided with symmetry allowing for more than one mounting orientation.

Referring to FIG. 50, it is noted that inlet section 807 includes mounting bracket 807a, 807b thereon. Further, outlet 808 includes mounting brackets 808a, 808b. Air cleaner 800 can be mounted on a vehicle or other equipment system, through the brackets (807a, 807b, 808a, 808b) on the inlet and outlet sections 807, 808; or, it could be mounted in place by the U-shaped mounting arrangement 870 on central section 805. Typically one of these two options will be used, but not both, for mounting. In some arrangements, the mounting brackets (807a, 807b, 808a, 808b) can be left off. In others, the U-shaped mounting arrangement 870 can be left off.

It is noted that brackets similar to the mounting brackets on inlet section 807 and outlet section 808 can be used in other air cleaner arrangements described and depicted herein.

The following dimensions are meant to be indicative of example arrangements that can be constructed according to the presently described principles. A variety of sizes of course can be used. For many applications a typical obround media pack would have a flute length of at least 140 mm, for example 140-280 mm. For many such applications, the longer sectioned dimension of the obround media pack would be typically at least about 300 mm, for example 300-350 mm, with a shorter dimension being at least about 180 mm, for example 180-220 mm. The aspect ratio (longer cross-sectional length over shorter cross-sectional length) would typically be at least 1.4.

The dimensions of the housing components and cassette components, would be as appropriate for managing such media packs.

The size of the media pack, and overall size of the system, will generally be chosen based on the need of the air cleaner for managing the vehicle or equipment operational needs. The principles described herein can be used with air cleaners of a variety of sizes, including, for example, ones constructed for operation with equipment having an expected air flow range of up to about 1,100 cu.ft/min (about 31 cubic meters/min.). In general, air cleaner systems operated with a vacuum scavenger, as opposed to simply a dust drop tube, for any given size, allows for higher air flow demands to be accommodated.

In general, two approaches to managing larger air flow sizes are provided: lengthening the arrangement with a longer media pack; and, increasing the overall perimeter size (media pack cross-sectional size). In some instances, both can be used.

B. The Example of Filter Cartridge and Air Cleaner of FIGS. 51-62

The reference numeral 1000, FIGS. 54-61, depict an air cleaner assembly embodying any of the principles described previously above. The air cleaner 1000 comprises housing 1001. Internally received within the housing 1001 includes filter cartridge 1002 (FIGS. 51-53 and 55) and a safety filter 1003.

Housing 1001 generally comprises a main central body 1005, an access cover 1004, inlet section 1006, and outlet section 1007. The inlet section 1006 comprises a precleaner section 1008, generally as described above in connection with FIG. 1 and related descriptions. At 1009, a dust ejector or drop tube for the precleaner section 1008 is provided. Typically, the dust ejector 1009 would be provided with a dust ejector valve, as previously described, or it would be attached to a scavenge tube.

Outlet section 1007 includes a non-centrally disposed outlet aperture 1010 (FIG. 7), analogous to those described above. The safety filter 1003 can be viewed through the outlet aperture 1010.

Preferably, a modular construction is used for housing 1001. Thus, inlet section 1006 can be mounted in either of two rotational orientations. Also, outlet section 1007 can be mounted in either of two rotational positions, typically permanently through heat staking, welding, or other approaches.

The access cover 1004 is secured in place by releasable latches 1011 on the body 1005. A variety of latch arrangements can be used, with over-center wire latches being shown as an example.

In typical operation, air to be filtered will enter inlet section 1006 in the precleaner section 1008. It can be seen in FIG. 55 that precleaner section 1008 has a plurality of centrifugal separators or cyclone separators 1012. Filtered air would then exit the air cleaner 1000 at an opposite end 1013 (FIG. 55) through outlet 1007, specifically through aperture 1010.

Figure 55:
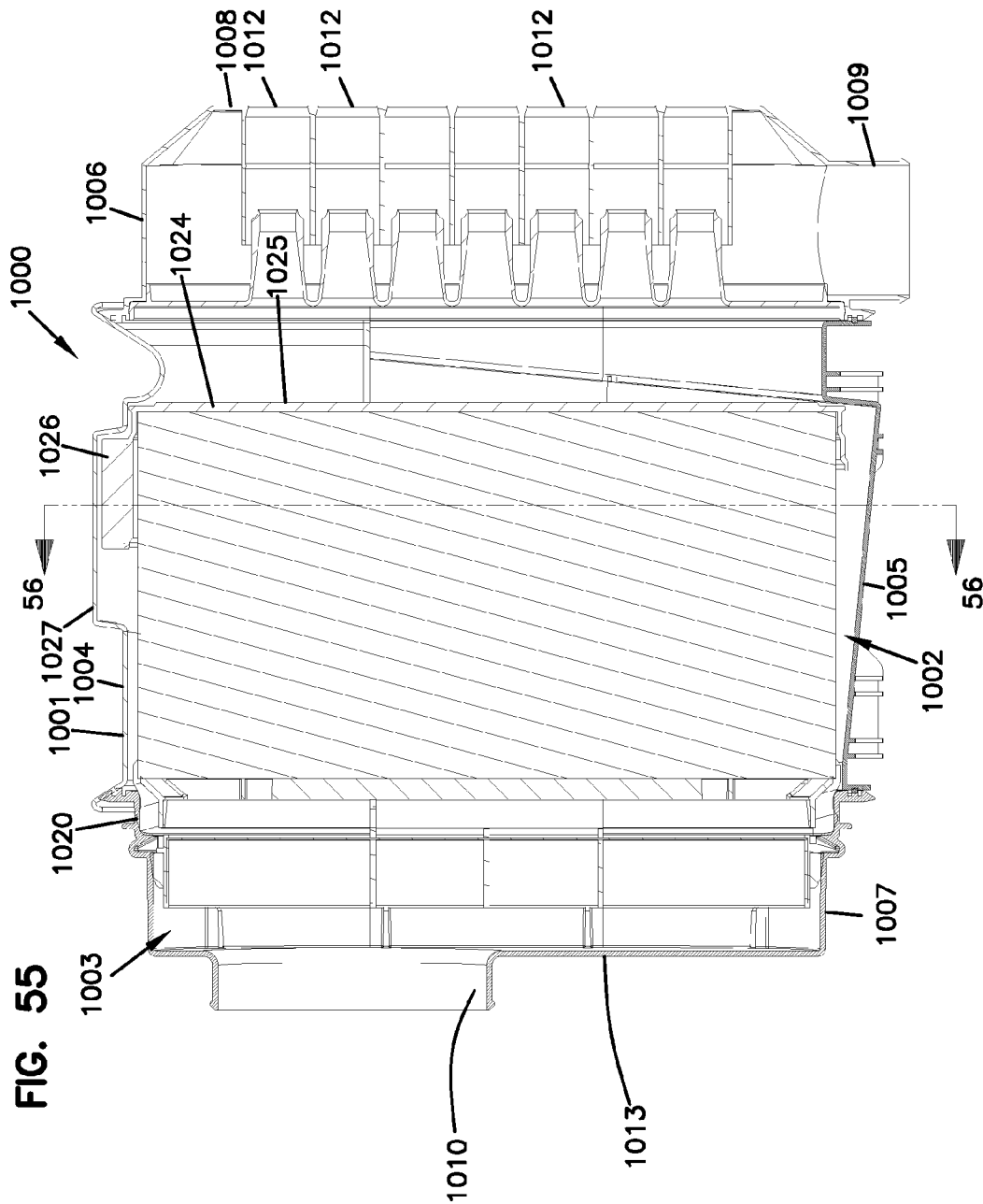
FIG. 55 is a cross-sectional view of the air cleaner assembly of FIG. 54 and showing the filter cartridge of FIGS. 51 and 52 operably installed therein.
Figure 56:
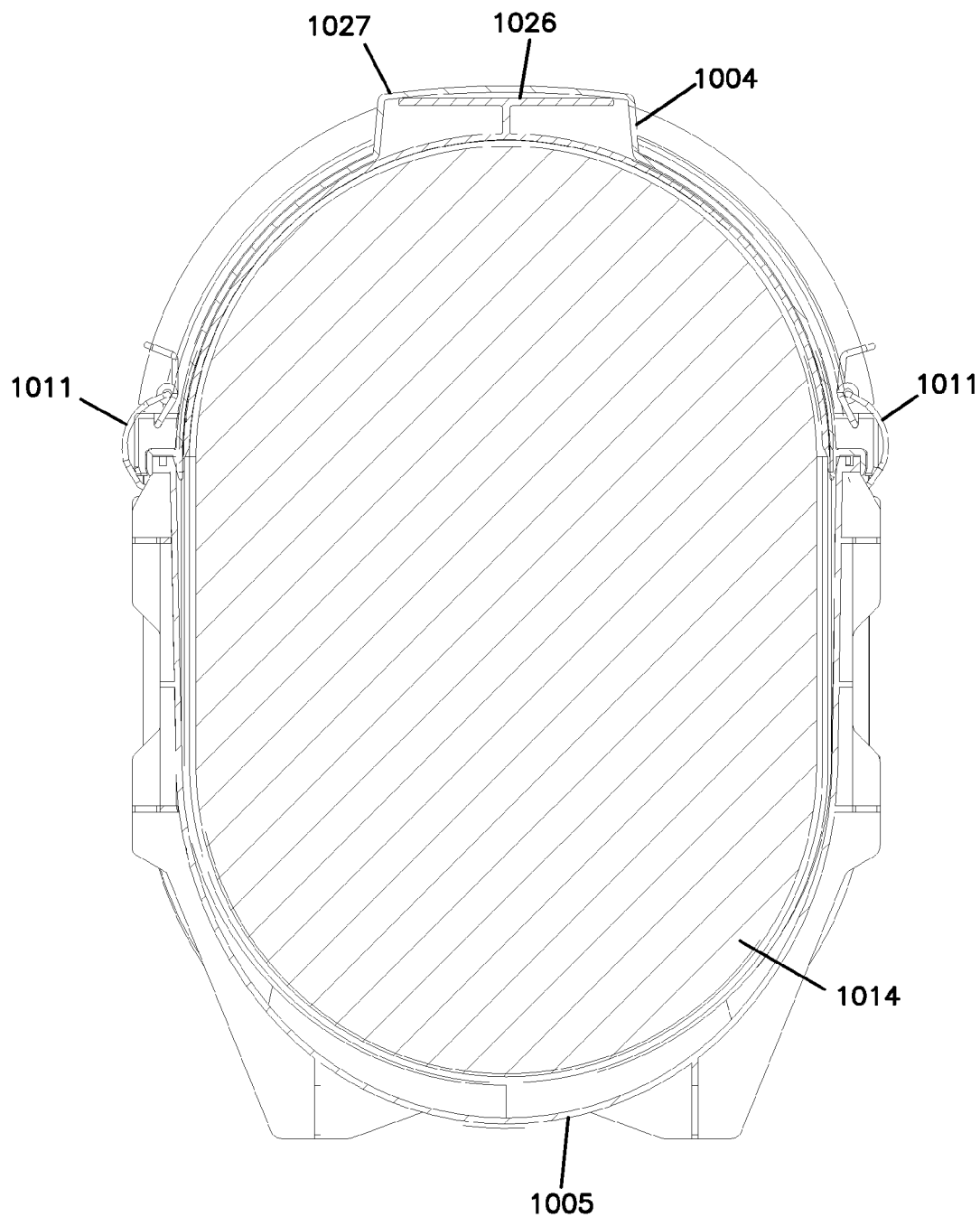
FIG. 56 is a cross-sectional view of the air cleaner assembly of FIG. 54, the cross-section being taken along the line 56-56 of FIG. 55.
Figure 57:
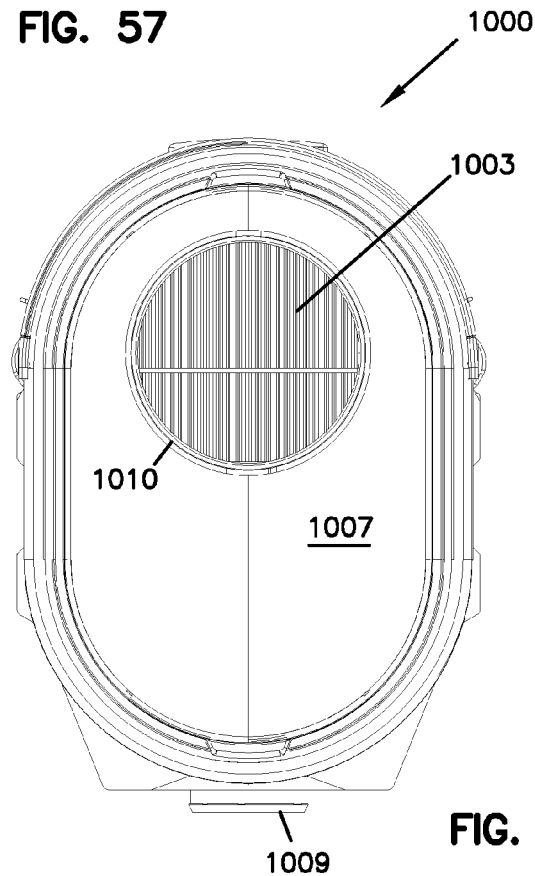
FIG. 57 is an end elevational view of the air cleaner assembly of FIG. 54, depicting the outlet end.
Figure 58:
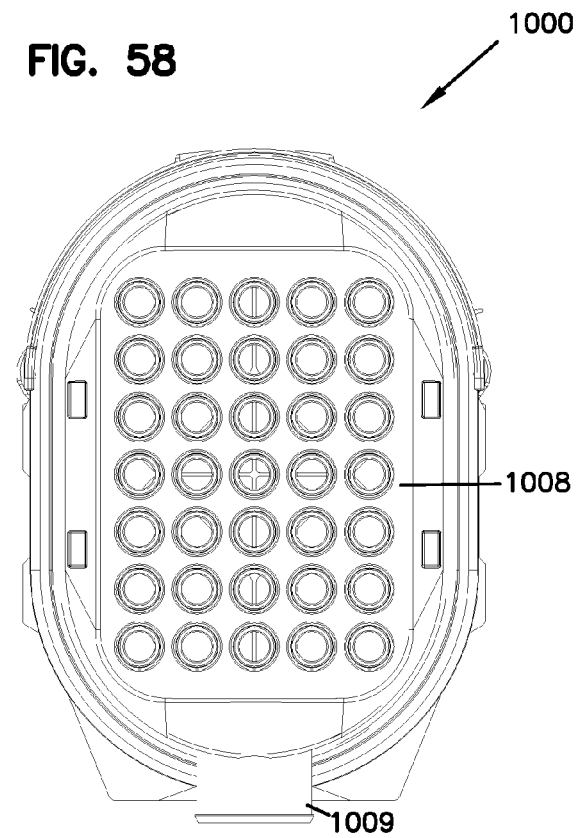
FIG. 58 is an end elevational view of the air cleaner assembly of FIG. 54, depicting the inlet end.
Figure 61:
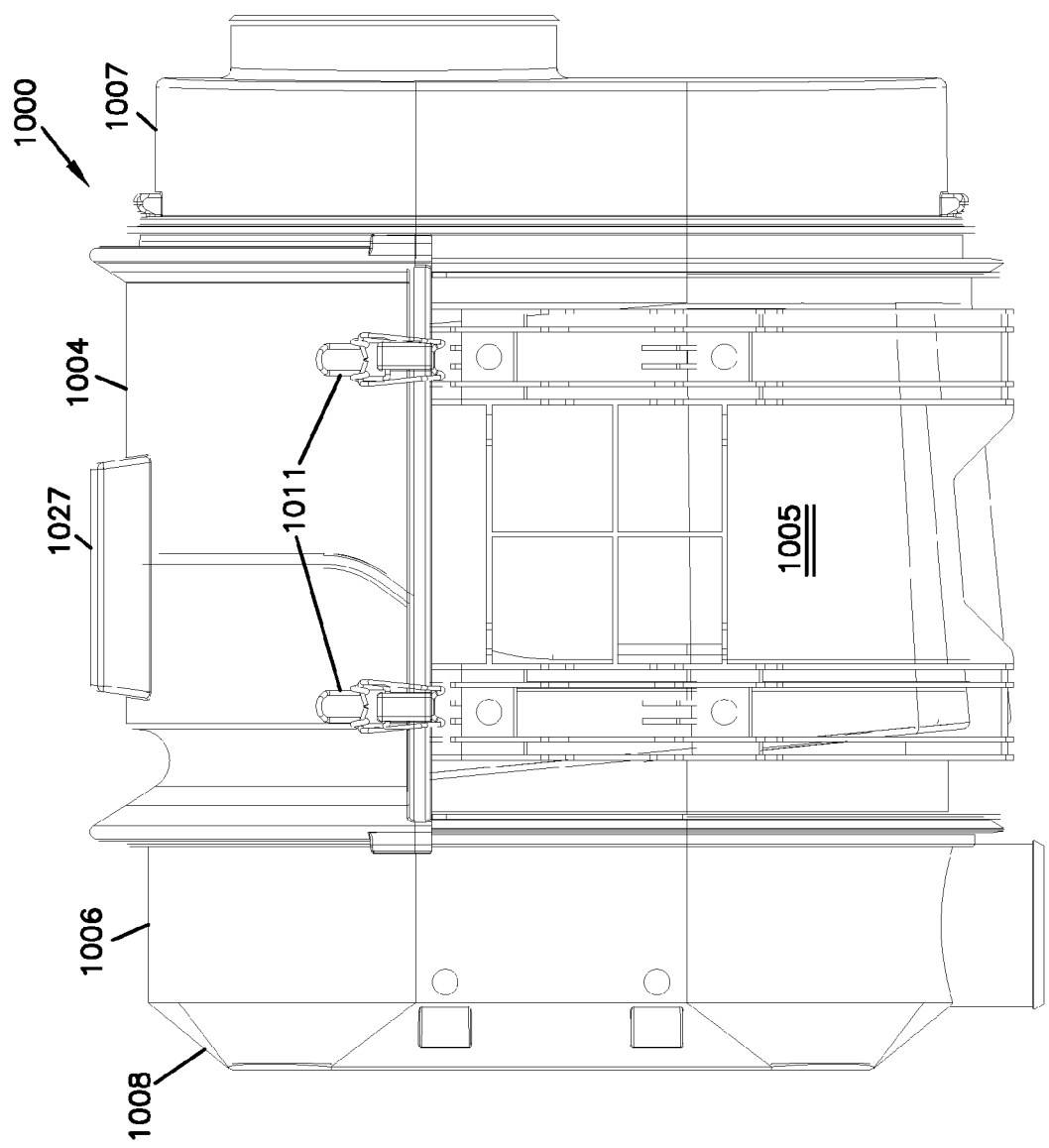
FIG. 61 is a side elevational view of the air cleaner assembly of FIG. 54.

Attention is again directed to FIG. 55, in which the air cleaner 1000 is depicted in cross-sectional view. In FIG. 55, the following internally received componentry can be viewed: primary filter cartridge 1002 and safety filter element 1003.

Attention is first directed to safety filter element 1003. In general, safety element 1003 is similar to safety element 641 (FIG. 36) and safety element 45 (FIG. 24).

The filter cartridge 1002 can be viewed in FIGS. 51-53. The filter cartridge 1002 generally comprises a media pack 1014, in this instance, a coiled Z-filter media pack. The coiled Z-filter media pack 1014, in the example shown, is generally oval cross-section, in this instance racetrack, with opposite curved ends 1015, 1016 and opposite sides 1017, 1018. The sides 1017, 1018 can be straight and parallel, or can have slight curvature and be opposite one another.

The filter cartridge 1002 further includes a seal arrangement 1019, in this instance, oriented to form an outside radial seal 1020 (FIG. 55). In FIG. 53, it can be seen that the seal arrangement 1019 generally comprises a support 1021 having seal material 1022 thereon. This general approach was described above, in connection with FIGS. 19-21.

In FIGS. 51 and 52, it can be seen that the support 1021 includes gridwork 1023 extending thereacross. The gridwork 1023 provides some advantage in preventing telescoping of the media pack 1014 and further support to the overall filter cartridge 1002. In addition, the gridwork 1023 is eye catching and attractive. For Donaldson Company, the assignee, this particular gridwork shown in FIGS. 51 and 52 is also distinctive to Donaldson Company.

Still in reference to FIGS. 51-53, the filter cartridge 1002 includes a cassette or band 1024 preferably permanently mounted as part of the filter cartridge 1002. The band 1024 has a function similar to the cassette 642, described above. In the example of the element shown in FIG. 36, the cassette 642 was removable from the filter cartridge 640. In this instance, the band 1024 is preferred to be permanently mounted as part of the filter cartridge 1002. By "permanently mounted", it is meant that the band 1024 cannot be removed from the rest of the filter cartridge 1002 without destroying the rest of the filter cartridge 1002. The band 1024 circumscribes and is adjacent to one end of the filter cartridge 1002, in this instance, the inlet end 1025. The band 1024 includes a projection arrangement embodied as handle 1026, similar to arrangements previously described herein. Further, the cover 1004 includes a receiver 1027 to accommodate the handle 1026, again in accord with previous descriptions. Because the handle 1026 is located at an end of the filter cartridge 1002 remote from the end with the seal arrangement 1019, the region of the filter cartridge 1002 between the seal arrangement 1019 and the handle 1026 is a lever arm 1031 to help remove the seal arrangement 1019 from engagement when servicing the air cleaner. The lever arm 1031 in this embodiment is longer than the lever arm in previous embodiments. The longer lever arm 1031 is helpful in removal of the filter cartridge 1002 from the air cleaner 1000.

As can be seen in FIGS. 51 and 52, the band 1024 includes at least two regions of different widths. The first width 1028 is the region of the band 1024 that defines and accommodates the handle 1026. The second region of width 1029 is the section of the band 1024 that does not accommodate the handle 1026. As can be seen in FIGS. 51 and 52, the handle 1026 is located on the curved end 1016. The opposite curved end 1016 has the region of second width 1029. The sides 1017, 1018 have both the first width 1028 and second width 1029 as part of them.

Figure 62:
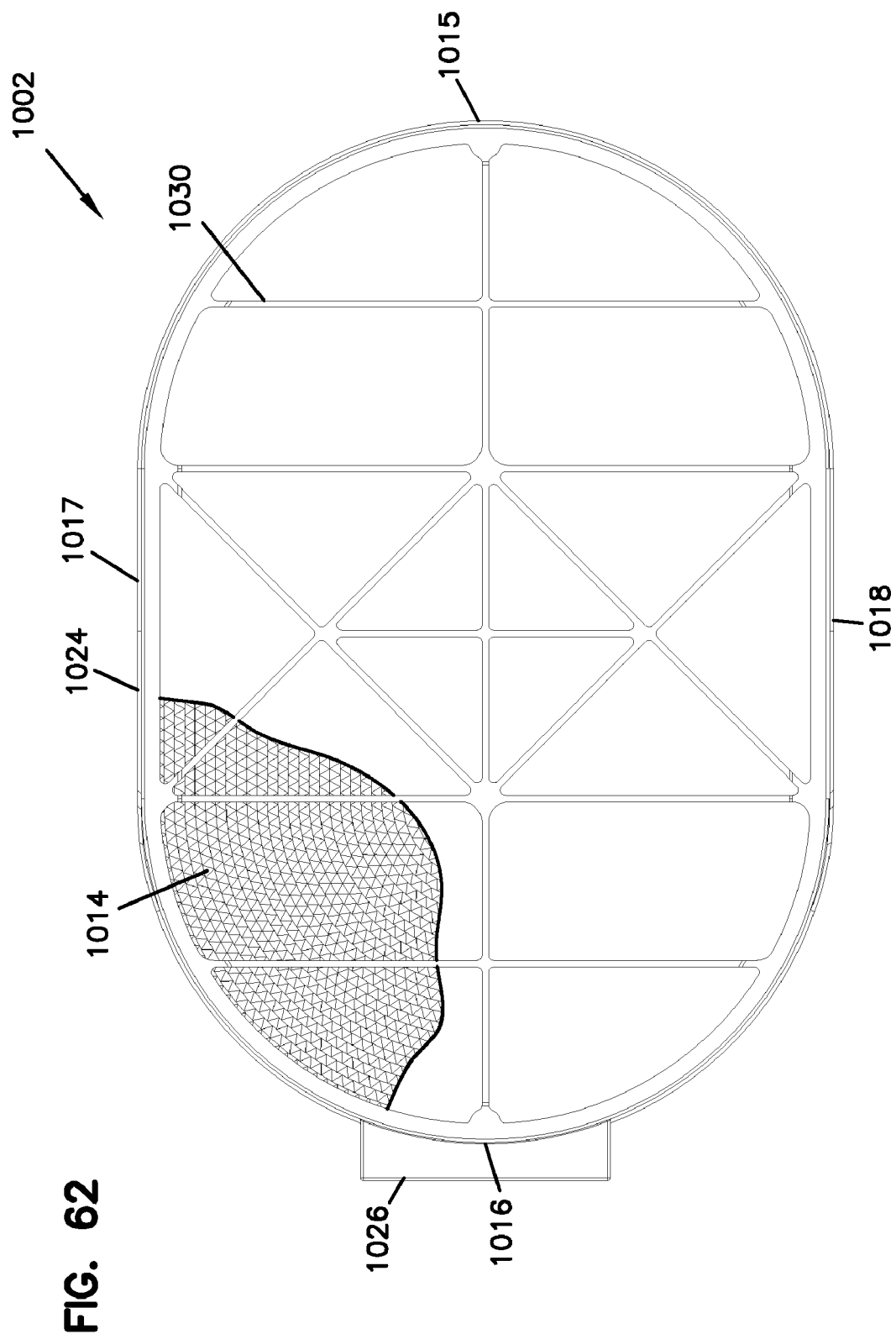
FIG. 62 is a bottom plan view of the filter cartridge depicted in FIGS. 51 and 52.

In FIG. 62, the band 1024 is shown to include a grid 1030 to provide further support for the cartridge 1002.

The filter cartridge 1002 is loaded and unloaded into the housing 1001 by removing the access cover 1004 and then operably loading the filter cartridge 1002 therein, analogous to the description of previous arrangements.

In operation, air to be filtered enters the air cleaner 1000 through the precleaner 1008, then through the filter cartridge 1002, then through the safety filter 1003, and then exits the air cleaner 1000 through the aperture 1010 in the outlet section 1007.

The invention claimed is:

1. An air filter cartridge arrangement removeably installable in an air cleaner housing during use; the air filter cartridge arrangement comprising:
   (a) a media pack having:
      (i) an inlet flow end and an opposite outlet flow end;
      (ii) a plurality of inlet flow flutes open at the inlet flow end and closed to passage of air therefrom adjacent the outlet flow end;
      (iii) a plurality of outlet flow flutes closed adjacent the inlet flow end and open to outlet flow at the outlet flow end;

(iv) a non-circular cross-sectional shape; and,
(v) a media pack side extending between the inlet flow end and the opposite outlet flow end;
(b) a radially outwardly directed housing seal arrangement secured to an end of the media pack;
(i) the housing seal arrangement comprising a seal member mounted on a frame portion; and,
(c) a band defining an interior and having the media pack positioned therein and permanently mounted thereto;
(i) the band including a handle member thereon;
(A) the handle member having a portion under which a portion of a person's fingers can fit, between the handle member and a remainder the band;
(B) the band being spaced from, and separate from, the frame portion of the housing seal arrangement; and,
(C) the band having two opposite ends; the portion of the handle member under which a portion of a person's fingers can fit being a portion that does not extend adjacent to a selected one of the two opposite ends.

2. An air filter cartridge arrangement according to claim 1 wherein:
(a) the handle member includes a platform secured to the band with a recess arrangement between the platform and a portion of the band.

3. An air filter cartridge arrangement according to claim 2 wherein:
(a) the platform defines a perimeter area of at least 3600 sq. mm.

4. An air filter cartridge arrangement according to claim 1 wherein:
(a) the band has a cross-sectional shape with two opposite curved ends and two opposite sides.

5. An air filter cartridge arrangement according to claim 4 wherein:
(a) the portion of a handle member, under which a portion of a person's fingers can fit, is not positioned in overlap with either of the two opposite sides of the band.

6. An air filter cartridge arrangement according to claim 1 wherein:
(a) the media pack comprises fluted media secured to a facing sheet and coiled.

7. An air filter cartridge according to claim 1 wherein:
(a) the media pack has an oval cross-section shape.

8. An air filter cartridge according to claim 1 wherein:
(a) the band includes a grid extending across the inlet flow end of the media pack.

9. An air filter cartridge arrangement according to claim 1 wherein:
(a) the band includes at least two regions of different widths;
(i) a first width being a region of the band accommodating the handle member; and
(ii) a second width being a region of the band that does not accommodate the projection arrangement.

10. An air cleaner assembly comprising:
(a) a housing including: an inlet section; an opposite outlet section; and, a central main filter cartridge receiving section between the inlet section and outlet section;
(i) the central main filter cartridge receiving section having a side access cover thereon positioned to open a service access at a location for servicing access to an interior of the central main cartridge receiving section; and,
(ii) the access cover including an interior surface with an outwardly projecting cartridge handle recess therein; the outwardly projecting cartridge handle recess being spaced from a perimeter of the access cover; and,
(b) a main air filter cartridge, including a media pack, removeably positioned within the central main filter cartridge receiving section;
(i) the media pack having:
(A) an oval cross-sectional shape; and,
(B) a radially directed housing seal arrangement secured to an end of the media pack; the radially directed housing seal arrangement comprising a seal member having a radially directed seal surface surrounding a framework; and,
(C) first and second opposite flow faces;
(ii) a handle member secured to the main air filter cartridge and oriented projecting into the outwardly projecting cartridge handle recess in the access cover; and,
(iii) the main air filter cartridge being sized to fit through the service access, when the side access cover is removed; and,
(c) the outwardly projecting cartridge directed handle recess having a length, in a direction between the inlet section and outlet section, that is less than a length of the cartridge between the first cartridge flow face and second, opposite, flow face.

11. An air cleaner assembly according to claim 10 wherein:
(a) the central main filter cartridge receiving section includes first and second, opposite, sidewall sections each having a portion of a stationary loading cam arrangement thereon oriented to engage the main air filter cartridge during installation and to bias the main air filter cartridge toward the outlet section as the main air filter cartridge is inserted into the central main air filter cartridge receiving section.

12. An air cleaner assembly according to claim 11 wherein:
(a) the stationary loading cam arrangement includes a stationary cam section on each of the first and second, opposite, interior sidewall sections that slants toward the outlet section in extension inwardly away from the access cover.

13. An air cleaner assembly according to claim 12 wherein:
(a) the access cover includes a portion that projects into the housing interior at a location between the main air filter cartridge and the inlet section.

14. An air cleaner assembly according to claim 10 wherein:
(a) the handle member comprises a portion of a molded plastic preform secured to the media pack.

15. An air cleaner assembly according to claim 14 wherein:
(a) the handle member includes a portion underneath which a person can insert at least a portion of a hand, between the handle member and the media pack, during handling of the main air filter cartridge.

16. An air cleaner assembly according to claim 15 wherein:
(a) the handle member comprises a portion of a molded plastic preform that includes a portion surrounding an end of the media pack.

17. An air cleaner assembly according to claim 10 wherein:
(a) the inlet section comprises a precleaner arrangement including a plurality of dust separator tubes.

18. An air cleaner assembly according to claim 17 wherein:
(a) the inlet section is removeably secured to the main air filter cartridge receiving section.

19. An air cleaner assembly according to claim 17 wherein:
(a) the precleaner arrangement includes a dust ejector port thereon.

20. An air cleaner assembly according to claim 10 wherein:

(a) the access cover includes a portion that projects into the housing interior at a location between the main air filter cartridge and the inlet section.

21. An air cleaner assembly according to claim 10 wherein:

(a) the handle member includes a portion underneath which a person can insert at least a portion of a hand, between the handle member and the media pack, during handling of the main air filter cartridge.

22. An air cleaner assembly according to claim 10 wherein:

(a) the perimeter cross-sectional shape of the media pack defines two opposite curved ends; and, (b) the handle member is positioned in overlap with a curved end of the main air filter cartridge.

* * * * *